(12) United States Patent
Honda

(10) Patent No.: US 7,877,569 B2
(45) Date of Patent: Jan. 25, 2011

(54) REDUCTION OF FRAGMENTATION IN NONVOLATILE MEMORY USING ALTERNATE ADDRESS MAPPING

(75) Inventor: Toshiyuki Honda, Osaka (JP)

(73) Assignee: Panasonic Corporation, Osaka (JP)

( * ) Notice: Subject to any disclaimer, the term of this patent is extended or adjusted under 35 U.S.C. 154(b) by 734 days.

(21) Appl. No.: 11/587,808

(22) PCT Filed: Apr. 28, 2005

(86) PCT No.: PCT/JP2005/008188
§ 371 (c)(1),
(2), (4) Date: Sep. 19, 2007

(87) PCT Pub. No.: WO2005/106673
PCT Pub. Date: Nov. 10, 2005

(65) Prior Publication Data
US 2008/0109589 A1 May 8, 2008

(30) Foreign Application Priority Data

Apr. 28, 2004 (JP) .............................. 2004-133112
Apr. 28, 2004 (JP) .............................. 2004-133113
May 7, 2004 (JP) .............................. 2004-138200

(51) Int. Cl.
*G06F 12/10* (2006.01)
(52) U.S. Cl. ..................... 711/202; 711/103; 711/206
(58) Field of Classification Search ................ None
See application file for complete search history.

(56) References Cited

U.S. PATENT DOCUMENTS

| 5,745,418 | A | 4/1998 | Ma et al. |
| 6,282,605 | B1 | 8/2001 | Moore |
| 6,377,500 | B1 * | 4/2002 | Fujimoto et al. ....... 365/230.01 |
| 6,581,132 | B1 * | 6/2003 | Kakinuma et al. .......... 711/103 |
| 2002/0184436 | A1 | 12/2002 | Kim et al. |
| 2004/0103241 | A1 | 5/2004 | Chang et al. |

(Continued)

FOREIGN PATENT DOCUMENTS

EP 1 416 386 5/2004

(Continued)

OTHER PUBLICATIONS

Supplementary European Search Report issued Jul. 30, 2008 in the Application No. EP 05 73 6975.

*Primary Examiner*—Than Nguyen
(74) *Attorney, Agent, or Firm*—Wenderoth, Lind & Ponack, L.L.P.

(57) ABSTRACT

A nonvolatile storage device can read and write data by receiving a logical address from a host. The nonvolatile storage device includes: a nonvolatile memory writing and reading data based on a physical address; a logical/physical conversion table storing information on correspondence between the logical address and the physical address for each of a plurality of data management units; a duplication table storing information on correspondence between the logical address and the physical address of data arranged over a plurality of areas in a duplicate (redundant) manner in the nonvolatile memory and having a size smaller than a size of a data management unit; and a controller controlling an operation of the nonvolatile storage device. The controller permits duplicate (redundant) writing of data having a same logical address as the data (which has been written in one data management unit in another data management unit), and the controller performs a plurality of write modes for the duplicate (redundant) writing, and selectively switches between the write modes according to situation of a logical address change designated by the host.

34 Claims, 49 Drawing Sheets

U.S. PATENT DOCUMENTS

| | | | |
|---|---|---|---|
| 2005/0144357 A1* | 6/2005 | Sinclair | 711/103 |
| 2005/0144363 A1* | 6/2005 | Sinclair | 711/103 |
| 2006/0156078 A1 | 7/2006 | Baumhof et al. | |

FOREIGN PATENT DOCUMENTS

| | | |
|---|---|---|
| JP | 2002-324008 | 11/2002 |
| JP | 2002-366423 | 12/2002 |
| JP | 2004-164633 | 6/2004 |
| JP | 2004-326165 | 11/2004 |
| WO | 2004/001579 | 12/2003 |

* cited by examiner

| DESTINATION PHYSICAL BLOCK ADDRESS | DESTINATION ALLOCATION PHYSICAL PAGE |
|---|---|

| PHYSICAL BLOCK ADDRESS | SOURCE PHYSICAL BLOCK ADDRESS | DESTINATION PHYSICAL BLOCK ADDRESS | DESTINATION TOP PAGE LOGICAL ADDRESS | DESTINATION NEXT WRITE LOGICAL ADDRESS | DESTINATION WRITE MODE | DESTINATION VALID OFFSET PHYSICAL ADDRESS |
|---|---|---|---|---|---|---|

Fig.8

| WRITE UNIT | START ADDRESS OF WRITE UNIT 0 | ~ | START ADDRESS OF WRITE UNIT F | ECC OF MANAGEMENT REGION |

150 WRITE UNIT ALLOCATION TABLE

Fig.11A
(a)
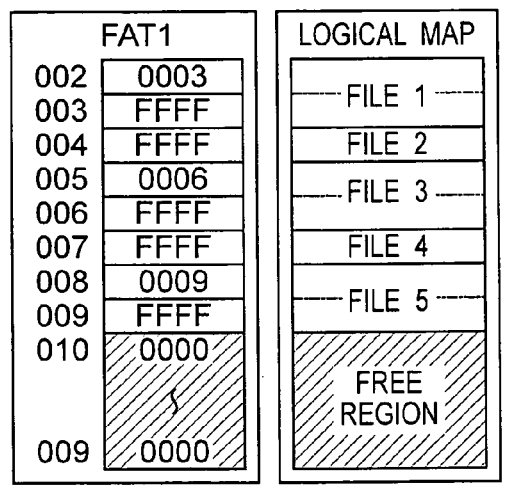
(b)
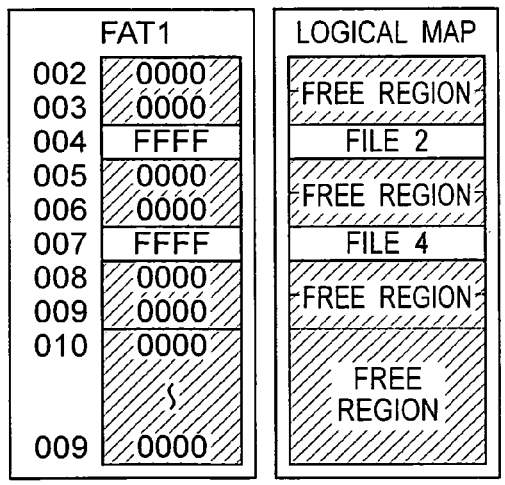
(c)
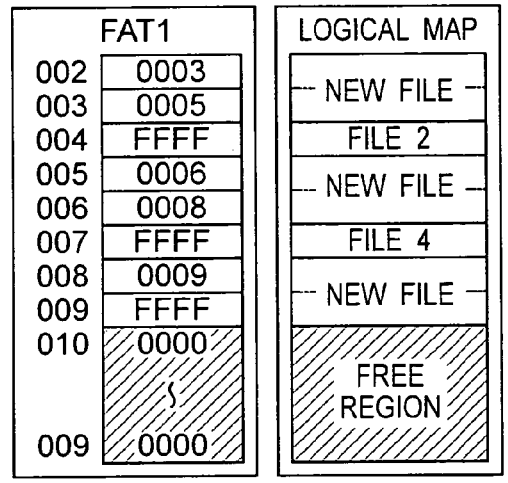

Fig.23A

| LOGICAL SECTOR ADDRESS | LOGICAL GROUP | CORRESPONDING FAT DUPLICATION INFORMATION | FIXED OFFSET | AGGREGATION CONDITION (DESTINATION ALLOCATION PHYSICAL PAGE) | WRITE UNIT SIZE | WRITE UNIT NUMBER | LOGICAL SECTOR ADDRESS FOR EACH WRITE UNIT |
|---|---|---|---|---|---|---|---|
| 0~97 | 0-0 | FAT DUPLICATION INFORMATION 0 | 0 | 0x00E0 | 32 (0x0020) | 4 | 0~31<br>32~63<br>64~95<br>96,97 |
| 98~128 | 0-1 | FAT DUPLICATION INFORMATION 1 | 96 | 0x00FC | 4 (0x0004) | 9 | 98,99<br>100~103<br>104~107<br>108~111<br>112~115<br>116~119<br>120~123<br>124~127<br>128 |
| 129~159 | 0-2 | FAT DUPLICATION INFORMATION 2 | 128 | 0x00FC | 4 (0x0004) | 8 | 129~131<br>132~135<br>136~139<br>140~143<br>144~147<br>148~151<br>152~155<br>156~159 |
| 160~255 | 0-3 | FAT DUPLICATION INFORMATION 3 | 160 | 0x00E0 | 32 (0x0020) | 3 | 160~191<br>192~223<br>224~255 |

Fig.23B

| LOGICAL GROUP \ CARD CAPACITY | 128MB | 256MB | 512MB |
|---|---|---|---|
| 0-0<br>(MASTER BOOT RECORD,<br>PARTITION BOOT RECORD) | 0~97 | 0~101 | 0~233 |
| 0-1<br>(FAT1) | 98~128 | 102~162 | 234~356 |
| 0-2<br>(FAT2) | 129~159 | 163~223 | 357~479 |
| 0-3<br>(ROOT DIRECTORY) | 160~191 | 224~255 | 480~511 |

Fig.24A
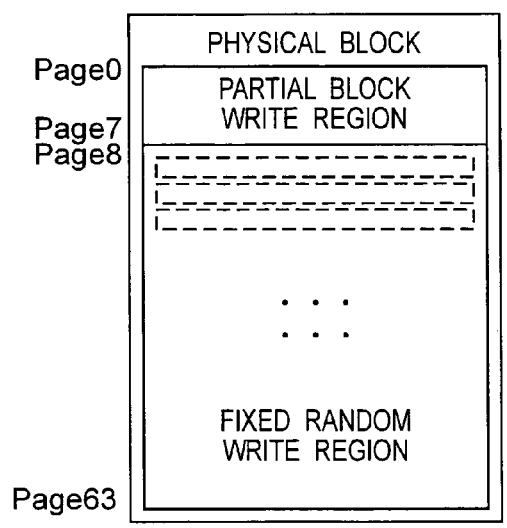
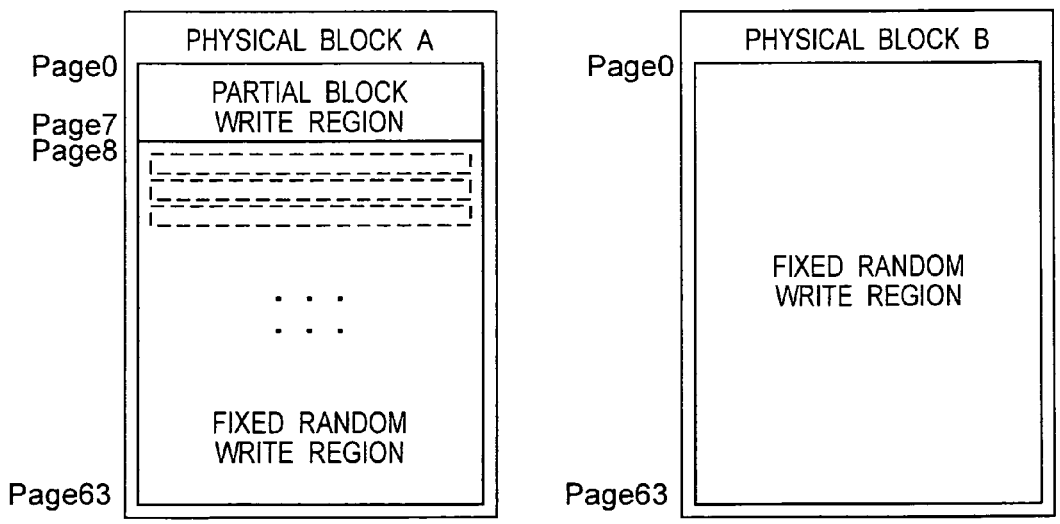

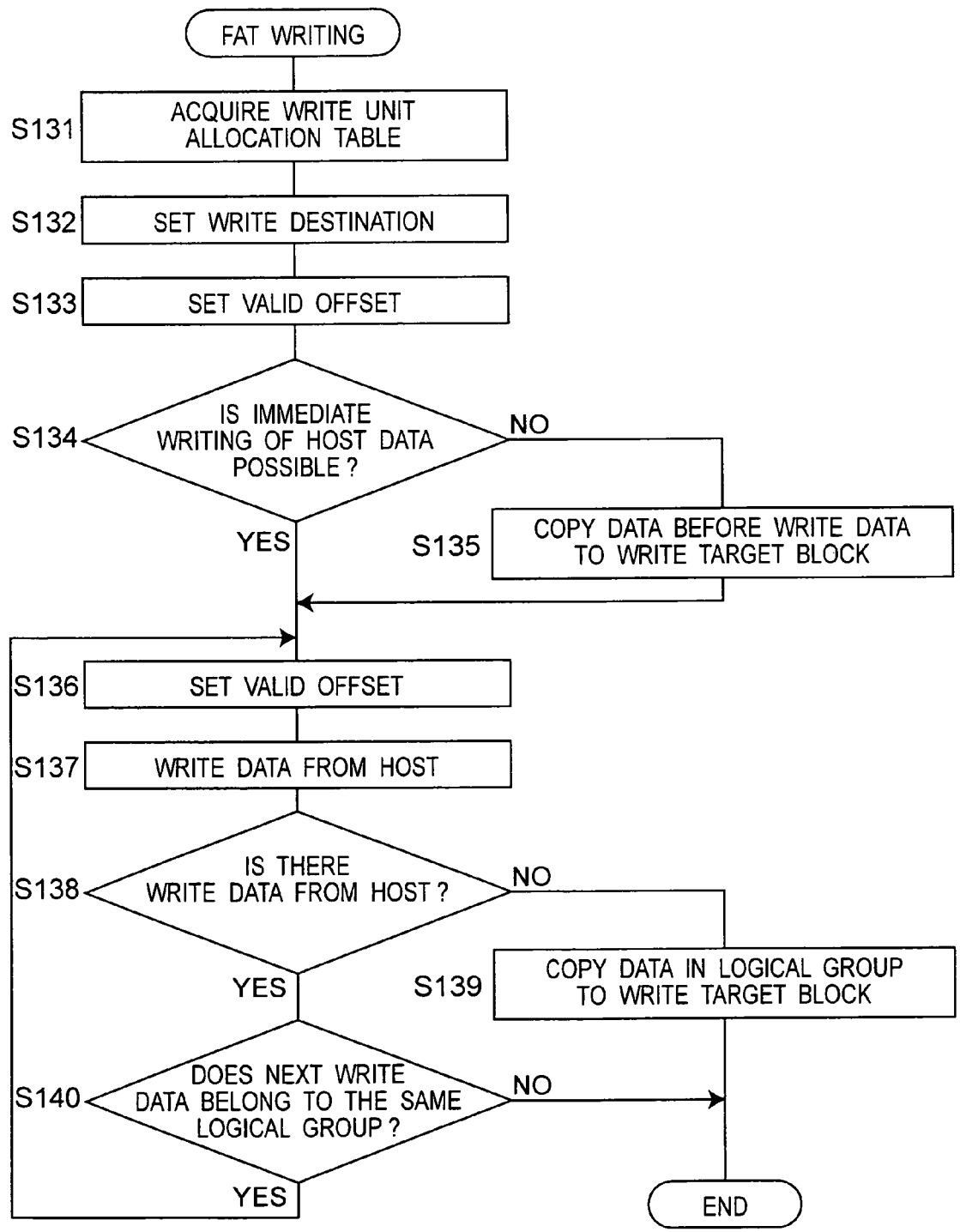

Fig. 30

LOGICAL/PHYSICAL CONVERSION TABLE

0x0010 | 0x0000→0x0100

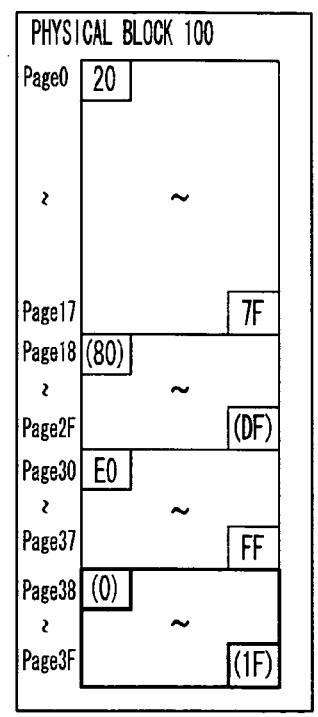

DESTINATION PHYSICAL BLOCK

PHYSICAL BLOCK 100
- Page0: 20
- ~
- Page17: 7F
- Page18: (80)
- ~
- Page2F: (DF)
- Page30: E0
- ~
- Page37: FF
- Page38: (0)
- ~
- Page3F: (1F)

107b

| LOGICAL BLOCK ADDRESS | SOURCE PHYSICAL BLOCK ADDRESS | DESTINATION PHYSICAL BLOCK ADDRESS | DESTINATION TOP PAGE LOGICAL ADDRESS | DESTINATION NEXT WRITE LOGICAL ADDRESS | DESTINATION NEXT WRITE PHYSICAL ADDRESS | DESTINATION WRITE MODE | DESTINATION VALID OFFSET PHYSICAL ADDRESS |
|---|---|---|---|---|---|---|---|
| 0xFFFF (INVALID VALUE) | 0x0000 (INVALID VALUE) | 0x0000 (INVALID VALUE) | 0x0000 (INITIAL VALUE) | 0x0000 (INITIAL VALUE) | 0x0000 (INITIAL VALUE) | 0x0000 SEQUENTIAL | 0x0000 (INITIAL VALUE) |

Fig. 36

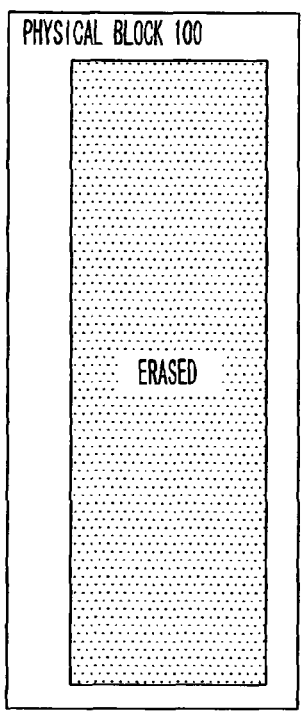

DESTINATION PHYSICAL BLOCK
PHYSICAL BLOCK 100
ERASED

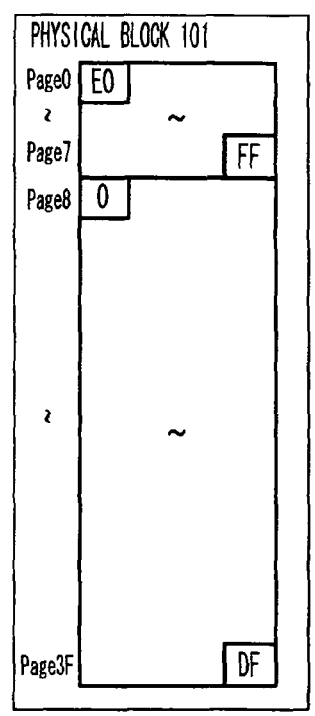

AGGREGATION DESTINATION PHYSICAL BLOCK
PHYSICAL BLOCK 101
Page0 E0
Page7 FF
Page8 0
Page3F DF 107b

| LOGICAL BLOCK ADDRESS | SOURCE PHYSICAL BLOCK ADDRESS | DESTINATION PHYSICAL BLOCK ADDRESS | DESTINATION TOP PAGE LOGICAL ADDRESS | DESTINATION NEXT WRITE LOGICAL ADDRESS | DESTINATION NEXT WRITE PHYSICAL ADDRESS | DESTINATION WRITE MODE | DESTINATION VALID OFFSET PHYSICAL ADDRESS |
|---|---|---|---|---|---|---|---|
| 0xFFFF (INVALID VALUE) | 0x0000 (INVALID VALUE) | 0x0000 (INVALID VALUE) | 0x0000 (INITIAL VALUE) | 0x0000 (INITIAL VALUE) | 0x0000 (INITIAL VALUE) | 0x0000 SEQUENTIAL | 0x0000 (INITIAL VALUE) |

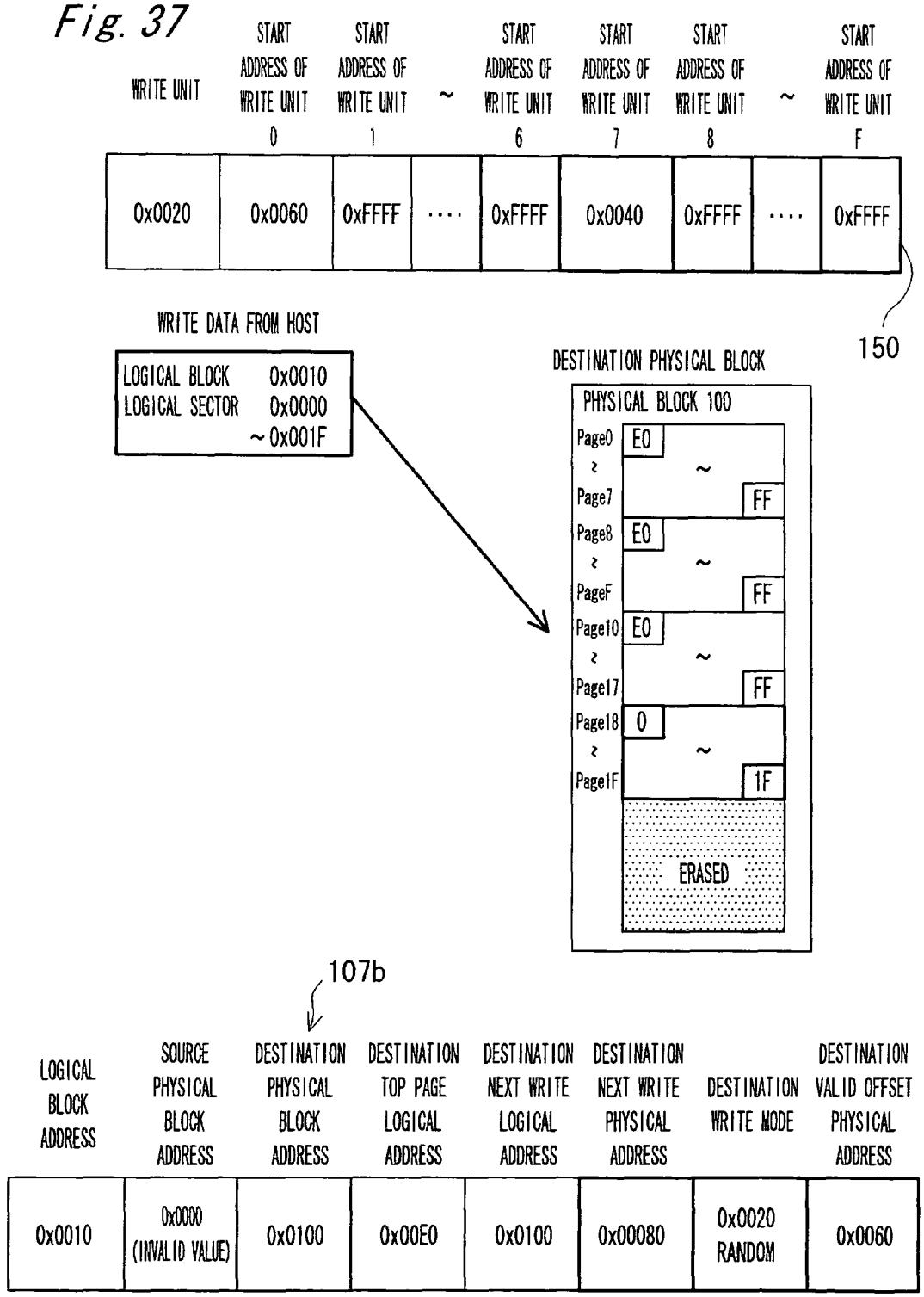

REDUCTION OF FRAGMENTATION IN NONVOLATILE MEMORY USING ALTERNATE ADDRESS MAPPING

BACKGROUND OF THE INVENTION

1. Field of Invention

The present invention relates to a storage device using a nonvolatile memory such as a flash memory, etc. and a writing method thereof.

2. Description of the Related Art

In recent years, memory cards loaded with a nonvolatile memory as storage media of digital cameras and cellular phones have expanded in their market. As the memory card capacity increases, the applications are expanded from recording with small capacity of data files, still images, and others, to recording with large-capacity required for moving pictures. Consequently, various developments have been made with respect to a recording medium including a nonvolatile memory (for example, patent documents 1 through 4).

In recent years, in a NAND type flash memory primarily used for nonvolatile memory of memory cards, a physical block size which is a data erase unit increases from 16 kB (mainly in a flash memory of 128 MB or smaller) to 128 kB (mainly in a flash memory of 128 MB or larger), as the capacity increases. On the contrary, in a file system which manages data writing to a memory card, a cluster which serves as a data write unit has not been changed and remained 16 kB.

In a conventional small capacity memory card (mainly with capacity of 128 MB or less), the cluster capacity when the data is written to the memory card is equal to the physical block which is the erase unit of the NAND type flash memory included in the memory card.

Patent document 1: JP-A-2001-154909.
Patent document 2: JP-A-11-53248.
Patent document 3: JP-A-2002-324008.
Patent document 4: JP-A-05-216780.

BRIEF SUMMARY OF THE INVENTION

However, as the capacity is increased, for example, in the nonvolatile memory of a capacity exceeding 128 MB, 16 kB of the capacity of the cluster as data write unit is different from 128 kB of the capacity of the physical block as erase unit of the NAND type flash memory included in the memory card. This difference gives rise to fragmentation of the file written in the memory card, resulting in deteriorated write performance.

In the write method of the conventional nonvolatile memory under the condition where fragmentation occurs, as described above, there exists problems in that it takes a long time to perform write processing, and that a large number of physical blocks which carry out write and erase operations are required.

In addition, there are various cases of a write request from a host, such as a case for writing data sequentially in a logical address region continuing from a region in which data is already written previously, a case for writing data in an optional region completely different from a region in which data is already written previously, and others. Hence, it is desired to achieve efficient write processing for all access methods.

The present invention is made to solve the above-mentioned problems, and it is an object of the present invention to provide a nonvolatile storage device that does not depend on the access method of the host and can shorten the time required for write processing.

A nonvolatile storage device according to the invention is a storage device to/from which data is written/read with a logical address from (designated by) a host. The storage device includes: a nonvolatile memory to/from which data is written and read with (based on) a physical address and which includes a plurality of physical blocks; a logical/physical conversion table that stores relation information identifying a relationship between a logical address of a logical group and a physical address of a physical group including at least one physical block, the relation information being provided for each (data) management unit; a duplication table that stores duplication information identifying a relationship between the physical address and the logical address of (i) data having a size that is smaller than the data management unit, and (ii) data for which the logical group address is identified in the relation information managed by the logical/physical conversion table; and a controller that controls an operation of the nonvolatile storage device. The controller allows data (which has a logical address that is the same as a logical address of data which is already written in one of management unit region) to be written reduplicatively (i.e., redundantly written) in other management units. Further, the controller has a plurality of write modes to redundantly write the data, and selectively switches the write modes according to a logical address designated by the host, without updating the information on the logical/physical conversion table.

A data write method according to the invention is a method for writing data to a nonvolatile storage device to/from which data is written/read with a logical address designated by from a host. The data writing method includes: providing plural write modes for reduplicatively (redundantly) writing data having the same logical address as data already written in one data management unit, in other data management units; when receiving a write command of data which has the same logical address as the already written data from the host, redundantly writing the data requested to be written in a management unit region different from the management unit region storing the already written data, and storing the logical address and physical address of the data written in the different data management unit, while associating the logical address with the physical address; and selectively switching write mode in accordance with the situation of change in logical address from the host, when a write command is continuously received from the host thereafter.

According to the present invention, when data is written in a certain logical address in a nonvolatile memory and then another data is re-written in the same logical address, duplication (redundant) writing is allowed, which writes the another data newly in a physical region different from the physical region in which the data is written previously while holding and not erasing the data previously written in the physical address. This can reduce the number of copying and erasing processing due to data update, which is specific property of a nonvolatile memory, and improve efficiency in writing processing. Furthermore, a write mode is selectively switched in accordance with change in a write address, and thus the write processing can be implemented in more optimum method without depending on the type (sequential access or random access) of write requests from the host.

BRIEF DESCRIPTION OF DRAWINGS

FIG. 6A is an illustration that shows a configuration of the duplication information for a Fat area and FIG. 6B is an illustration that shows a configuration of the duplication information for a data area.

FIG. 8 is an illustration that shows a configuration of a write unit allocation table.

FIG. 11A is an illustration for explaining a conventional write processing.

FIG. 23A is an illustration that summarizes various management conditions concerning FAT information.

FIG. 23B is an illustration that indicates data configuration example of a Fat area conversion table.

FIG. 24A is an illustration that indicates a regional configuration of a physical block corresponding to logical group 0-2 for FAT2.

FIG. 24B is a flowchart of a FAT write processing.

FIG. 30 is an illustration that explains a specific example of an operation in the continuous write mode.

FIG. 36 is an illustration that explains a specific example of an aggregation processing of an overwritten block.

FIG. 37 is an illustration that explains a specific example of an operation in the random write mode.

REFERENCE ELEMENTS

Figure 1:
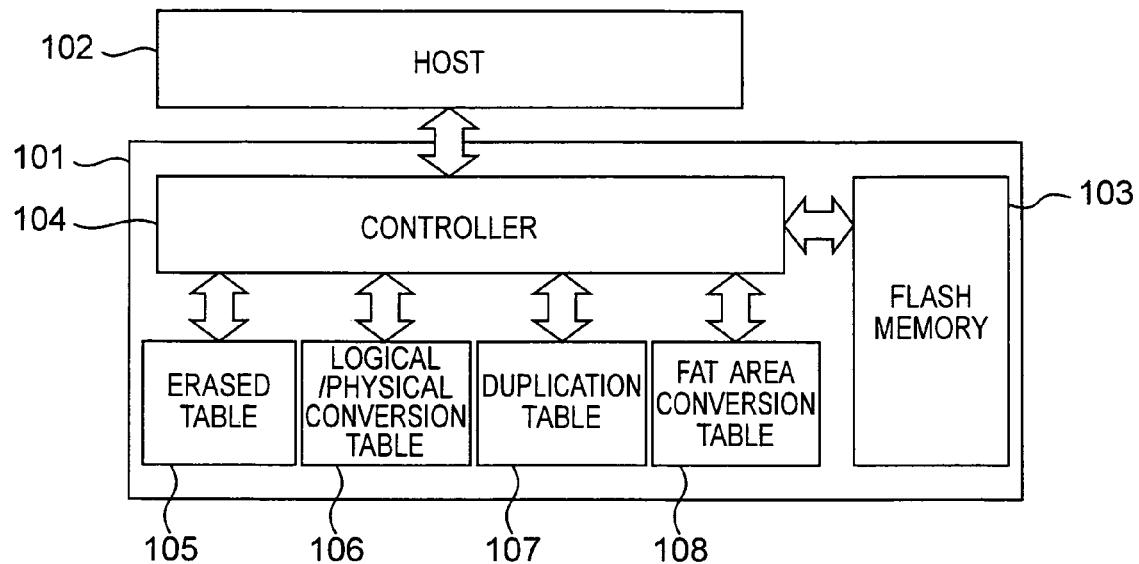
FIG. 1A is an illustration that shows a configuration of a memory card which is one embodiment of a nonvolatile storage device according to the present invention.
FIG. 1B is an illustration that shows a configuration of a logical/physical conversion table.

101 Memory card
102 Host
103 Flash memory
104 Controller
105 Erased table
106 Logical/physical conversion table
107 Duplication table
107a Duplication information for Fat area
107b Duplication information for data area
108 Fat area conversion table
150 Write unit allocation table

DETAILED DESCRIPTION OF THE INVENTION

Referring now to the drawings, a memory card which is one embodiment of the nonvolatile memory device related to the present invention and its writing method are described specifically below.

1. Memory Card Configuration

FIG. 1A shows a configuration of a memory card, one embodiment of the nonvolatile storage device according to the present invention. A memory card 101 is a storage device from and to which data can be read and written by a host 102. The memory card 101 contains a flash memory 103 as a nonvolatile storage element, a controller 104 which controls data writing and reading for the flash memory, an erased table 105, a logical/physical conversion table 106, a duplication table 107, and a Fat area conversion table 108.

The flash memory 103 has 128 MB capacity in the present embodiment. It is noted that the capacity of the flash memory 103 is not limited to this, and that a plurality of flash memories may be provided. The controller 104 receives write and read commands from the host 102 and controls data storage to the flash memory 103 or data readout from the flash memory 103.

The data stored in the flash memory 103 is managed by a FAT file system as one of the file systems. The FAT file system includes file management information (hereinafter called "FAT information") containing a master boot record partition table which stores information for dividing and managing a data recording region into multiple regions called partitions, partition boot sector which stores management information in one partition, FAT tables 1 and 2 that indicate the storage position of data included in the file, and root directory entry which stores information on files and directories existent right below the root directory. The other kinds of file systems may be used.

The erased table 105 stores information that indicates whether each of the physical blocks inside the flash memory 103 is erased or written, respectively. The logical/physical conversion table 106 is a table for converting an address ("logical address") designated by the host 102 into an address in the flash memory 103 ("physical address").

The logical/physical conversion table 106 stores, an address of a physical block that corresponds to a logical group in an address region that corresponds to the logical group address. FIG. 1B shows a simple configuration of the logical/physical conversion table 106. The logical/physical conversion table 106 has a physical address that corresponds to a logical address as the table data with the logical group address corresponding to a table address. When there is no corresponding physical block, the logical/physical conversion table has an invalid value (0x0000 in the present embodiment) as data. The logical/physical conversion table 106 takes a configuration including two regions including one region which corresponds to logical blocks 1 through 999 and the other region which corresponds to logical groups 0-0 through 0-3. This, as discussed later, is caused by features of the present invention handling the logical address by dividing into the Fat area and the data area.

In the present embodiment, in the flash memory 103, it is allowed to write data which has the same logical address as another data which has already been written to a certain physical block A into a physical block B different from the physical block A (this is called "duplication write"). The duplication table 107 is a table that stores corresponding information between the physical address and logical address concerning the data written in such a duplication (redundant) write manner. The Fat area conversion table 108 stores information concerning a boundary sector of regions storing FAT information such as FAT1 and FAT2 in the flash memory 103.

That is, when data is re-written in a logical address after other data is written in a physical address corresponding to the same logical address, the memory card 101 of the present embodiment enables the data to be written in a physical block different from a physical block which stores the previously written data, while not erasing and holding the previously written data. The memory card 101 stores the logical address and physical address to which data is newly written in the duplication table 107, and simultaneously stores the relation between the physical block to which the other data is previously written and the physical block to which the data is newly written. That is, the duplication table 107 associates and stores the logical address to which the data is written, the physical region (source) to which the other data is previously written with respect to the logical address, and the physical region (destination) to which the data is newly written with respect to the logical address.

In other words, the duplication table 107 is a table which stores information on the data written in a physical block (destination) to which the data written only for the physical region of the flash memory 103 is written and which contains unwritten physical pages. It may be said that the duplication table 107 stores information on the address of the physical block (destination) which has unwritten region, the address of the block (source) including old data, the logical group address of the data written therein, etc.

Figure 2:
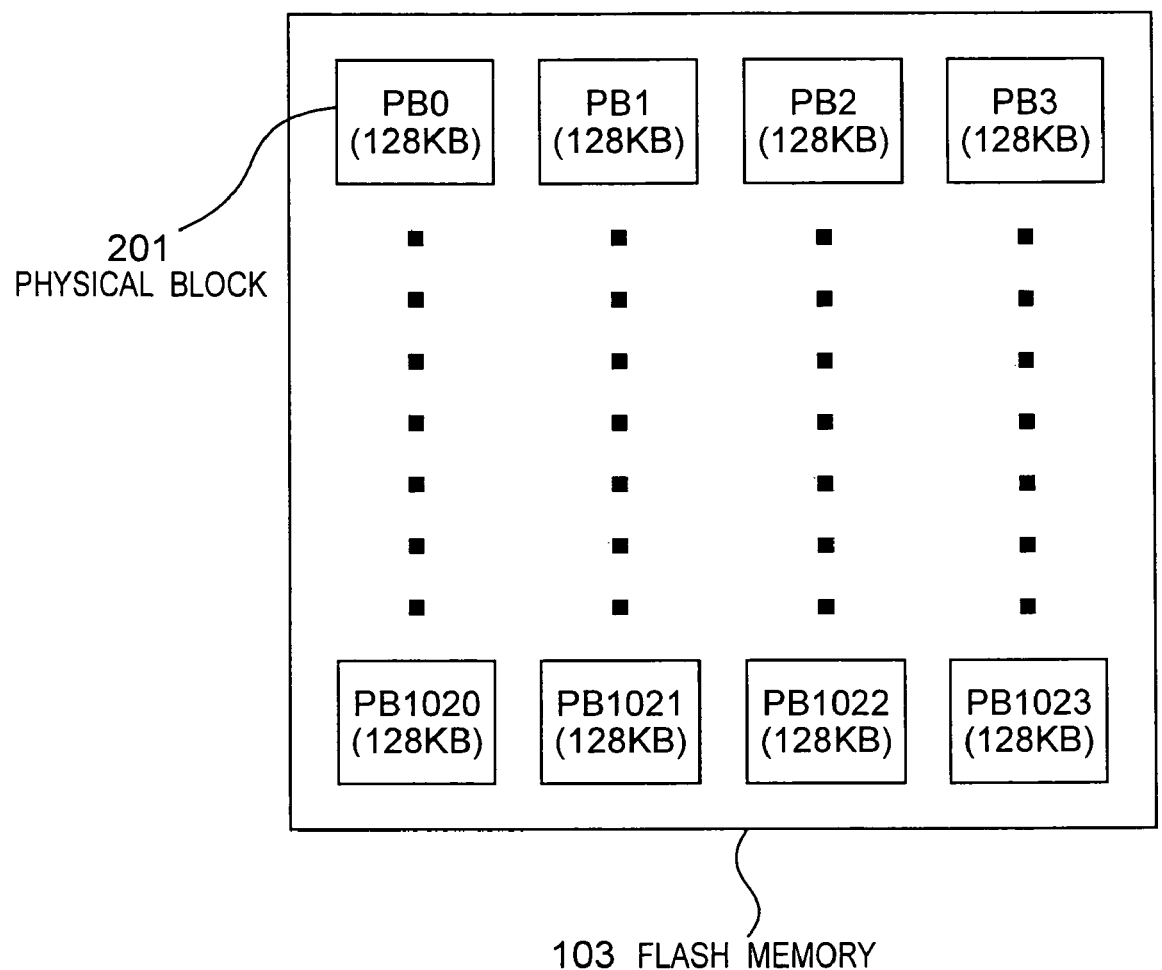
FIG. 2 is an illustration that shows an inside configuration of a flash memory.

FIG. 2 is an illustration that indicates an internal configuration of the flash memory 103. The recording region of the flash memory 103 contains a plurality of physical blocks 201. The physical block 201 is an erasing unit that has 128 kB of data size and can be erased on the block. In the present embodiment, one physical block is handled as a data management unit, but a plurality of physical blocks may be all put together and handled as a data management unit.

Figure 3:
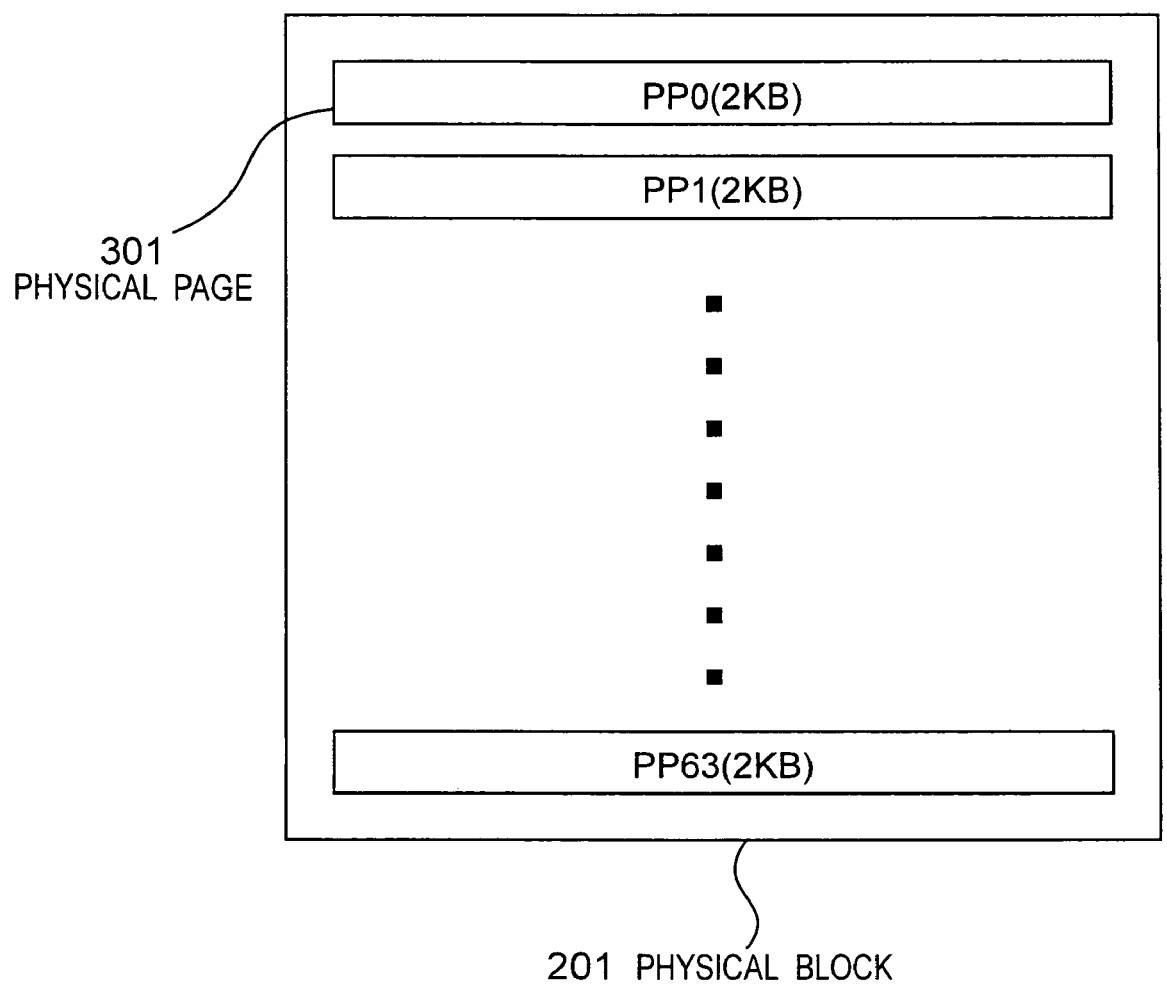
FIG. 3 is an illustration that shows a configuration of a physical block of the flash memory.

FIG. 3 is an illustration that shows a configuration inside the physical block 201. The physical block 201 includes a plurality of physical pages 301. The physical page 301 is a write unit used for data writing and has a size of 2 kB. The cluster which is the unit for the host 102 to logically write data is 16 kB, but this value does not coincide with 128 kB which is the capacity of the physical block 201 nor 2 kB which is the capacity of the physical page 301. Thus, a partial physical block of 16 kB capacity is formed by consecutive eight physical pages. The partial physical block (16 kB) is a data unit which the controller 103 logically handles, in considering data writing by the host. One physical block 201 has eight partial physical blocks, and the data from the host 102 is written in a partial physical block unit.

Figure 4:
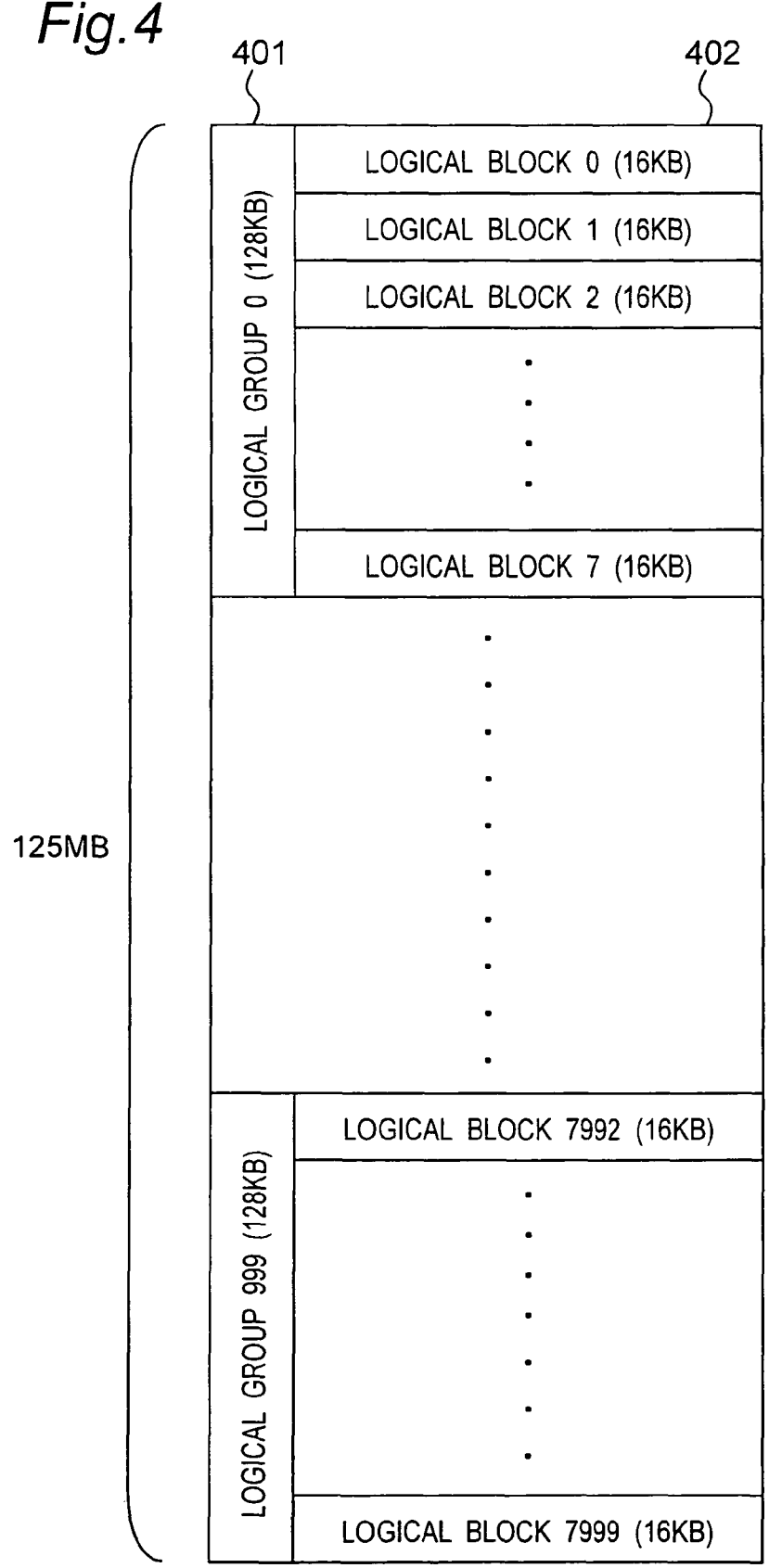
FIG. 4 is an illustration that shows logical data management in the memory card.

FIG. 4 is an illustration that indicates logical data management inside the memory card 101. The storage capacity of the flash memory 103 loaded in the memory card 101 is 128 MB. In general, since the flash memory 103 has initial defective blocks and defective blocks are generated by repeating rewriting operation, a slightly smaller capacity is assigned for the capacity of the memory card 101 in advance. In the present example, the capacity, which the host 102 can recognize, is set to 125 MB. The 16-kB of data unit which is a unit written from the host 102 is assigned to a logical block 402, and blocks 0 to 7999 are assigned sequentially to 125 MB capacity of memory card 101. Eight of these logical blocks composes a logical group of 128-kB which is equal to the physical block as the erase unit of the flash memory 103.

Figure 5:
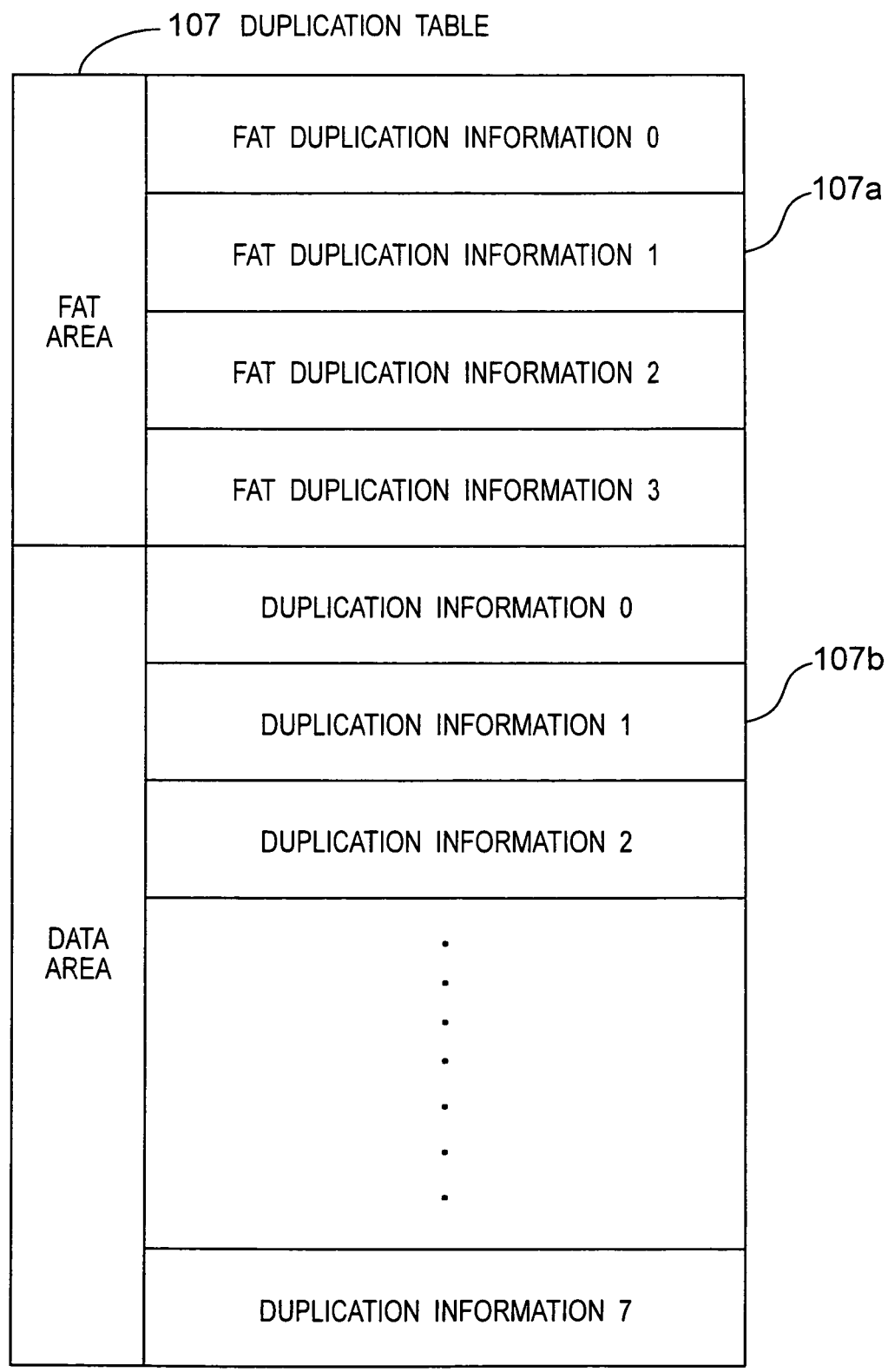
FIG. 5 is an illustration that shows a configuration of a duplication table.

FIG. 5 is an illustration that indicates a configuration of the duplication table 107. The duplication table 107 stores duplication information (FAT duplication information) 107a for a region ("Fat area") which stores FAT information mainly in the flash memory 103, and duplication information 107b for a region ("data area") which stores user data. In the present example, the duplication information 107a for the Fat area has four records (FAT duplication information 0 through 3), and the duplication information for the data area has eight records (duplication information 0 through 7), but the number of records of the duplication information is not limited to this.

FIG. 6A shows a configuration of FAT duplication information 107a. In the FAT duplication information 107a, the field of "destination physical block address" stores an address of a physical block as a transfer destination. The field of "destination allocation physical page" stores the number of a physical page assigned as a transfer destination. FAT duplication information 107a does not store information concerning a transfer source. This is because, as described later, with respect to the Fat area, the subsequent data is written in a physical block same as a physical block to which data was written previously, and consequently, the physical block of the source is same as that of the destination.

FIG. 6B shows a configuration of duplication information 107b for the data area. In the duplication information 107b, the field of "logical block address" stores an address of a logical block of write data. The field of "source physical block address" stores an address of a physical block of the transfer source. The field "destination physical block address" stores an address of a physical block as the transfer destination. The field of "destination top page logical address" stores a logical address of data stored in the top page of the physical block of the destination.

The field of "destination next write logical address" stores a logical address of head of data to be written next in a physical block as the destination. That is, the address following the logical address of the data lastly written in the physical block of the destination is stored. The field of "destination next write physical address" stores a start physical address for writing next data in the physical block as the destination. That is, the physical address at the head of the erased region in the destination physical block is stored.

The field of "destination write mode" stores the value that indicates a write mode. There are 3 write modes: "sequential mode," "overwrite mode," and "random mode." The following values indicate the relevant modes:

Sequential mode: 0x0000h
Overwrite mode: 0xFFFFh
Random mode: Other than the above (write cycle in the random mode)

The field of "destination valid offset physical address" stores offset values from the head of the destination physical block with respect to the data most recently written in the destination physical block.

Figure 7:
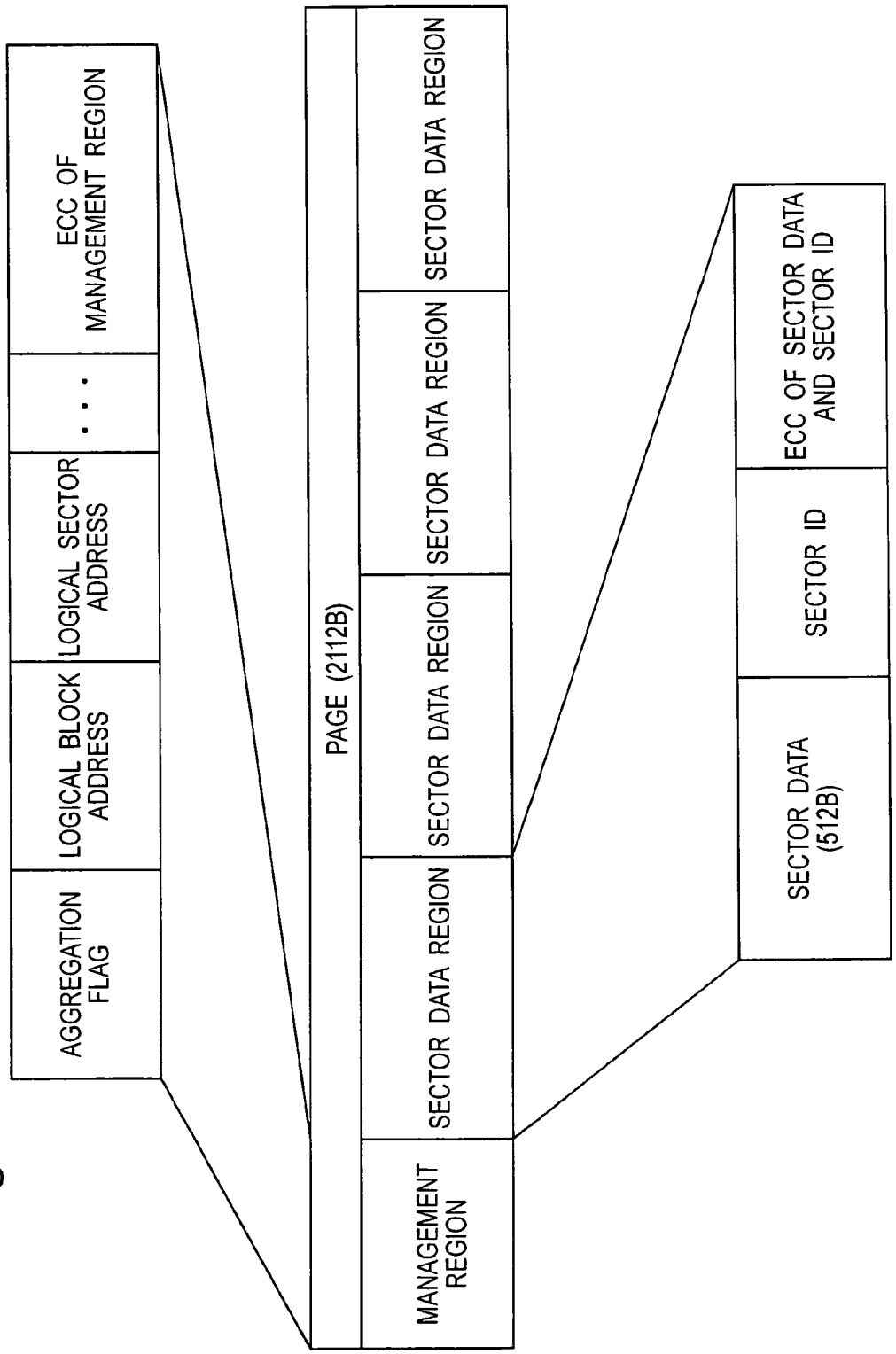
FIG. 7 is an illustration that shows a data format of a page of a storage region of the flash memory.

FIG. 7 shows a data format of a storage region of flash memory 103. In each page, there is a management region which stores control information on the page and a sector data area which stores the data. In the management region, aggregation flag, logical block address, logical sector address, ECC (Error Correction Code) of the management region, etc. are stored. In the sector data area, sector data, sector ID, and ECC for the sector data and the sector ID are stored.

FIG. 8 shows a configuration of a write unit allocation table. The write unit allocation table 150 is stored in a management region in the flash memory 103. The write unit allocation table 150 is used for data writing in the random mode and FAT writing.

In writing in the random mode, the "write unit" field stores the minimum write data size when writing is carried out in the random mode. Data writing in a data unit smaller than the write unit is prohibited. The write unit is set, for example, to 0x0010h (16 sectors), 0x0020h (32 sectors), and 0x0040h (64 sectors). The number of write units contained in one physical block (=64 pages) varies in accordance with the size of write unit. For example, When the value of write unit is 0x0020h (32 sectors (=8 pages)), 8 write units are included in one physical block. FIG. 8 shows a configuration of the unit allocation table 150 when the value of the write unit is 0x0010h (16 sectors (=4 pages)). In such event, 16 (F) write units (write unit 0 to write unit F) are included in one physical block. The field of "start address of write unit 0" stores a value of a start physical address of a region in which the first write unit data is written out of the 16 write units. The field of "start address of write unit n" stores a value of a start physical address of a region in which the (n+1)th write unit is written.

In FAT writing, the field of "write unit" is a fixed value for each of logical groups to be written (size of the write unit of FIG. 23A). Consequently, the number of write units contained in one physical block (=64 pages) varies in accordance with logical groups.

2. Operation of Memory Card

The operation of the memory card 101 which has the above-mentioned configuration is described as follows.

2.1 Write Operation

Figure 9:
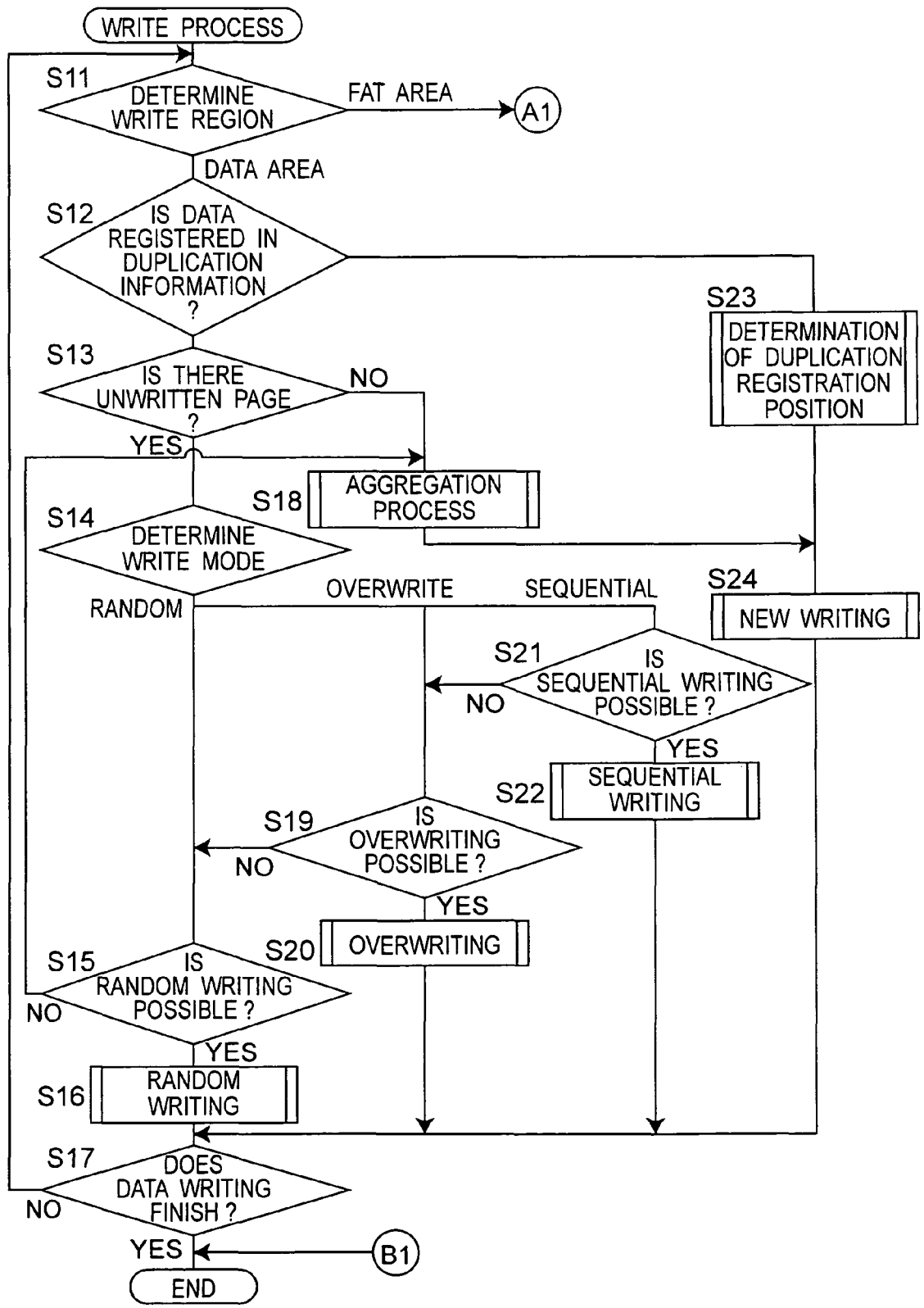
FIG. 9 is a flowchart that indicates a write processing to the flash memory of the memory card.
Figure 10:
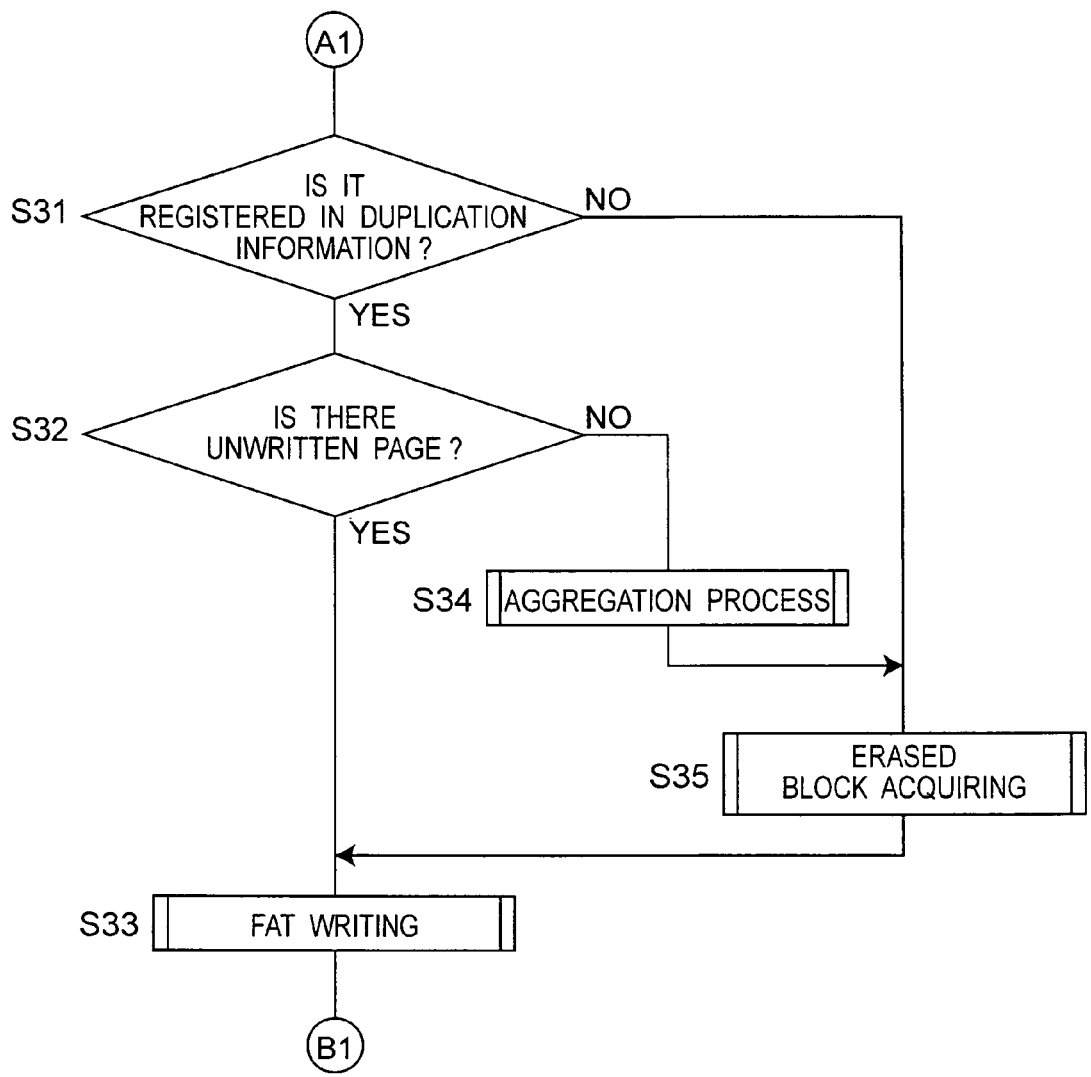
FIG. 10 is a flowchart that shows the write processing to the flash memory of the memory card (continued from FIG. 9).

Referring now to FIG. 9 and FIG. 10, a write processing to the flash memory 103 in the memory card according to the present embodiment will be described.

In FIG. 9, when receiving a write command from the host 102, the controller 104 of the memory card 101 determines whether a region in which the data is to be written is the Fat area or the data area in the flash memory 103 based on a write logical addresses specified by the host 102 (S11). If the Fat area, a processing shown in FIG. 10 is executed (the detail will be discussed in later). It is noted that the host 102 specifies a data write region with a logical sector address.

When the data area, the controller 104 refers to the duplication table 107 and judges whether or not the specified logical address is registered (S12). This judgment is performed by referring to "logical block address" of duplication information of the duplication table 107 and judging whether or not the value is equal to the logical block address specified by the host 102. The logical block address can be determined by the quotient by dividing the logical sector address by the physical block size of the flash memory which is the management unit.

When there is no registration on the duplication table 107, new writing is carried out in the physical block (S24) after determining the registration position in the duplication table 107 (S23). The detail of these processing will be later discussed.

When there is registration in the duplication table 107, it is judged whether or not there is any unwritten region (erased region) in the destination physical block (S13). This can be judged from the value of the field of "destination next write physical address" of the duplication information 107b. That is, when the value of the field of "destination next write physical address" is smaller than 0x0100 (physical block size), it is judged that there is an unwritten region. When it is equal to 0x0100, it is judged that there is no unwritten region.

When there is no unwritten page, an aggregation processing is carried out (S18), while when there is any unwritten page, the write mode is judged from the value of the field of "destination write mode" of the duplication information 107b (S14).

When the write mode is the random mode, it is judged whether or not random writing is enabled (S15). This judgment is made as follows. When the value of "write mode" of the duplication information 107b is "sequential mode", it is judged that the random writing is "possible" when the "destination next write physical address" is not more than the write cycle (for example, 0x0040). Otherwise, it is judged that the random writing is "impossible." Now, the write cycle is a specified data size when writing is carried out and writing in a data size smaller than the write cycle is impossible. When the value of "write mode" indicates "overwrite mode," the random writing is judged "possible" when an error between "destination top page logical address" and "destination next write logical address" coincides with the write cycle (for example, 0x0010, 0x0020 or 0x0040). Otherwise, the random writing is judged "impossible."

When the random writing is possible, the random writing is carried out (S16). When the random writing is impossible, the aggregation processing is carried out (S18).

When the write mode is the overwrite mode, first of all, it is judged whether or not overwriting is possible (S19). This judgment is performed as follows. When the value of "write mode" of the duplication information 107b indicates "sequential mode" and the logical address specified by the host 102 is not less than the value of "destination top page logical address," overwriting is judged "possible." Otherwise, overwriting is judged "impossible." When the value of "write mode" is "overwrite mode," if the logical address specified by the host 102 is not less than the value of "destination top page logical address" and smaller than the "destination next write logical address," overwriting is judged "possible." Otherwise, overwriting is judged "impossible."

When the overwriting is possible, the overwriting is performed (S20). When the overwriting is impossible, the operation proceeds to step S15.

When the write mode is the sequential mode, first of all, it is judged whether or not the sequential writing is possible (S21). When the value of "destination next write logical address" is smaller than the logical address specified by the host 102, the sequential writing is judged "possible." Otherwise, the sequential writing is judged "impossible." When the sequential writing is possible, the sequential writing is carried out (S22). When the sequential writing is impossible, the operation proceeds to step S19.

When the write processing (S16, S20, S22, and S24) is completed, it is judged whether or not transfer of write data from the host 102 is continued (S17). When a command indicating "end" is transmitted from the host 102, the processing is ended.

Otherwise, the operation is returned to step S11, repeating the above processing.

As described above, the memory card 101 of the present embodiment has a random mode in which writing is carried out in an optional logical address region which is not related to the last write address, an overwrite mode in which writing is carried out in the logical address region same as the logical address region in which data is written right before, and a sequential mode in which writing is carried out in the continuous logical address region, and selectively switches these modes in accordance with change in a logical address received from the host. By switching the write mode in this way, the optimum write processing which meets the write status can be achieved, and write processing efficiency can be improved.

The memory card of the present embodiment has three write modes, but it may not always have all these three write modes and may have only one or two write modes according to applications.

Each write processing will be more specifically explained below.

2.1.1 Sequential Writing

Explanation will be made on the concept of the sequential write processing in the present embodiment. Before explaining the concept of the sequential write processing in the present embodiment, changes of data arrangement inside the flash memory by the conventional write processing will be discussed.

The case in that data is erased and written as shown in FIG. 11A is considered. Under the state of FIG. 11A (a), in the data area, file 1 is written in cluster 2 and cluster 3, and file 2 is written in cluster 4, and file 3 is written in cluster 5 and cluster 6, and file 4 is written in cluster 7, and file 5 is written in cluster 8 and cluster 9.

FIG. 11A (b) shows the state which changes from the above situation in which files 1, 3 and 5 are erased by the host 102. The host 102 logically erases files 1, 3, and 5 by rewriting all the cluster values related to files 1, 3, and 5 into "0000", while not writing or erasing any data in the data area inside the flash memory 103. Thus, the region where files 1, 3, and 5 existed in the data area is recognized as free region by the host 102.

FIG. 11A (c) shows the sate which changes from the above situation in which the host 102 writes a new 96 KB file. In FAT1, a new file is written to clusters to which "0000" indicating free region is written.

As described above, the host 102 erases a file written in the memory card 101 and writes a new file.

Figure 11B:
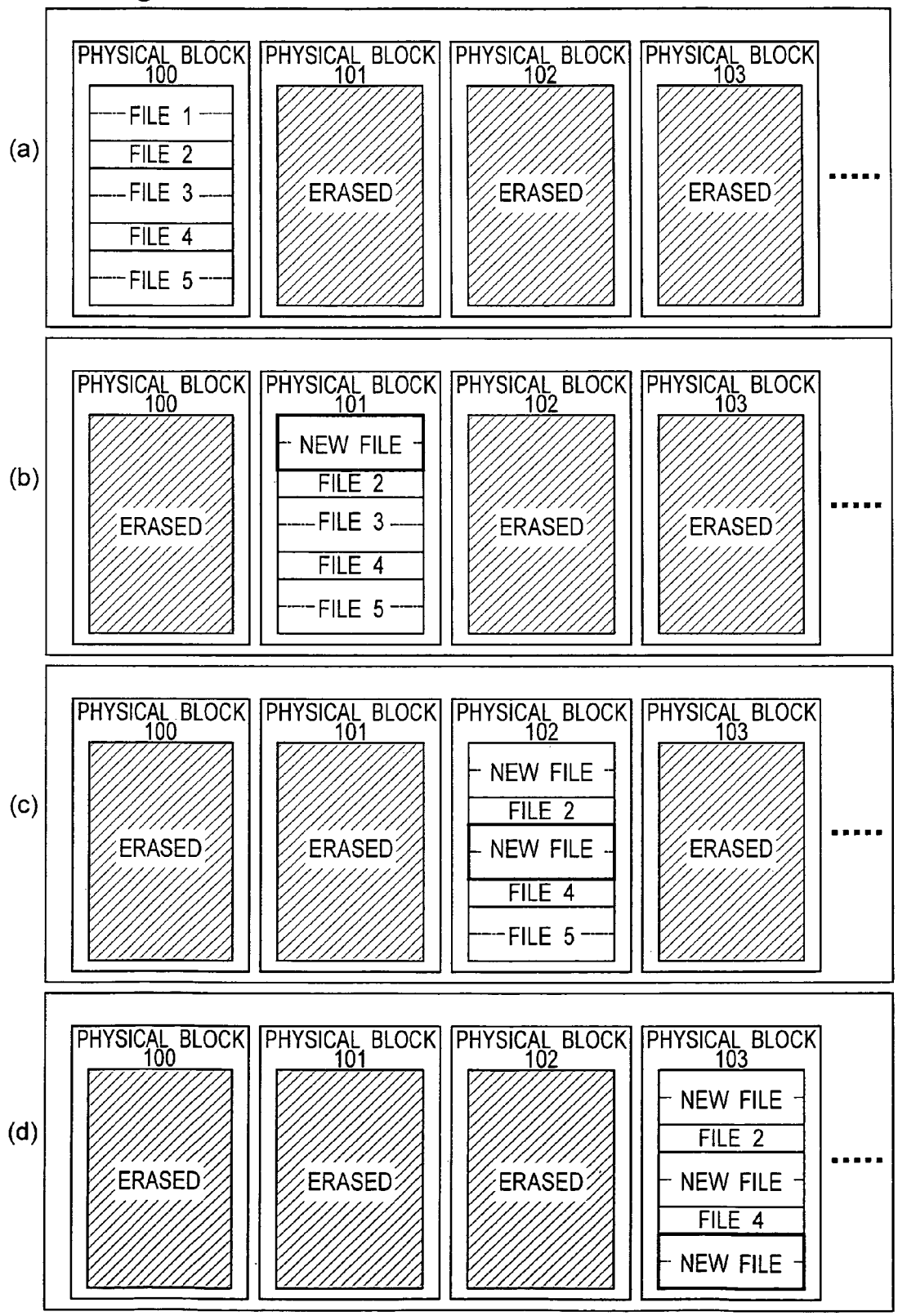
FIG. 11B is an illustration for explaining a conventional write processing.

Referring now to FIG. 11B, description will be made on the conventional processing inside the memory card 101 for erase and write processing.

FIG. 11B (a) indicates a data configuration inside the flash memory 103, in which files 1 through 5 are written in the physical block 100. Physical blocks 101 through 104 are erased blocks. Even when a situation changes from the above situation to that shown in FIG. 11B (b) in which files 1, 3, and 5 are logically erased, the situation of the physical block 100 remains unchanged and remains as shown in FIG. 11B (a).

Then, when the host 102 writes a new file in the memory card 101, since clusters to which a new file is written are divided into tree portions (clusters 2 and 3, clusters 5 and 6, and clusters 8 and 9), the host 102 must divide write data into three portions and write the data in three times to the memory card.

First of all, in another erased physical block 101, a part of a new file is written in a region which corresponds to the erased file 1, and file 2 through 5 are copied to the remaining region of the physical block 101. Then after writing, the physical block 100 is physically erased. By this, the situation is changed to that shown in FIG. 11B (b).

Then, in another erased physical block 102, a part of the data of a new file is written in a region that corresponds to the erased file 3, and data is copied from the physical block 101 to the other region. Thereafter, the physical block 101 is physically erased, resulting in the situation of FIG. 11B (c).

Furthermore, in another erased physical block 103, apart of the new file data is written in a region corresponding to the erased file 5, and data is copied from the physical block 102 to all other region of the physical block 103. Thereafter, the physical block 102 is physically deleted. This brings about the condition of FIG. 11B (d).

As described above, conventionally, even though data is written in only one logical group, writing and erasing must be carried out for 3 physical blocks, resulting in much time for the writing processing.

Figure 11C:
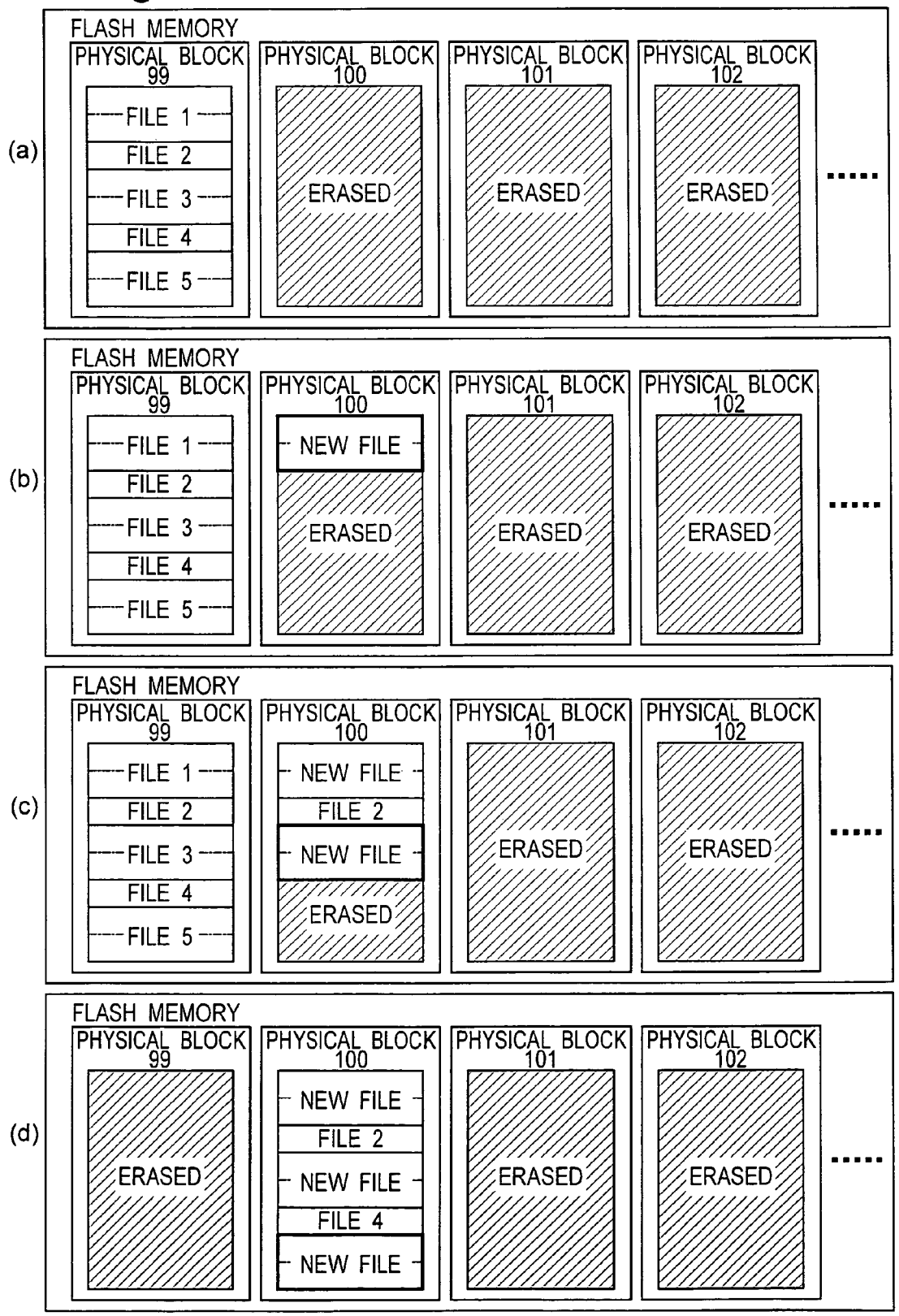
FIG. 11C is an illustration for explaining a sequential write processing of the present invention.

Referring now to FIG. 11C, next discussion will be made on the overwriting operation by the present embodiment.

As shown in FIG. 11C (a), first of all, data of files 1 through 5 are stored in the physical block 99. Physical blocks 100 through 102 are erased blocks. Under this situation, a case in that a new file is divided and written to logical address regions same as logical address regions in which files 1, 3 and 5 are recorded respectively, is considered. The memory card 101 refers to the erased table 105, retrieves the erased physical block 100, and records a part of the new file in the physical block 100 (see FIG. 11C (b)). In such event, the logical address is related to the physical address for the new file in the duplication table 107, and at the same time the new file is related to file 1 in the physical address. In such event, the logical block 99 is not changed. Subsequently, apart of a next new file is recorded at the position corresponding to file 3 in the physical block 100. In such event, the memory card 101 writes the new file after copying the data of file 2 in the physical block 99 (see FIG. 11C (c)). At the time, the logical address is related to the physical address for the new file in the duplication table 107, and at the same time the physical address of the new file is related to the physical address of file 3. Similarly, in the physical block 100, after the data of file 4 is copied, apart of the new file is written, and then the physical block 99 is erased (see FIG. 11C (d)). At this moment, in the duplication table 107, relation between the physical block 99 and physical block 100 is resolved.

As described above, the duplication table 107 relates the logical address to the physical address for new data which has the same logical address as the previously written data and is written in different physical blocks from the previously written data, and also relates the physical block of the previously written data and the physical block of the new data. By equipping such duplication table 107, the frequency of copying and erasing of data to other physical blocks due to data overwriting can be reduced, thus improving the write efficiency.

Figure 12:
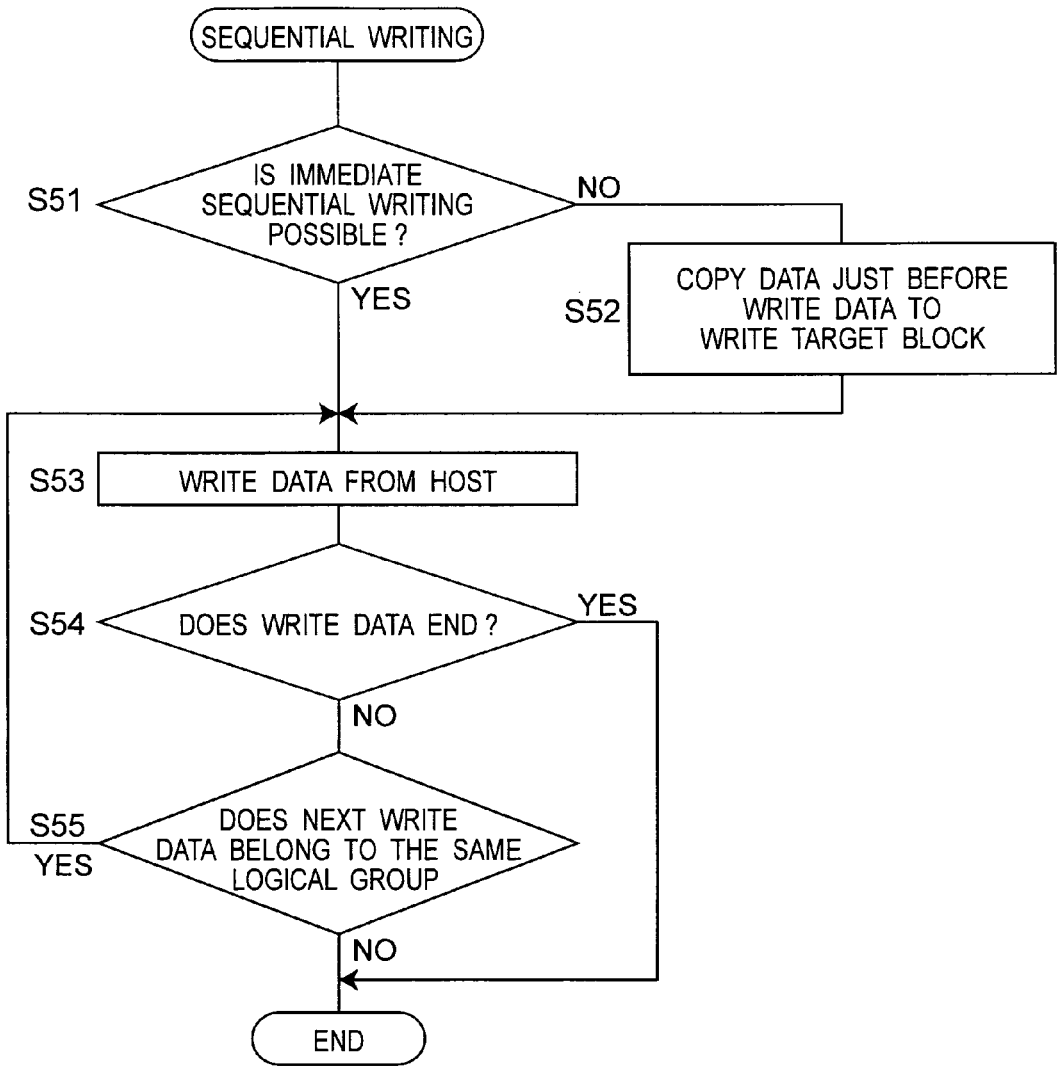
FIG. 12 is a flowchart of the sequential write processing.

Referring now to the flowchart of FIG. 12, the sequential write processing will be described in detail.

First of all, whether or not sequential writing is possible is immediately judged (S51). Specifically, when "destination next write logical address" of registered duplication information 107b is equal to the logical address designated by the host 102, it is judged that sequential writing is immediately possible. When it is smaller than the logical address designated by the host 102, it is judged "impossible."

When writing is "impossible," the corresponding data in the source physical block is copied to the region from the address indicated by "destination next write physical address" to the logical sector address designated by the host 102 (S52). In such event, "destination next write logical address" and "destination next write physical address" of the duplication information 107b are updated in accordance with the write situation.

Thereafter, the data transferred from the host 102 is written in the designated region in page units (S53). In such event, "destination next write logical address" and "destination next write physical address" of the duplication information 107b are updated in accordance with the write situation.

It is judged whether or not write data transfer from the host 102 is competed (S54). When a command indicating "end" is transmitted from the host 102, it is judged that the write data is completed. When the data transfer from the host 102 continues, it is judged whether or not the next written region is of the same logical group (S55). If it is the same logical group, data writing is continued (S53). When "destination next write logical address" is 0x0100, it is judged that the written region is of a different logical group, while when it is less than 0x0100, it is judged that the written region is of a same logical group. When it is a different logical group, the processing is ended.

2.1.2 Overwriting

Figure 13:
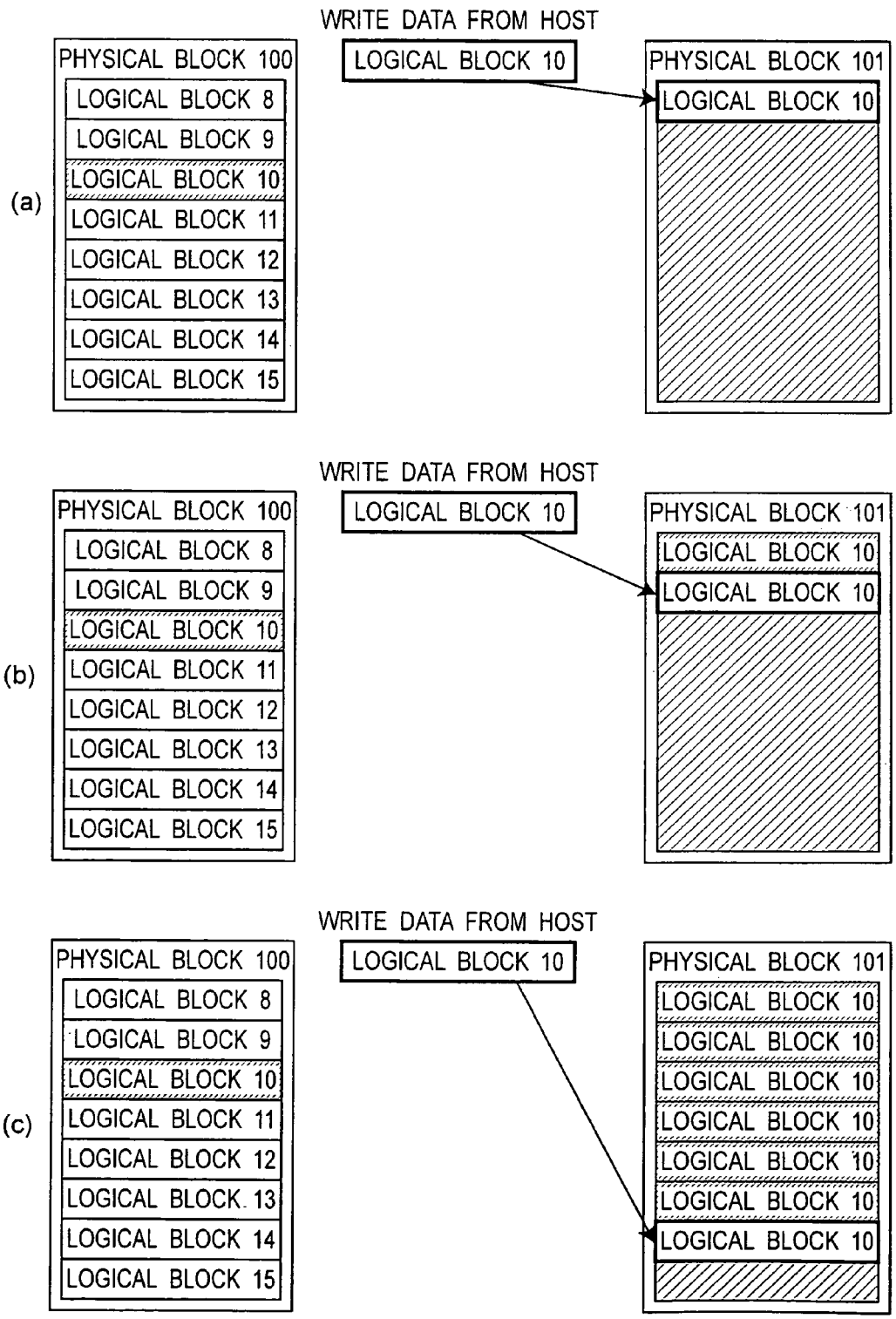
FIG. 13 is an illustration for explaining an overwrite processing.

Referring now to FIG. 13, discussion will be made on the concept of the overwriting processing in the present embodiment. Referring to FIG. 13A, when data is stored in logical blocks 8 through 15 of the physical block 100 respectively, the controller 104 obtains from the logical/physical conversion table 106 the physical block 100 that corresponds to the logical group 0 to which the logical block 10 belongs, for the writing from the host 102 to the logical block 10. Further the controller 104 obtains the physical block 101 which is an erased block from the erased table 105. Then the controller 104 writes the data from the host 102 as a logical block 10 and stores information concerning the physical block 101 with unwritten pages still left in the duplication table 107.

Thereafter, when the host 102 further writes information to the logical block 10 which is the same logical block, the controller 104 obtains the physical block 100 that corresponds to the logical group 0 to which the logical block 10 belongs from the logical/physical conversion table 106. Then, referring to the duplication table 107, the controller 104 obtains the physical block 101 which has unwritten pages and to which the data of the same logical group 0 has been written, and writes the data from the host 102 as the logical block 10, stores information concerning the physical block 101 with unwritten pages still left in the duplication table 107, and finishes the writing process. The state resulted from the above operation is shown in FIG. 13B. The time required for this processing is likewise 2880 μs.

FIG. 13C shows a state after multiple times of writing are carried out continuously to the logical block 2 which is the same logical block from the host 102 thereafter.

As described above, in the present embodiment, when the writing to the same logical block continuously occurs, the writing is carried out to one physical block continuously and to only the logical block to which the writing occurs. Hence, the time required for rewriting the logical block can be reduced.

Figure 14:
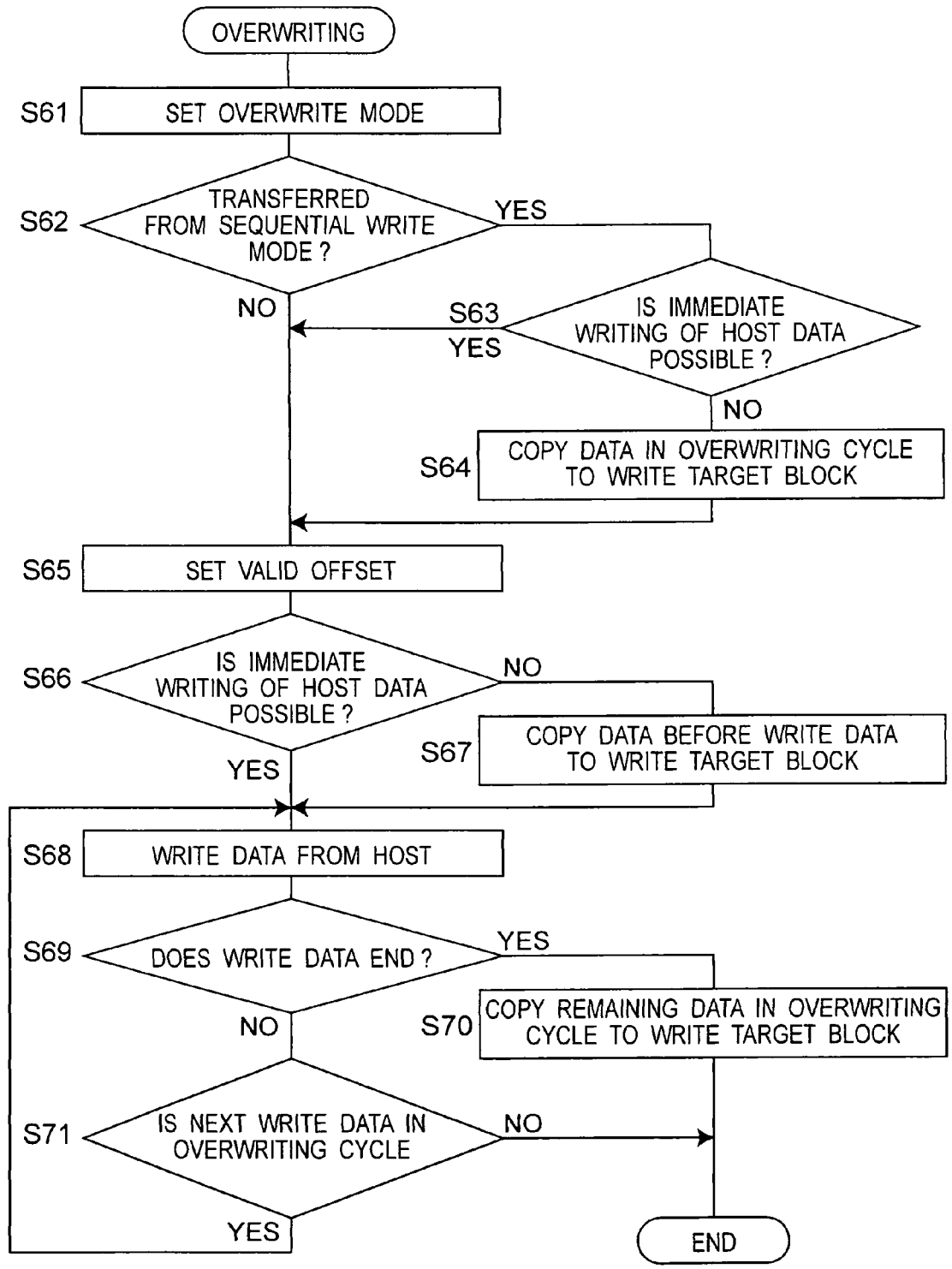
FIG. 14 is a flowchart of the overwrite processing.

Referring to the flowchart of FIG. 14, the overwriting processing is described in detail. Initially, the mode is set to an overwrite mode (S61). The value of the field of "destination write mode" of the duplication information 107b is set to a value indicating "overwrite mode."

It is judged whether or not it is the transfer from the sequential mode (S62). This judgment is carried out with reference to "destination write mode" of the duplication information 107b. If it is the transfer from the sequential mode, it is judged whether or not the host data is immediately able to be written (S63). This judgment is carried out by judging whether or not the previous writing was performed in such a manner as to satisfy the write cycle. That is, it is judged that, in the physical block to be written, the boundary of the region in which data is already written is aligned to the write cycle.

Specifically, it is judged whether or not the total size of pages in which data is already written is a power-of-two value. To be more specific, when "destination next write physical address" of the duplication information 107b falls under 0x0004, 0x0008, 0x0010, 0x0020, 0x0040, or 0x0080, it is judged that the overwriting is immediately possible, while otherwise, it is judged that it is impossible.

When the immediate writing is impossible, deficit data is copied to the write target block so as to satisfy the cycle (S64). That is, data from the address indicated by "destination next write physical address" to the address which provides page size which becomes power-of-two after data writing is copied so that the logical blocks become continuous from the source physical block to the destination physical block. In such event, "destination next write logical address" and "destination next write physical address" are updated in accordance with the write situations.

Next, a valid offset is set (S65). The value of "destination next write physical address" is written to "destination valid offset physical address".

Thereafter, it is judged whether or not the host data can be immediately written (S66). When "destination top page logical address" of the registered duplication information and the logical sector address designated by the host belong to the same page, it is judged that the writing is possible. When they do not belong to the same page, it is judged that the writing is impossible.

When it is judged to be impossible, the data before the write data is copied to the write target block (S67). The data from the address indicated by the field of "destination top page logical address" to the address right before the sector address designated by the host 102 is copied from the source physical block to the destination physical block. In such event, the field of "destination next write physical address" is updated in accordance with the write situation.

Then the data transferred from the host 102 is written in page units (S68). In such event, the field of "destination next write physical address" is updated in accordance with the write situation.

It is judged whether or not write data transferred from the host 102 is finished (S69). When the data transfer from the host 102 is completed, the remaining data of the overwrite cycle is copied to the write target block (S70). When the data transfer from the host 102 continues, it is judged whether or not the region to be next written is of the same logical group (S71). When the region is of the same logical group, the data writing is continued (S68), while when the region is of a different logical group, the processing is ended.

2.1.3 Random Writing

In the present embodiment, the random writing is writing in which a logical address of data which has already been written in the destination physical block and a logical address of data to be newly written are not continuous nor duplicate.

Figure 15:
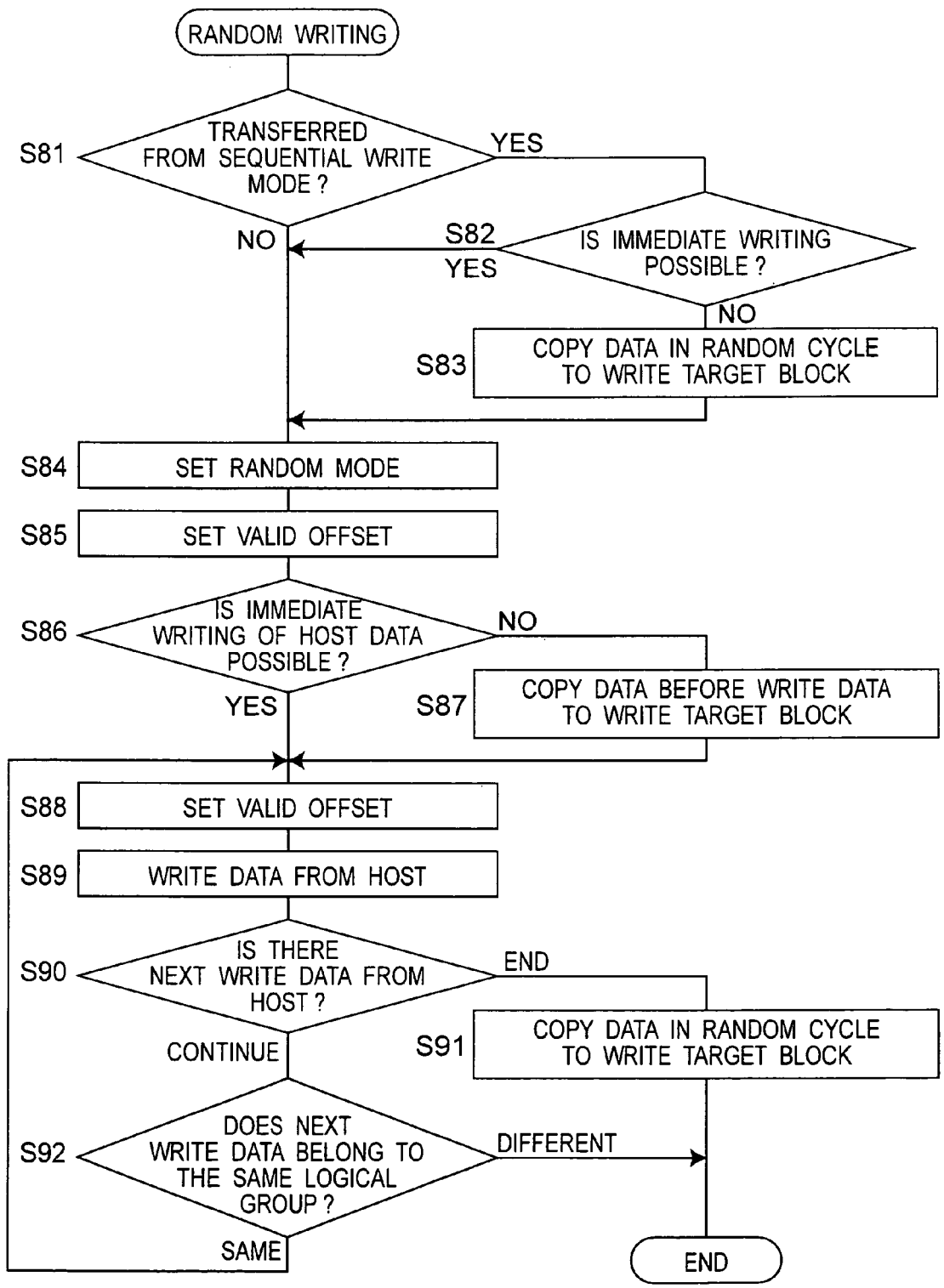
FIG. 15 is a flowchart of a random write processing.

Referring to the flowchart of FIG. 15, the random writing processing will be described in detail. At first, referring to "destination write mode" of the duplication information 107b, it is judged whether or not the mode is a random mode (S81).

When not random mode, it is judged whether or not the host data can be immediately written (S82). Similarly to the overwriting, this judgment is made by judging whether or not the previous writing is performed so as to satisfy the write cycle. When immediate writing is impossible, the deficit data is copied to the write target block in such a manner as to satisfy the write cycle (S83).

Thereafter, the mode is set to a random mode (S84). When the value of "destination write mode" of duplication information 107b is "overwrite mode," the value of "destination next write physical address" is written to the "destination write mode."

Next, the valid offset is set (S85). The value of "destination next write physical address" is written to "destination valid offset physical address".

Thereafter, it is judged whether or not the host data is immediately able to be written (S86). When the remainder as a result of dividing the logical sector address designated by the host 102 by the value of "destination write mode" of the duplication information 107b is less than one page size (less than 0x0003), immediate writing is judged to be possible. Otherwise, immediate writing is judged to be impossible.

When it is judged to be impossible, data before the write data is copied to the write target block (S87). The data from the head address obtained by grouping the sector address designated by the host 102 in write units of "random writing" to the address right before the sector address designated by the host 102 is copied to the destination physical block. In such event, the field of "destination next write physical address" is updated in accordance with the write situation.

Thereafter, the valid offset is set (S88). When "destination next write physical address" is divisible by "destination write mode," "destination next write physical address" is written to "destination valid offset physical address."

The data transferred from the host 102 is written in page units (S89). In such event, the field of "destination next write physical address" is updated.

It is judged whether or not the write data transfer from the host 102 is completed (S90). When the data transfer from the host 102 is completed, the remaining data of the write cycle is copied to the write target block (S91). When the data transfer from the host 102 continues, it is judged whether or not the region to be next written is of the same logical group (S92). When it is of the same logical group, the data writing is continued, while when it is of a different logical group, the processing is ended.

2.1.4 New Writing

When there is no registration in the duplication table 107 in step S12, the registration position in the duplication table 107 is decided (S23), and then the new writing to the physical block is carried out (S24). The details of these processing will be described.

Figure 16:
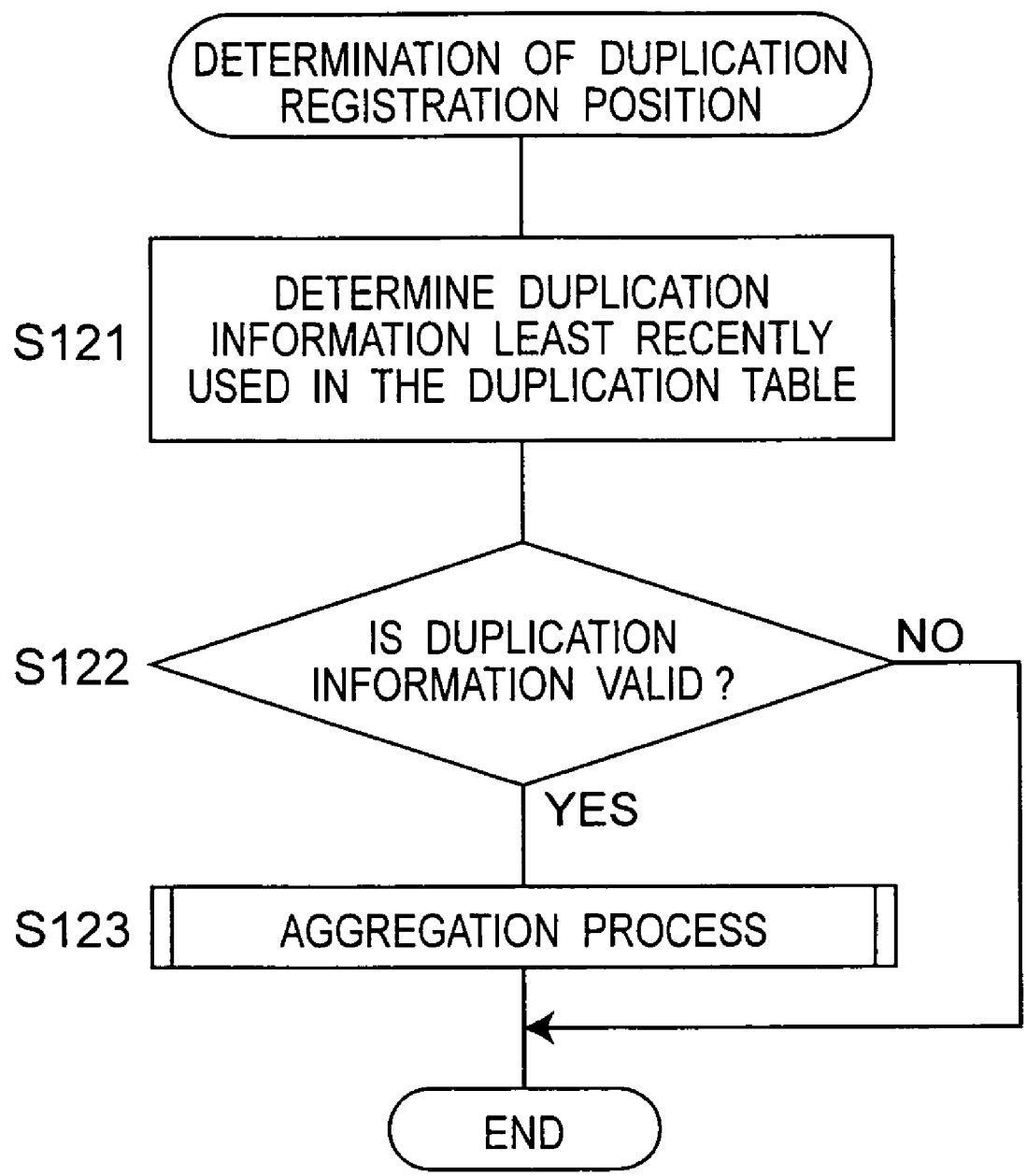
FIG. 16 is a flowchart of processing for determining duplication table registration position.

Referring now to FIG. 16, details of determination processing of registration position of the duplication table of step S23 will be described. The duplication information least recently used in the duplication table 107 is retrieved (S121). This processing is to decide candidates to secure free records for the data to be written in the duplication table 107, and it is sufficient to choose one piece of duplication information 0 through 7. The deciding method used here is according to LRU (Least Recently Used) method.

It is judged whether or not the retrieved duplication information is valid (S122). If valid, the aggregation processing is carried out (S123). When the value of "logical block address" of the retrieved duplication information is other than 0xFFFF, it is judged valid, and if 0xFFFF, invalid. It is noted that "0xFFFF" is a value which is set in "logical block address" when duplication information is initialized.

Figure 17:
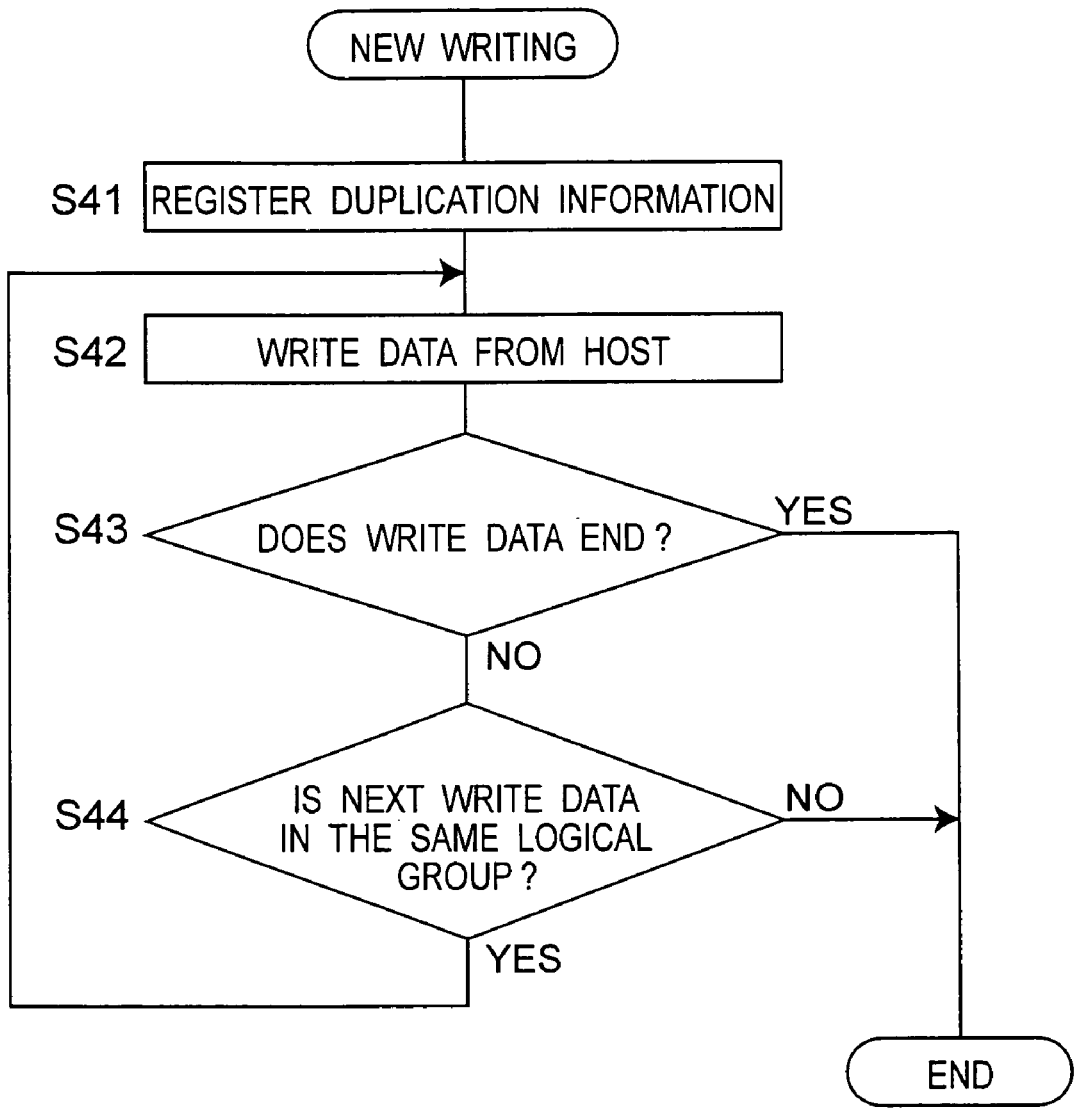
FIG. 17 is a flowchart of new wiring processing.

Referring now to FIG. 17, details of the new writing processing of step S24 will be discussed. First of all, registration to the duplication table 107 is performed (S41). In such event, each field in the duplication information 107b is initialized. A logical block address designated by the host is registered to "logical block address". A physical block address in which the data corresponding to a logical block address designated by the host 102 is written, that is, address obtained on the basis of a logical block address designated by the host 102 from the logical/physical conversion table is registered to "source physical block address". Erased physical block address is retrieved from the erased table and is registered to "destination physical block address". In such event, the corresponding bit of the erased table is rewritten to be a status indicating that data is written. The logical sector address designated by the host 102 is registered to "destination top page address".

The data transferred from the host 102 is written in page units (S42). "destination next write logical address" and "destination next write physical address" are updated according to the situation.

It is judged whether or not the write data transfer from the host 102 is completed (S43). When the data transfer from the host 102 is completed, the processing is ended. When the data transfer from the host 102 continues, it is judged whether or not the region to be written next is of the same logical group (S44). If it is of the same logical group, the data writing is continued (S42), while if it is of a different group, the processing is ended.

2.1.5 Aggregation Processing

Aggregation processing will be described. The aggregation processing is a processing to resolve duplication relationship between the source block data and the destination block data.

Figure 18:
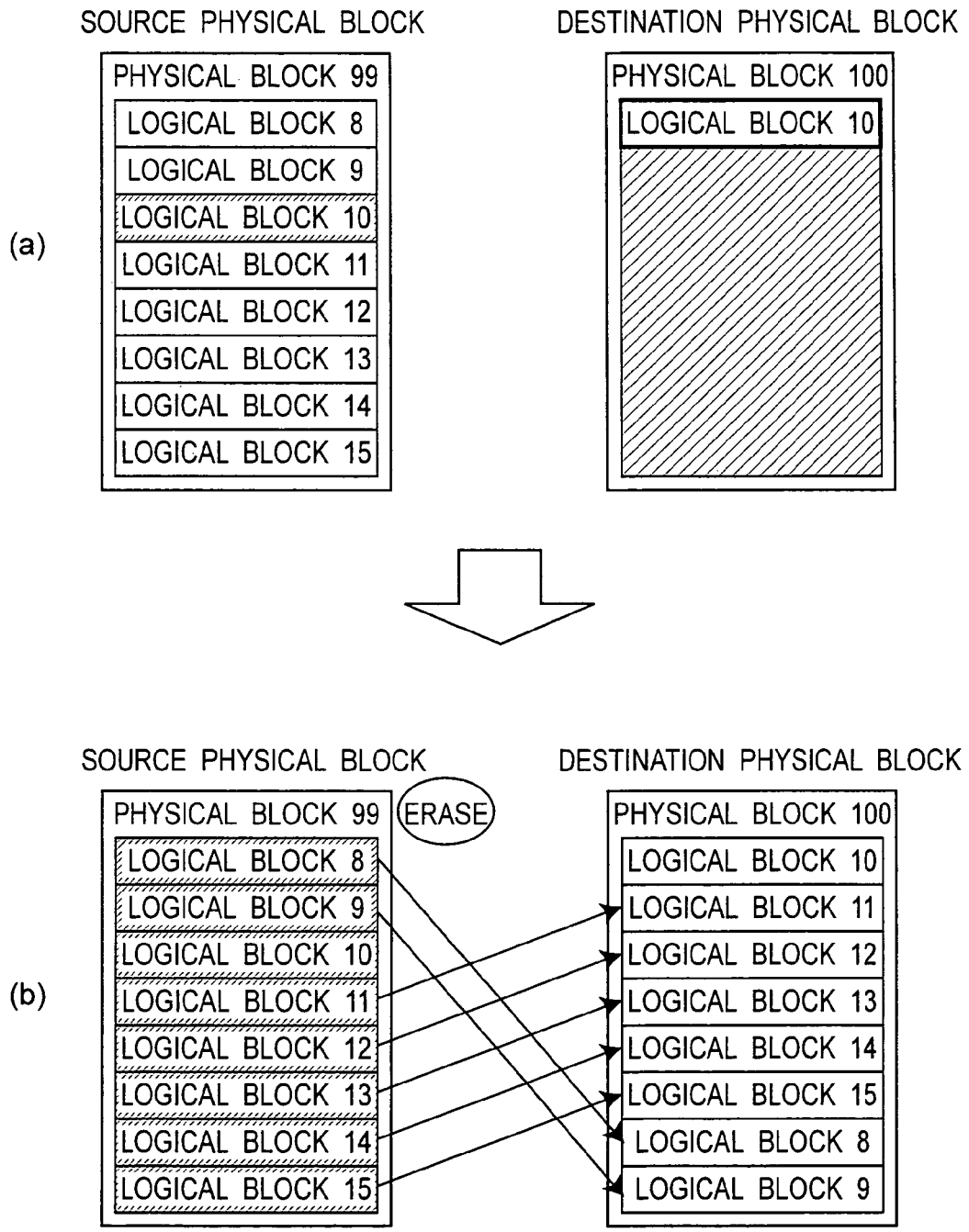
FIG. 18 is an illustration that explains an aggregation processing in the case of a sequential mode.

FIG. 18 is the illustration to explain the aggregation processing in the sequential mode. In the status as shown in FIG. 18(a) in which there are the source physical block 99 and destination physical block 100, these blocks are aggregated into the destination physical block 100 as shown in FIG. 18(b), and the data of the source physical block 99 is erased. In such event, in the destination physical block 100, logical blocks 11 to 15 continuing from the logical block 10 is copied following the logical block 10 from the source physical block 99, and logical blocks 8 and 9 are copied after the logic block 15.

Figure 19:
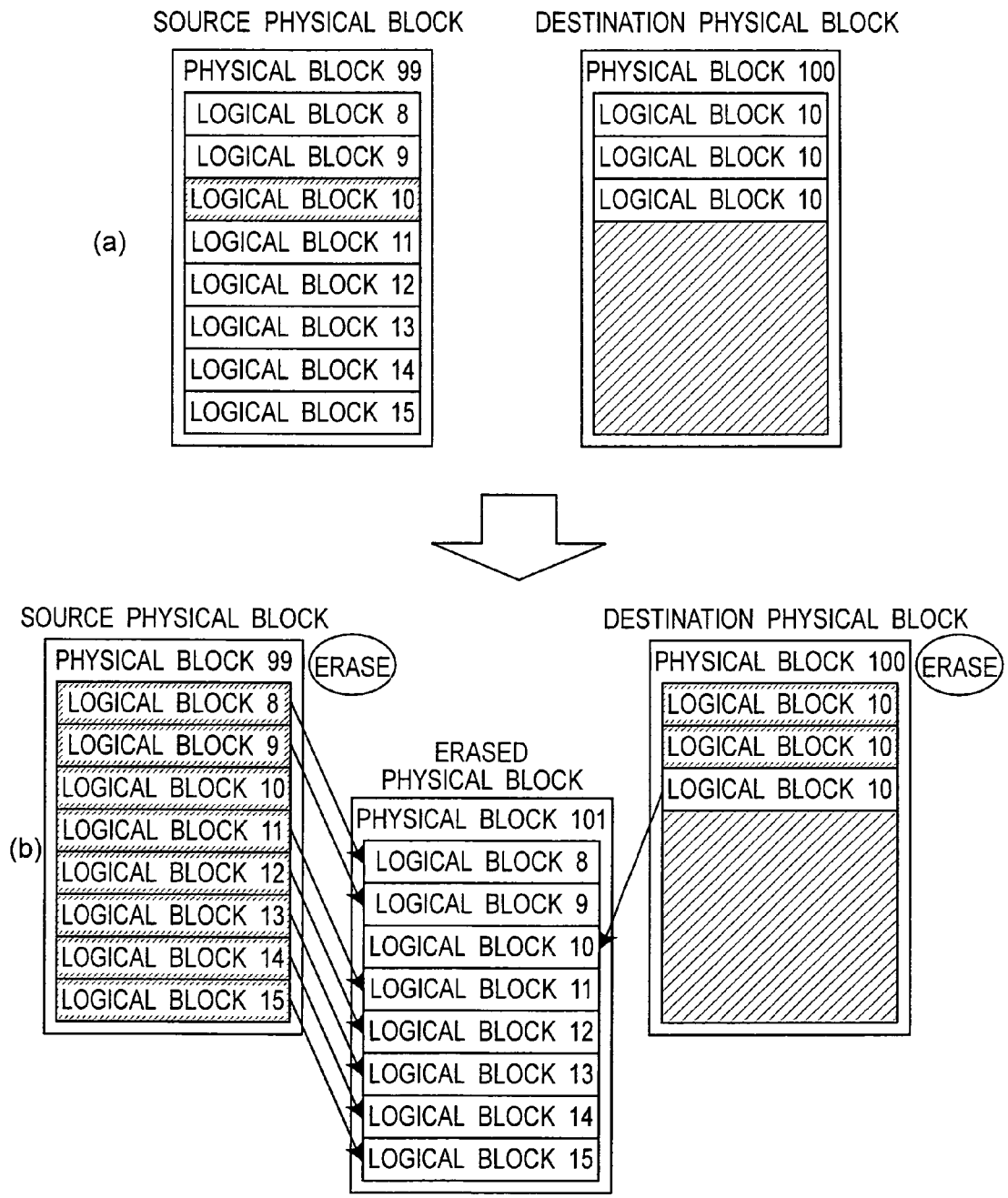
FIG. 19 is an illustration that explains aggregation processing in the case of overwrite mode and random mode.

In addition, FIG. 19 is the illustration to explain the aggregation processing in the overwrite mode and random mode. In this example, the logical block data is copied from the source physical block 99 and the destination physical block 100 to the erased physical block 101. Thereafter, the data of the source physical block 99 and destination physical block 100 are erased.

As described above, with the aggregation processing, data written over plural logical blocks can be summarized into one logical block.

Figure 20:
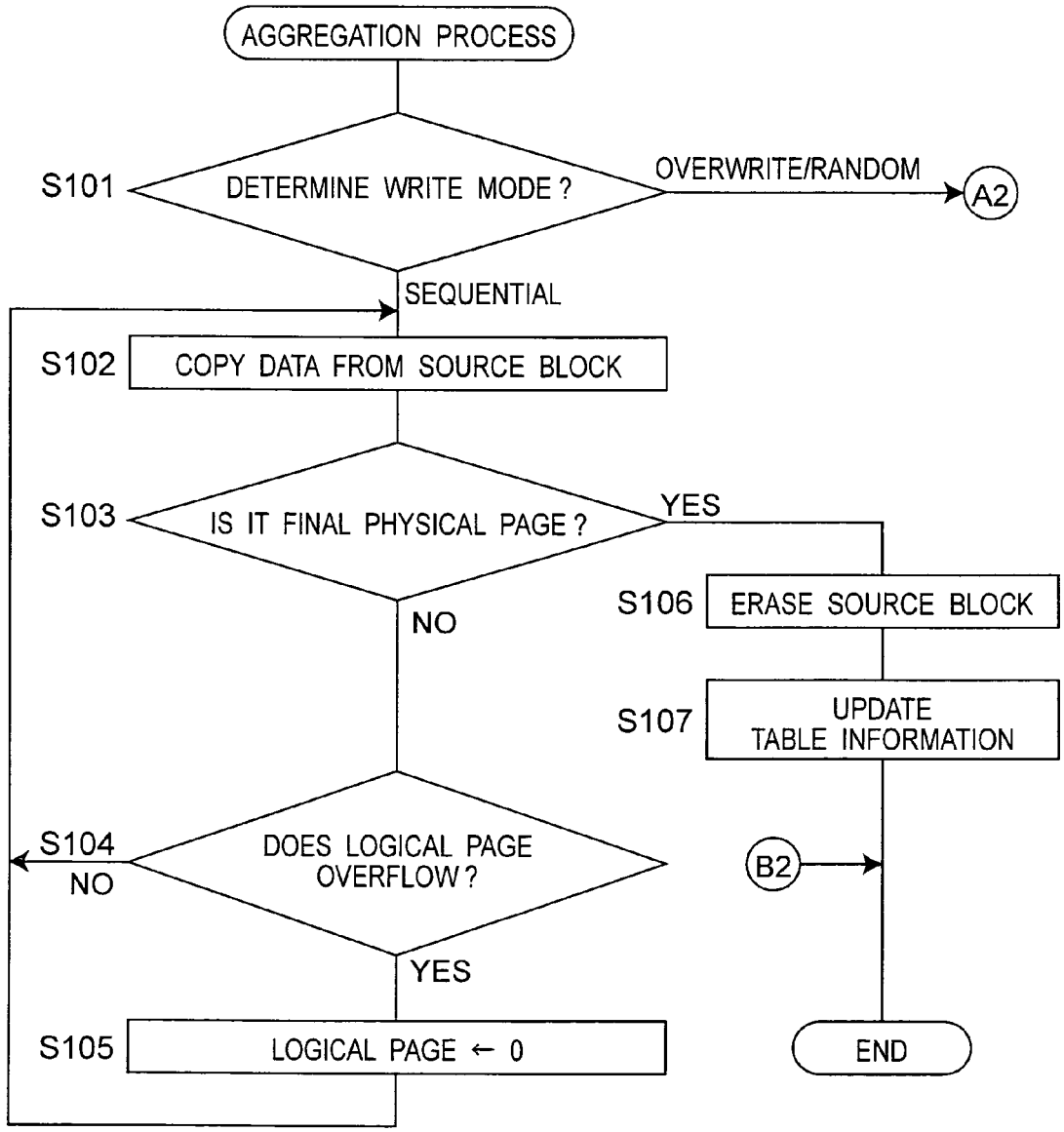
FIG. 20 is a flowchart for the aggregation processing.
Figure 21:
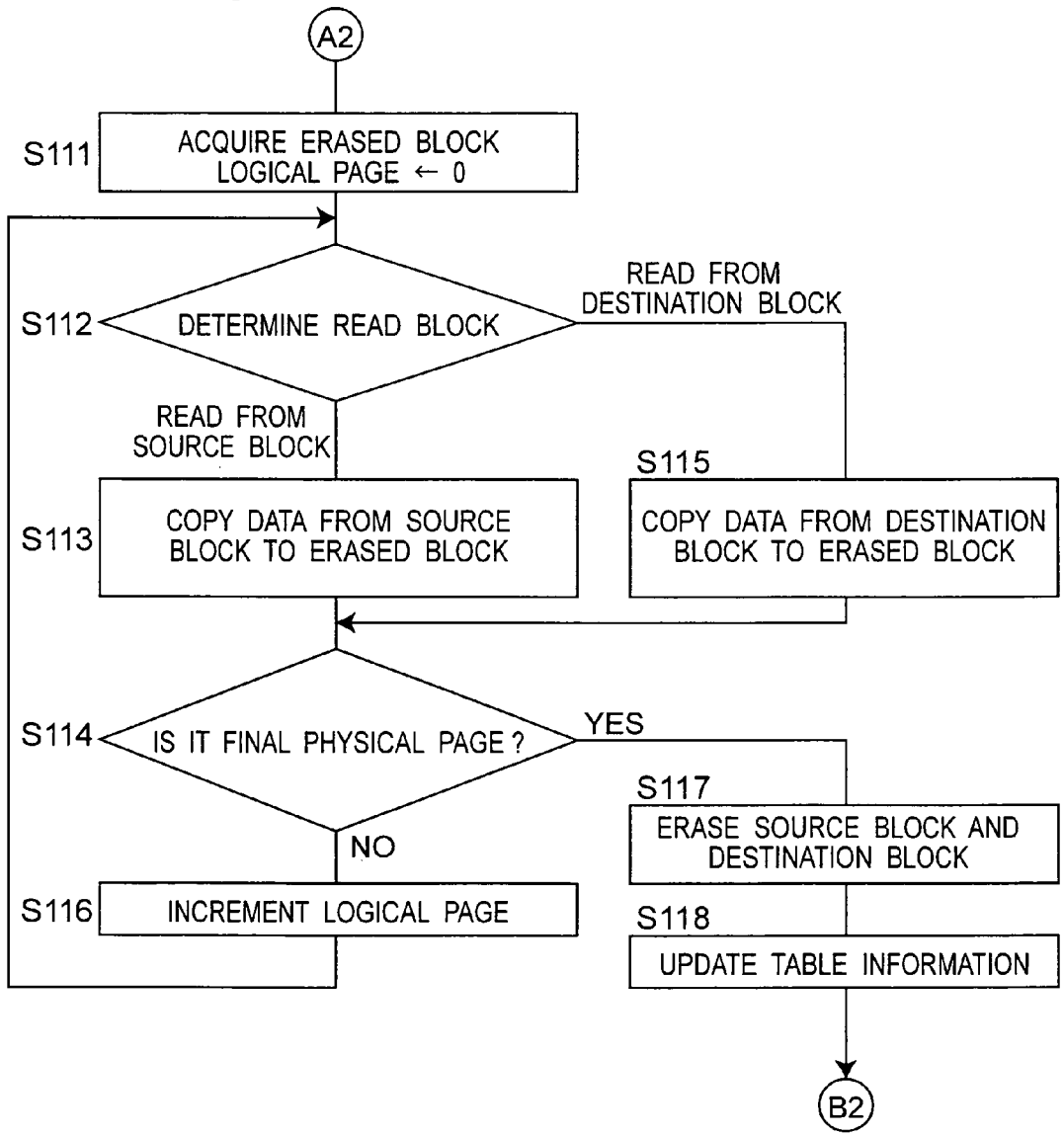
FIG. 21 is a flowchart for the aggregation processing (continued from FIG. 20).

Referring now to flowcharts of FIG. 20 and FIG. 21, discussion will be made on aggregation processing of Step S18 of FIG. 9. The write mode is judged from the value of "destination write mode" of the duplication information 107b (S101). When the write mode is an overwrite mode or random mode, the processing of FIG. 21 is carried out.

When the write mode is a sequential mode, part of data is copied from the source block to the destination block (S102). Specifically, the data of a page that contains the value of "destination next write logical address" is copied from the source physical block to the destination physical block. In such event, "destination next write logical address" and "destination next write physical address" are updated according to the write situation.

It is judged whether or not the data is written up to the final page in the destination physical block (S103). When the data is written up to the final page, the data of the source physical block is erased (S106). The data of the physical block of the flash memory indicated by "source physical block address" is erased. In such event, the relevant bit in the erased table 105 is rewritten to be a state indicating completion of erase.

Thereafter, various kinds of tables are updated (S107). That is, with respect to the aggregated physical block (destination physical block), correspondence between logical address and physical address is registered to the logical/physical conversion table 106. Specifically, the value of "logical block address" of the logical/physical conversion table 106 is re-written to the value of "destination physical block address." In addition, each field in the duplication information 107b is invalidated. More specifically, 0xFFFF (value that means invalidation) is registered to "logical block address". 0x0000 is registered to each of "source physical block address", "destination physical block address", "destination top page logical address", "destination next write logical address", "destination next write physical address", "destination write mode", and "destination valid offset physical address".

On the other hand, when writing is not performed up to the final page, overflow of logical page is judged (S104). Specifically, when the value of "destination next write logical address" is 0x0100, it is judged that the logical page overflows. When it is less than 0x0100, it is judged that the logical page does not overflow.

When the logical page overflows, the logical page number is set to 0 (S105). Specifically, the value of "destination next write logical address" is set to 0x0000.

Processing when the write mode is an overwrite mode or random mode in step 101 is discussed, referring to FIG. 21.

Referring to the erased table 105, erased blocks are acquired and a logical page number is set to 0 (S111). For setting the logical page number to 0, "destination next write logical address" is set to 0x0000. In this stage, it achieves the situation which indicates a physical block different from "destination" of other fields of the same duplicate record. In addition, "aggregation logical address" as internal parameter is provided, and the value is set to 0x0000.

Based on the duplication information, a read source from which data to be aggregated is read out is judged (S112). When the data is read out from the source physical block, the data is copied from the source physical block to erased block (S113). That is, the data of "aggregation logical address" is copied from the "source physical block" to the erased physical block. In such event, the "destination next write physical address" is updated according to the write situation.

When the data is read out from the destination physical block, the data is copied from the destination physical block to the erased block (S115). That is, the data of "aggregation logical address" is copied from the "destination physical block" to the erased physical block. In such event, the "destination next write physical address" is updated according to the write situation.

In the destination physical block, it is judged whether or not the data is written up to the final page (S114). When the writing is carried out up to the final page, the data of the source physical block and the destination physical block is erased (S117).

Thereafter, various tables are updated (S118). That is, the value of "logical block address" of the logical/physical conversion table 106 is re-written to the address of the erased block obtained in this flow. In addition, each field of the duplication information 107b is invalidated.

On the other hand, when the writing is not performed up to the final page, the logical page is incremented (S116) and the data of the following logical page (aggregation logical address) is copied.

2.1.6 FAT Writing

The processing when the writing region is judged to be the Fat area in the write region judgment of step 11 of the flow cart of FIG. 9 is discussed as follows. The basic processing flow is exactly same as that of the random writing, but it is characterized in that further random writing can be performed to the physical block to which the data has already been written in logical group units, since the write unit is fixed for each logical group and the logical group of the Fat area is configured with smaller capacity than that of the logical group of the data area. Before explaining this, the management method for the Fat area by the memory card 101 will be discussed.

Figure 22:
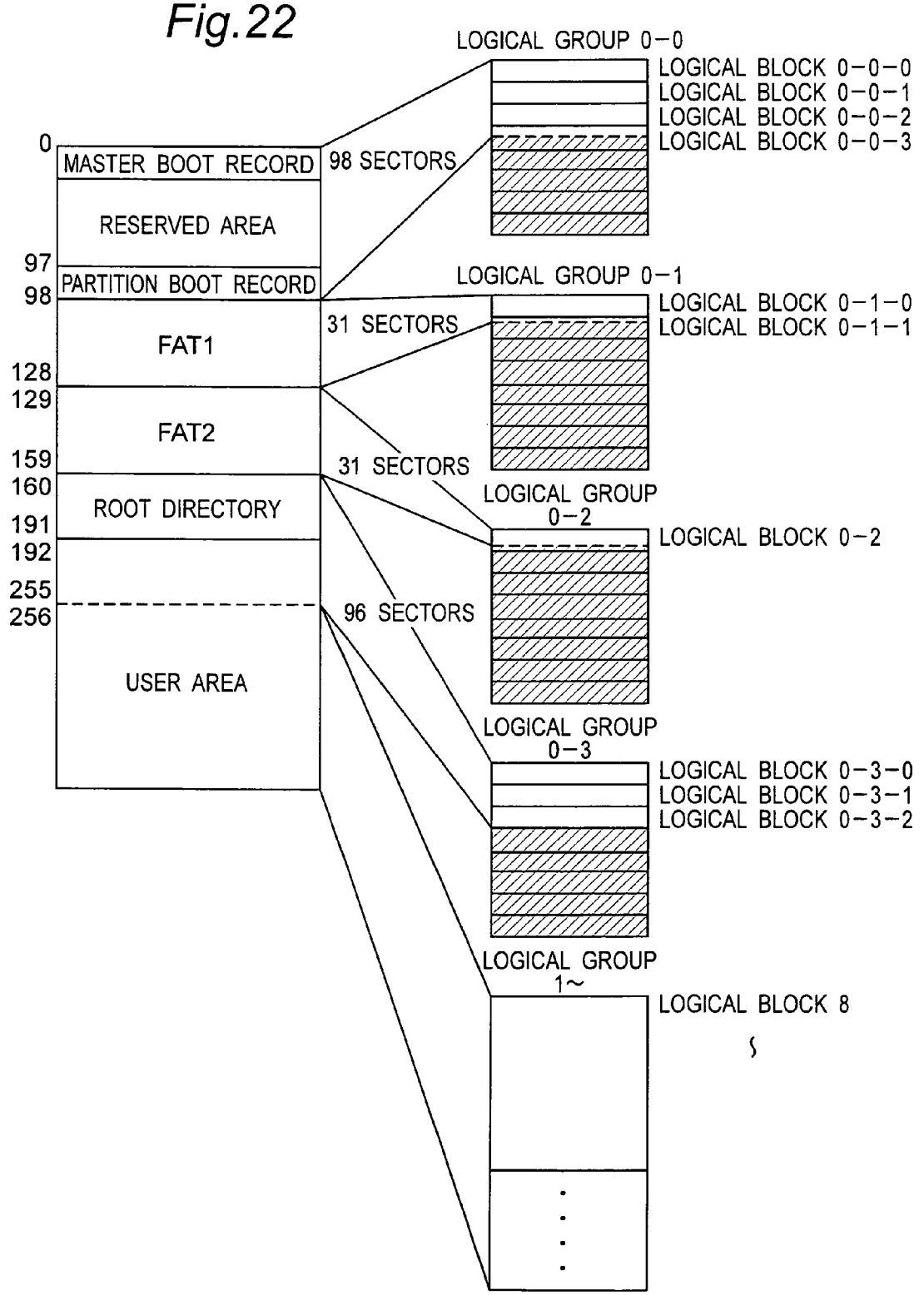
FIG. 22 is an illustration that explains the allocation of logical group for FAT information.

FIG. 22 is an illustration which explains allocation of logical group to the FAT information. In the drawing, in the region of logical sector addresses 0 through 97 (0x000 to 0x0061), information of master boot record and partition boot record including a reserved area is stored. In the region of logical sector addresses 98 through 128 (0x0062 through 0x0080), FAT1 information is stored. In the region of logical sector addresses 129 through 159 (0x0081 through 0x009F), FAT2 information is stored. In the region of logical sector addresses 160 through 255 (0x00A0 through 0x00FF), information of root directory is stored.

The controller 103 of the memory card 101 of the present embodiment assigns, to the logical group 0-0, the continuous regions (regions of sector 0 through sector 97) in which master boot records and partition boot records are stored. Similarly, the region of sector 98 through sector 128 which stores FAT1 information is allocated to the logical group 0-1, and the region of sector 129 through sector 159 which stores FAT2 information is allocated to the logical group 0-2, respectively. The region of sector 160 through sector 255 which stores root directory information is allocated to the logical group 0-3. Each of logical groups 0-0 through 0-3 is assigned to the physical block of the flash memory 103 one by one.

Even the total size of mater boot record, partition boot record, FAT1, FAT2, and root directory is less than 256 sectors, and all these pieces of information can be stored in one physical block. However, in the present embodiment, logical groups 0-0 through 0-3 are assigned, respectively, in accordance with type of FAT information, and each logical group 0-0 through 0-3 is associated with physical blocks. In addition, FAT duplication information 0 through 3 is associated with each logical group 0-0 through 0-3, respectively. FAT duplication information 0 through 3 store physical block addresses which correspond to logical groups 0-0 through 0-3 in the "destination physical block address."

FIG. 23A is an illustration that indicates various management conditions concerning FAT information with 128 MB card capacity in the present embodiment. The information shown in FIG. 23A is held in the Fat area conversion table 108 in the memory card 101 so that the controller 103 can suitably refer to the information.

In the case that the card capacity is 128 MB, in general, logical sector address of each piece of FAT information is assigned as shown in FIG. 22. Referring to the drawing, the region of logical sector addresses 0 through 97 (0x000 through 0x0061) correspond to logical group 0-0. The fixed offset of the logical group 0-0 is 0. The duplication information of logical group 0-0 is stored in FAT duplication information 0. The aggregation condition is 0x00E0. The aggregation condition is a value obtained by subtracting the write unit size (for example, 0x0020) of the logical group from the physical block size (0x0100). In addition, the write unit size is 32 sectors, and regarding logical group 0-0, one physical block includes four write units of sectors 0 through 31, sectors 32 through 63, sectors 64 through 95, and sectors 96 and 97. The size of the write unit varies in accordance with the logical group.

FIG. 23B is an illustration that indicates a configuration of the Fat area conversion table 108. The Fat area conversion table 108 stores information of logical address assigned to each logical group 0-0 through 0-3 according to the capacity of the memory card (flash memory 103). As shown in the drawing, the size of the region assigned to each logical group 0-0 through 0-3 is varied in accordance with the capacity of the memory card 101. The controller 103 refers to the Fat area conversion table 108 at the time of initialization of the memory card 101 and assigns the logical group to the logical address of the Fat area on the basis of the card capacity.

FIG. 24A (a) is an illustration that indicates the regional configuration of the assigned physical block corresponding to logical group concerning the Fat area. FIG. 24A (a) shows an example of logical group 0-2 related to FAT2. The physical block includes a partial block write region and a fixed random write region. The region of page 0 through page 7 at the head of the physical block is the partial block write region to which information on FAT2 (information of thirty-one sectors) is first written. The following region of page 8 through page 63 is the random write region to which the data applied with duplication writing is stored. The write unit in the random write region is shown in FIG. 23A (four sectors for logical group 0-2) and this value is smaller than the write unit in the partial block write region.

In the case of writing data to the data area, when the duplication writing is performed, the data is to be written in a physical block different from a physical block in which the previous data has been stored. As against this, in the case of the duplication writing in the Fat area, the data is to be written in a physical block same as the physical block in which the previous data has been stored. That is, the data is first written in the partial block write region. Afterward, when the duplication writing becomes to be required for another data to a logical address same as the logical address to which the data has already been written, the another data is written in the fixed random write region inside the same physical block. When there is no free space in the random write region, the physical block is aggregated. In this way, a physical block is assigned to each kind of FAT information and furthermore duplication writing is carried out in physical blocks, and therefore the aggregation frequency in the Fat area in which comparatively irregular access frequency is high can be reduced, resulting in improved write efficiency.

As shown in FIG. 24A (b), a random write region may be installed in another physical block B and the region to be used for random write region may be extended. In such event, in order to manage plural random write regions, items to be managed by the duplication information of the Fat area shown in FIG. 6A must be increased. In the case of FIG. 24A (b), since the aggregation processing frequency is reduced than the case of FIG. 24A (a), the write efficiency can be still more improved.

Referring now to FIG. 10, a processing when the write region is judged to be the Fat area in write region judgment of step S11 of the flowchart of FIG. 9 will be described as follows.

First of all, in the duplication table 107, it is judged whether or not there is any registration of FAT duplication information which corresponds to the logical address designated by the host 102 (S31). Specifically, when "destination physical block address" of the FAT duplication information that corresponds to the logical address designated by the host 102 is 0x0000, it is judged that the FAT duplication information is registered, while when it is other than 0x0000, it is judged to be not registered.

When no FAT duplication information is registered, after an erased block is obtained (S35), the FAT information is written to the erased block (S33).

When the FAT duplication information is registered, it is judged whether or not there is any unwritten page in the physical block designated by FAT duplication information (S32). When the "destination allocation physical page" of the FAT duplication information which corresponds to the logical address designated by the host 102 is same as the aggregation condition (see FIG. 23A), it is judged that there is no unwritten page. When it is not same, it is judged that there is any unwritten page.

When there is any unwritten page, FAT write processing is carried out to write FAT information to the unwritten page (S33). When there is no unwritten page, after carrying out aggregation processing (S34), an erased block is obtained (S35) and FAT write processing is carried out to write FAT information in the erased block (S33).

Referring now to FIG. 24B, FAT write processing of Step S33 above will be described. A write unit allocation table which corresponds to the logical address received from the host 102 is acquired (S131). Specifically, based on the logical sector address designated by the host 102 and in accordance with the information shown in FIG. 23A, the logical group related to the logical address is decided, and the FAT duplication information which corresponds to the logical group is identified to be read out. For example, when the logical sector address from the host 102 is 0x0020, FAT duplication information 0 of logical group 0-0 is acquired. The latest write unit allocation table 150 is read out from the management region of the flash memory designated by "destination physical block address" and "destination allocation physical page" of the acquired FAT duplication information.

Then, a destination for data writing is set (S132). The "destination physical block address" of the corresponding FAT duplication information is set as a physical block address of the write destination. "destination allocation physical page" plus "write unit size" of the corresponding logical group is set as a physical sector address of the write destination.

The effective offset is set (S133). The physical page of the write destination is written to "destination allocation physical page" of the corresponding FAT duplication information.

It is judged whether or not the data can be immediately written (S134). This judgment is made as follows.

When the remainder obtained by dividing the logical sector address designated by the host 102 by "fixed offset" of the associating logical group is less than one page (less than 0x0003), it is judged that immediate data writing is possible. Otherwise, it is judged that immediate data writing is impossible.

When immediate data writing is impossible, the data right before the address designated by the host 102 is copied to the write target block (S135). That is, the data from "fixed offset" of the associating logical group and right before the sector address designated by the host is copied from the physical block obtained from the logical/physical conversion table 106 to the physical block of the write destination. In such event, the physical sector of write destination is incremented according to write situation. The write unit allocation table 150 is updated and written in the management region of the flash memory 103.

Thereafter, effective offset is set (S136). When the physical sector of the write destination is divisible by "write unit size" of the corresponding logical group, the physical page of the write destination is written to "destination allocation physical address" of the FAT duplication information.

Next, the data transferred by the host 102 is successively written in page units (S137) from the write destination set in the previous step. In such event, the physical sector address of the write destination is incremented according to write situation. The write unit allocation table 150 is updated and written in the management region of the flash memory 103.

Whether or not the write data transfer from the host 102 continues is judged (S138). If completion of the data transfer, the data of the logical group is copied to the write target block (S139). Specifically, unwritten portion of the data included in the corresponding logical group are all copied from the physical block obtained from the logical/physical conversion table 106 to the physical block of the write destination. In such event, the physical sector address of the write destination is incremented according to the write situation. The write unit allocation table 150 is updated and written in the management region of the flash memory 103.

When the data transfer is being continued, it is judged whether or not the next write data is the logical group same as before (S140). If same, the next data is written. If different, complete the present processing.

2.1.7 Specific Examples of Write Operation

Example 1

Example of Sequential Write Mode

Figure 25:
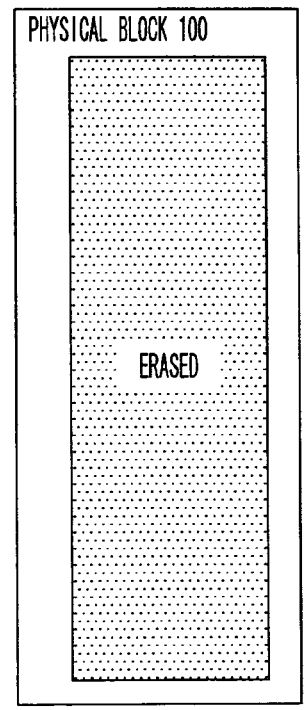
FIG. 25 is an illustration that explains a specific example of an operation in the sequential write mode.

Referring now to FIG. 25 through FIG. 31, an example from new write mode to sequential write mode will be explained. In FIG. 25, when data writing is requested newly from the host 102 to regions of logical block 0x0010, logical sectors 0x0020 through 0x003F, the new writing (S24) takes place in the case of no registration in the duplication information (S12), and data is written to the physical block 100 which is an erased block.

Under the above-mentioned situation, the duplication information 107b of the duplication table 107 is set as follows. The value of "logical block address" is set to logical address 0x0010 designated by the host 102. The value of "destination physical block address is set to 0x0000 which corresponds to the logical block address of 0x0010 in the logical/physical conversion table. The value of "destination physical block address" is set to 0x0100 indicating the block address of the physical block 100 to which the data is to be written. The value of "destination top page logical address" is set to the value of 0x0020 of the head logical sector designated by the host 102. The value of "destination write mode" is set to 0x0000 which indicates "sequential". Other fields of the duplication information 107b are set to initial values.

Figure 26:
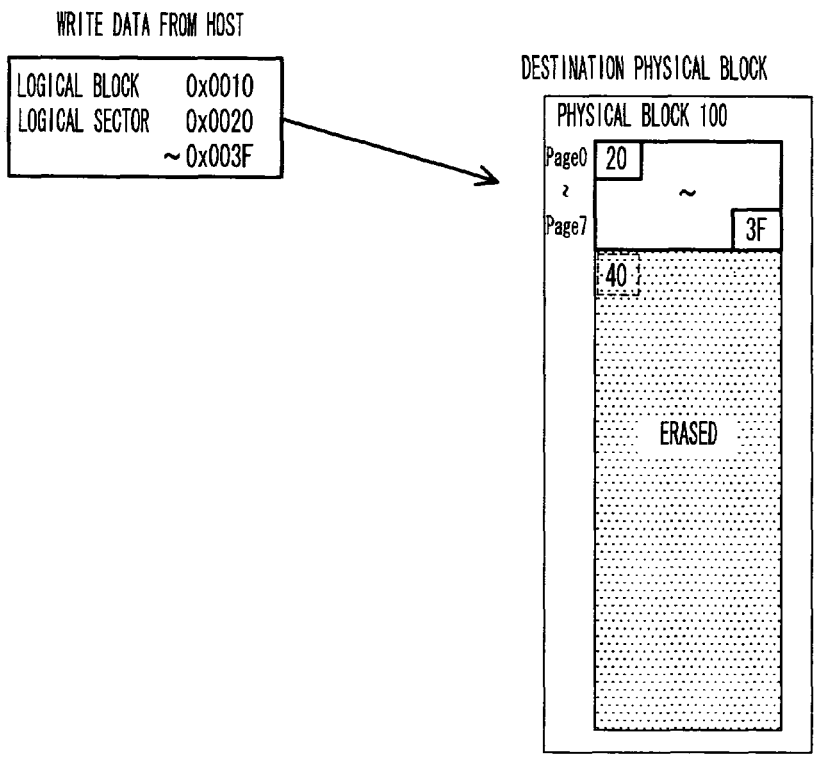
FIG. 26 is an illustration that explains a specific example of an operation in the sequential write mode.

Thereafter, according to the request from the host 102, the data of logical sectors 0x0020 through 0x003F is written from the head of the physical block 100. The situation achieved by such event is shown in FIG. 26. In FIG. 26, "destination next write logical address" of the duplication information 107b stores 0x0040, while "destination next write physical address" stores 0x0020.

Figure 27:
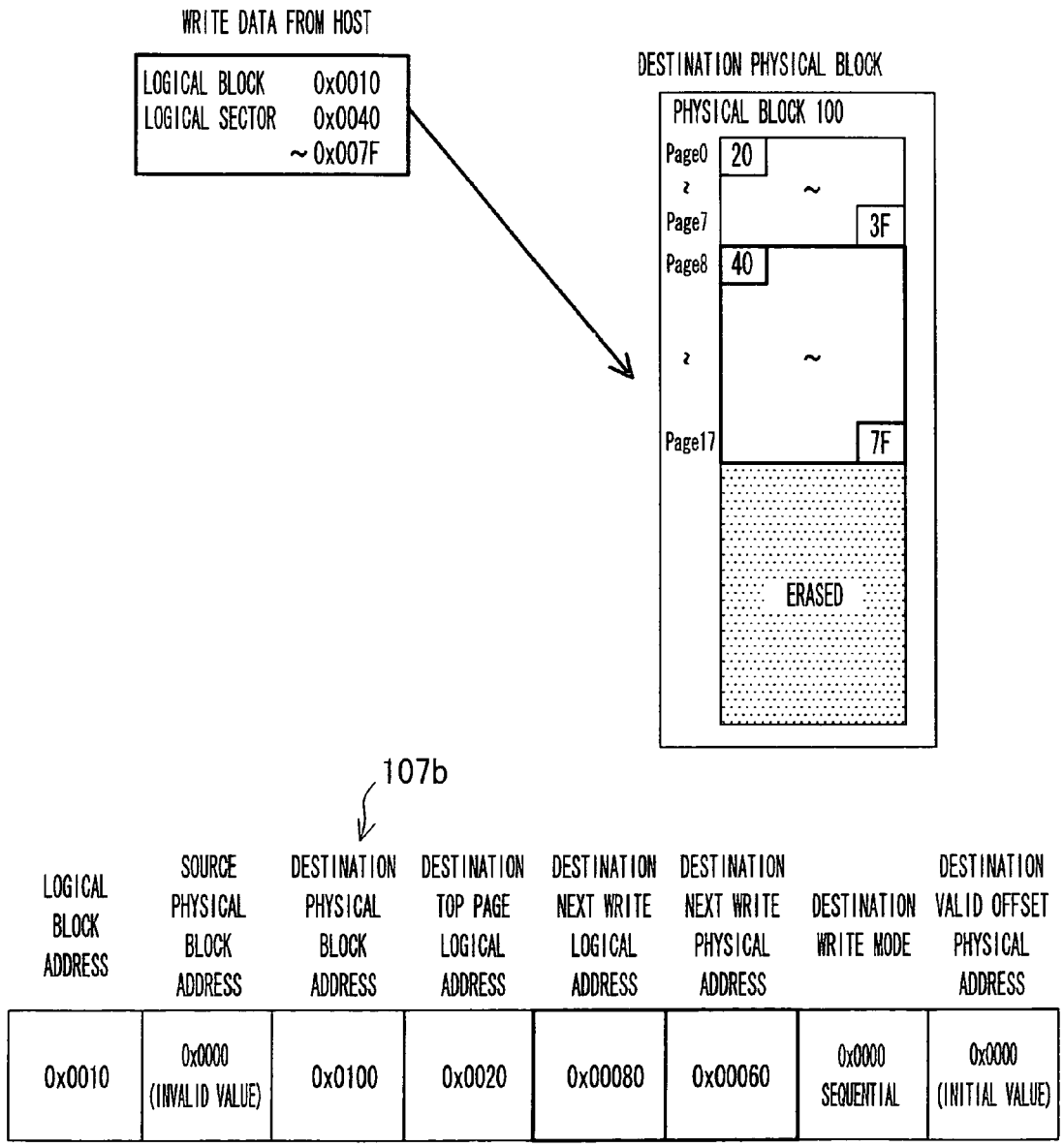
FIG. 27 is an illustration that explains a specific example of an operation in the sequential write mode.

Continuously, according to the request from the host 102 to write data to regions including logical block 0x0010 and logical sectors 0x0040 through 0x007F, the sequential writing is performed (S22). Logically continued data is written in regions with data already recorded and physically continued regions in the physical block 100. The situation achieved by such event is shown in FIG. 27. In FIG. 27, the value of the "destination next write logical address" of the duplication information 107b is updated to 0x0080, while the "destination next write physical address" is updated to 0x0060.

Figure 28:
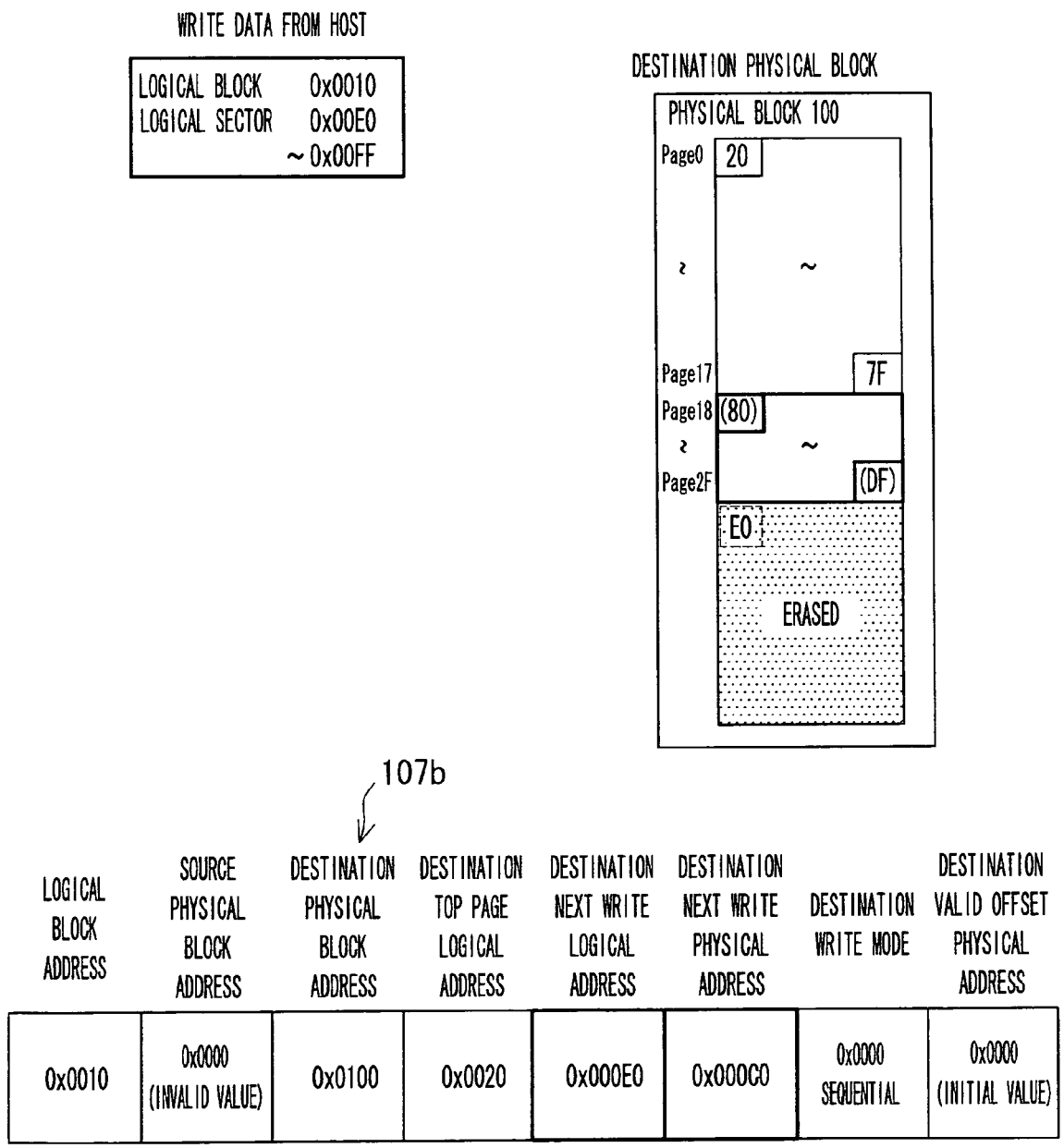
FIG. 28 is an illustration that explains a specific example of an operation in the continuous write mode.
Figure 29:
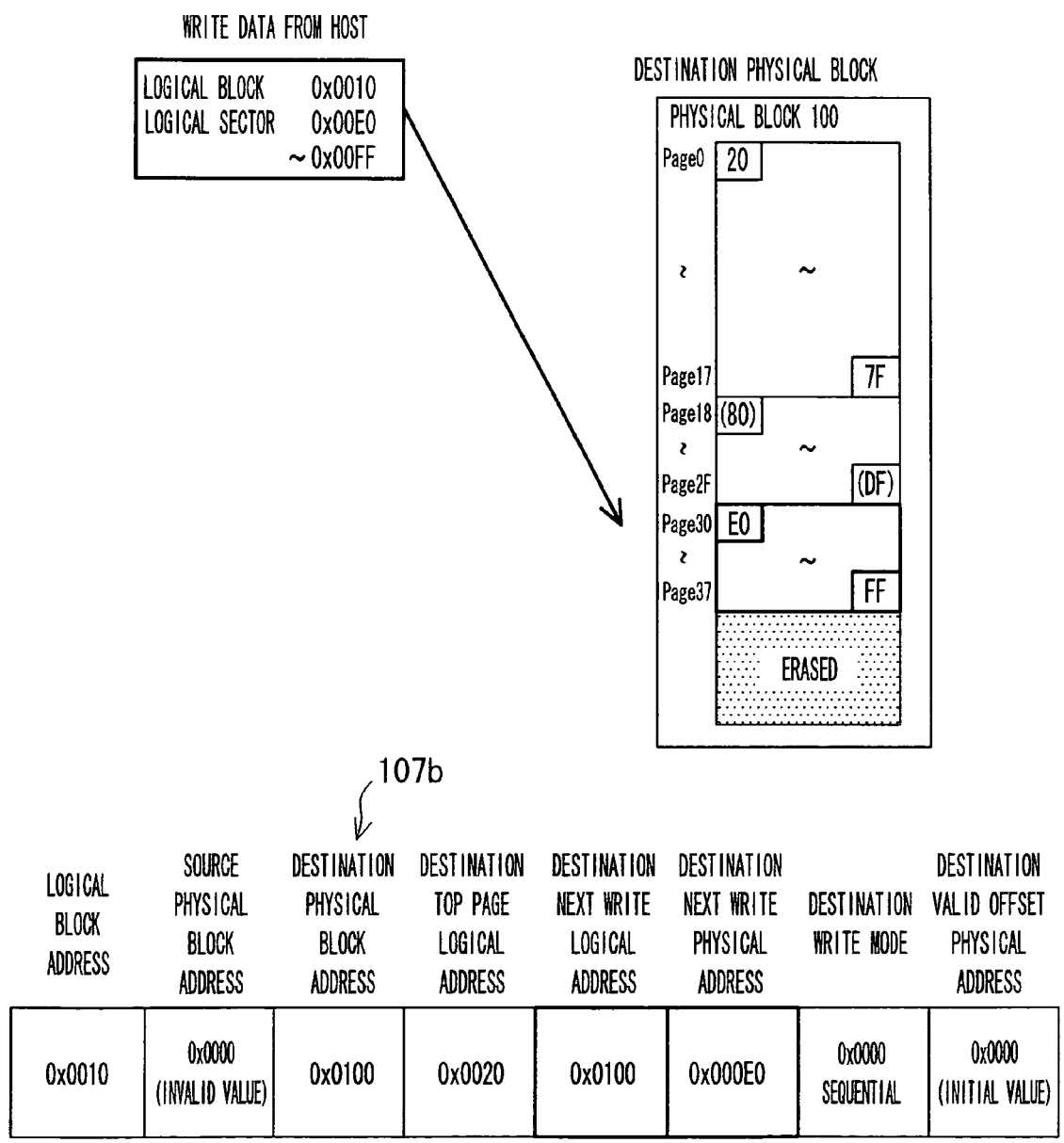
FIG. 29 is an illustration that explains a specific example of an operation in the continuous write mode.

When there is a request from the host 102 to write data to discontinuous logical addresses in the situation shown in FIG. 27, that is, there is a request to write to logical sector addresses 0x00E0 through 0x00FF, first of all, it is necessary to read data from the "source physical block" of the duplication information 107b and to copy the data to "destination physical block" in logical sector addresses 0x0080 through 0x00DF, as shown in FIG. 28. However, in this embodiment, "source physical block" of the duplication information 107b stores 0x0000 which indicates an invalid value, and this means that there is no destination physical block. Consequently, in this event, the specified data (for example, "FF") is written to logical sector addresses 0x0080 through 0x00DF. Thereafter continuously, as shown in FIG. 29, the data of logical sector addresses 0x00E0 through 0x00FF requested from host 102 are written. In this way, in the present embodiment, the processing to write data in the designated region is carried out after the free region is replenished with data so that the region with data written is not discontinuous. In the foregoing, the reason of writing the specified data is because the data is written newly in the physical block 100 (Note: The source physical block address of the duplication information 107b of the physical block 100 stores 0x0000, and this means that the data is newly written in the physical block 100). In the case of duplication writing from the source physical block, the data of logical address which corresponds to the source physical block is copied.

When the aggregation processing is carried out under the condition of FIG. 29, data that can achieve continuous logical address is written in a remaining region of the physical block 100. That is, as shown in FIG. 30, "source physical block" data of duplication information 107b is written as the data of logical sector addresses 0x00E0 through 0x001F. In this event, since the "source physical block" is an invalid value, the specified data is written. The value which corresponds to the logical block 0x0010 of the logical/physical conversion table 106 is updated to 0x0100 which indicates the block address of the physical block 100 and the duplication information 107b is initialized.

Figure 31:
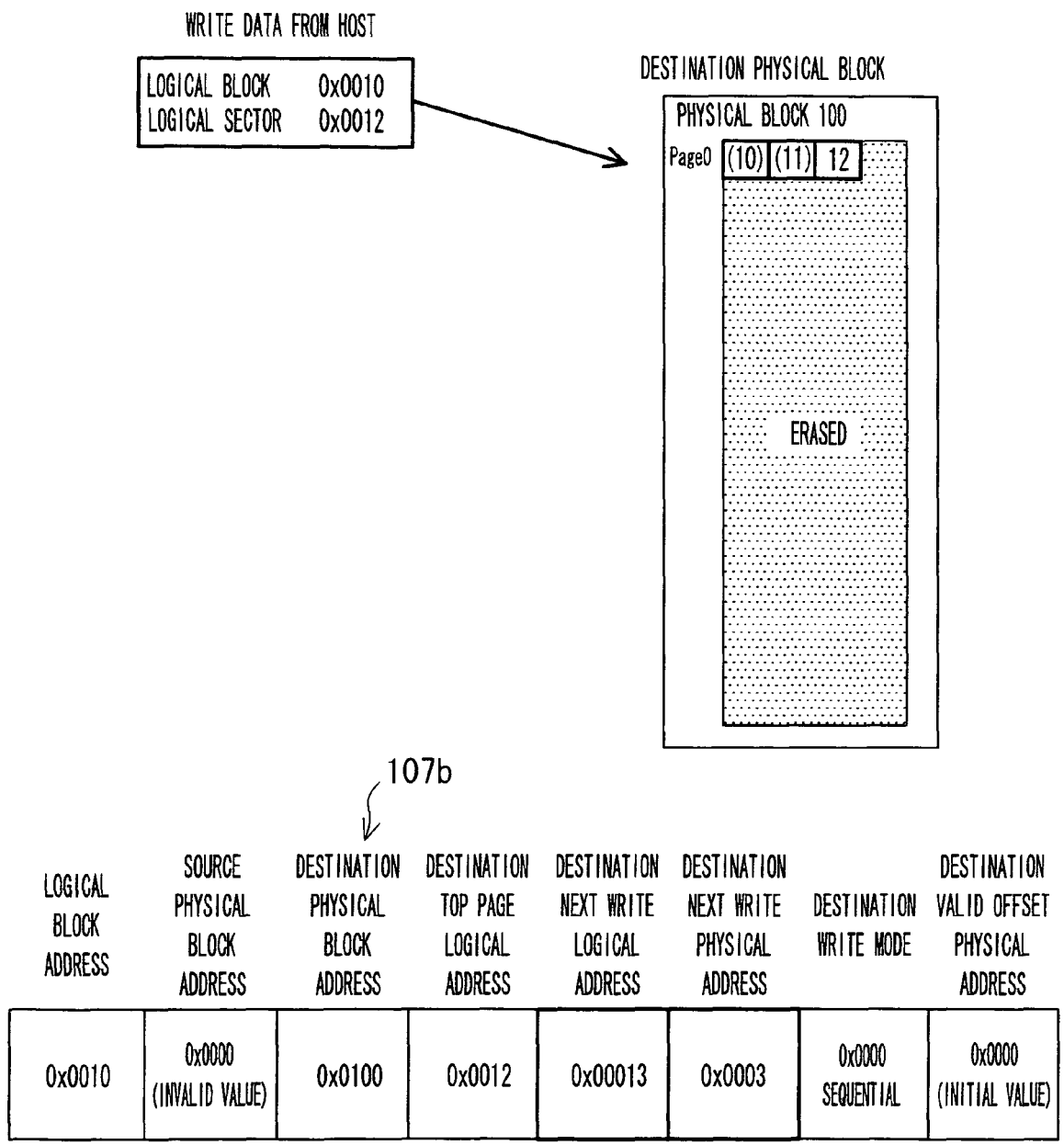
FIG. 31 is an illustration that explains a specific example of an operation in the continuous write mode.

In the above-mentioned example, an example of write operation when the write cycle is thirty-two sectors is shown, but the same principle is applied to the write operation in sector units as shown in FIG. 31.

Example 2

Example of Overwrite Mode

Figure 32:
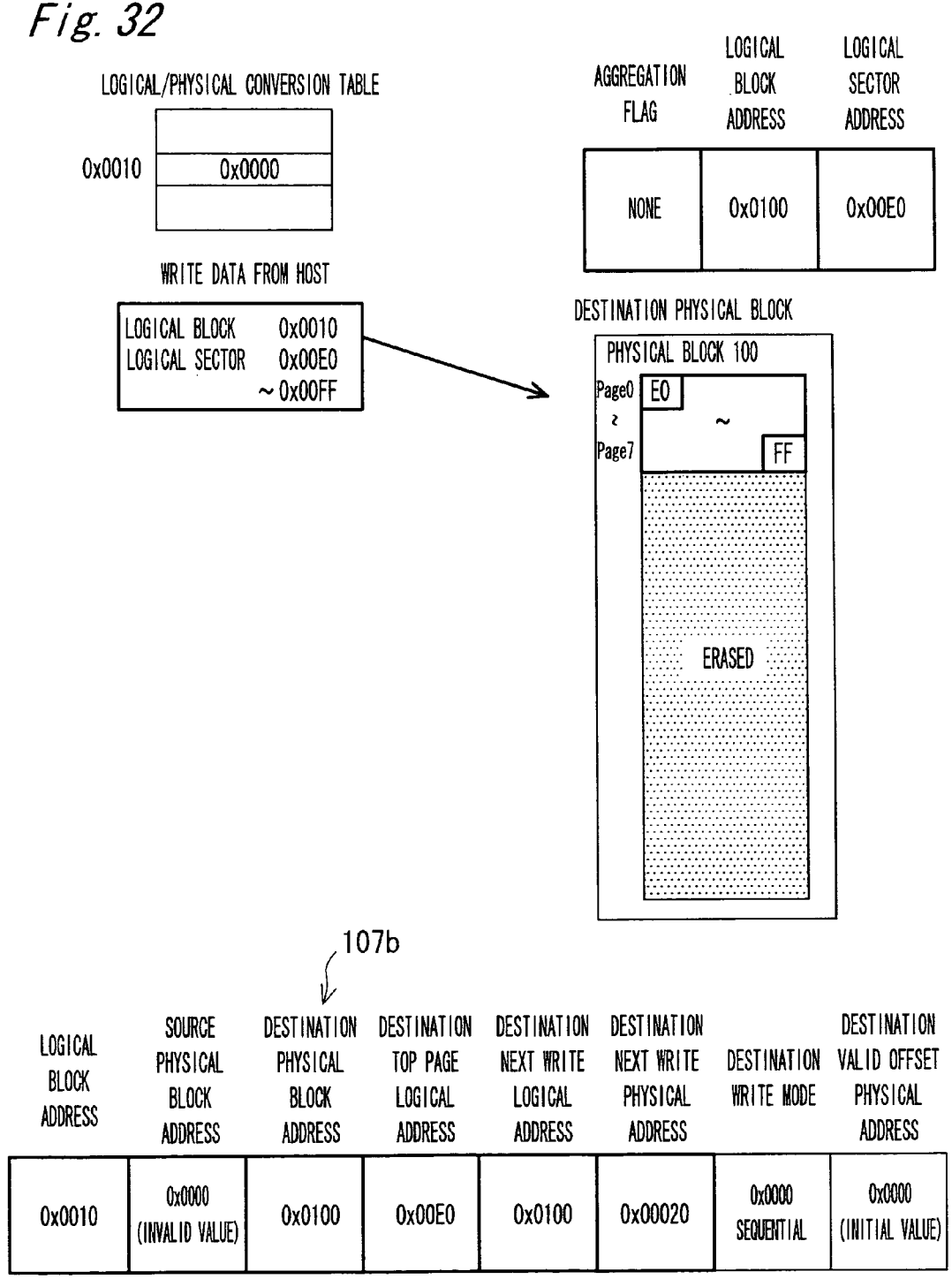
FIG. 32 is an illustration that explains a specific example of an operation in the overwrite mode.
Figure 33:
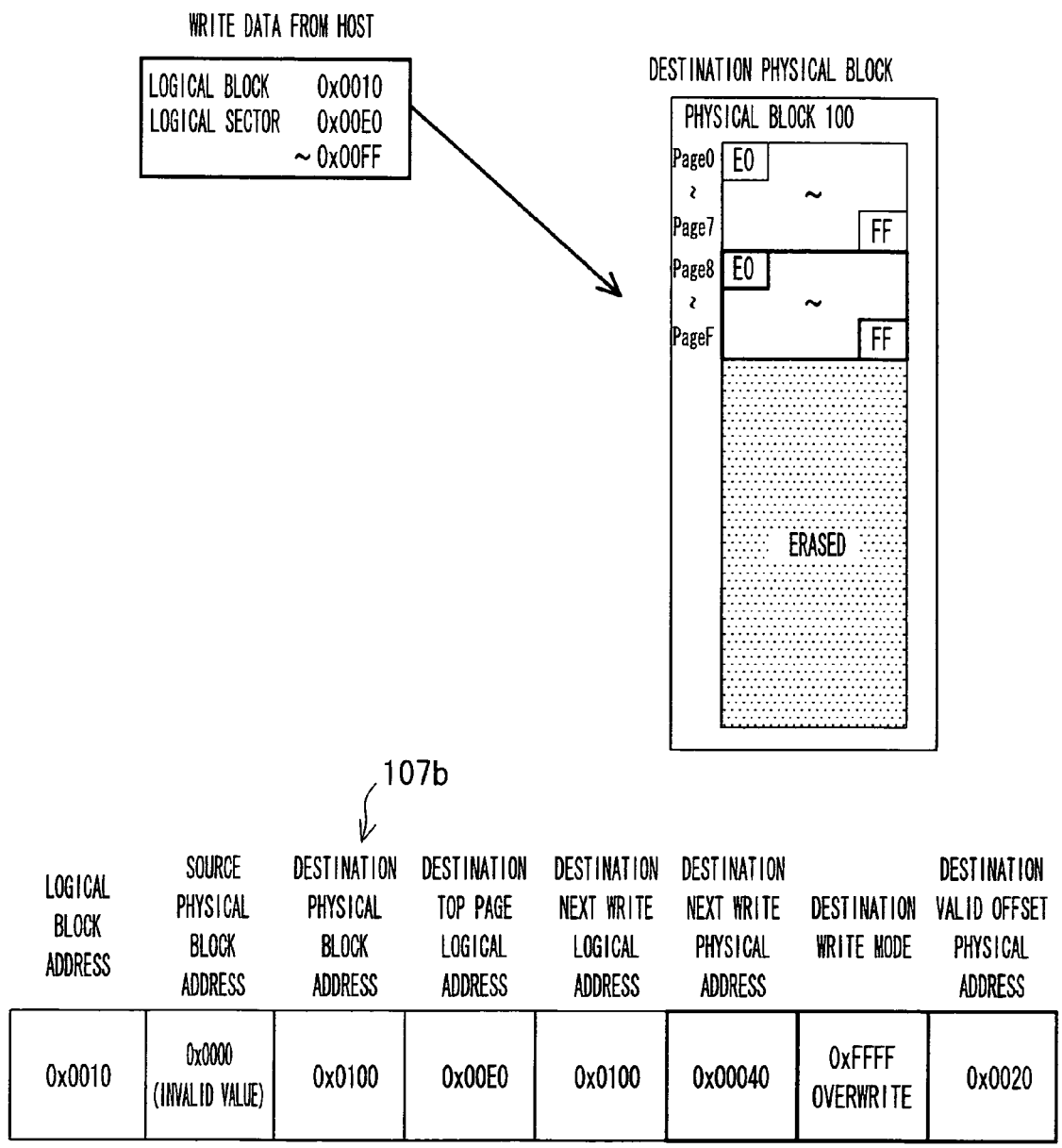
FIG. 33 is an illustration that explains a specific example of an operation in the overwrite mode.
Figure 34:
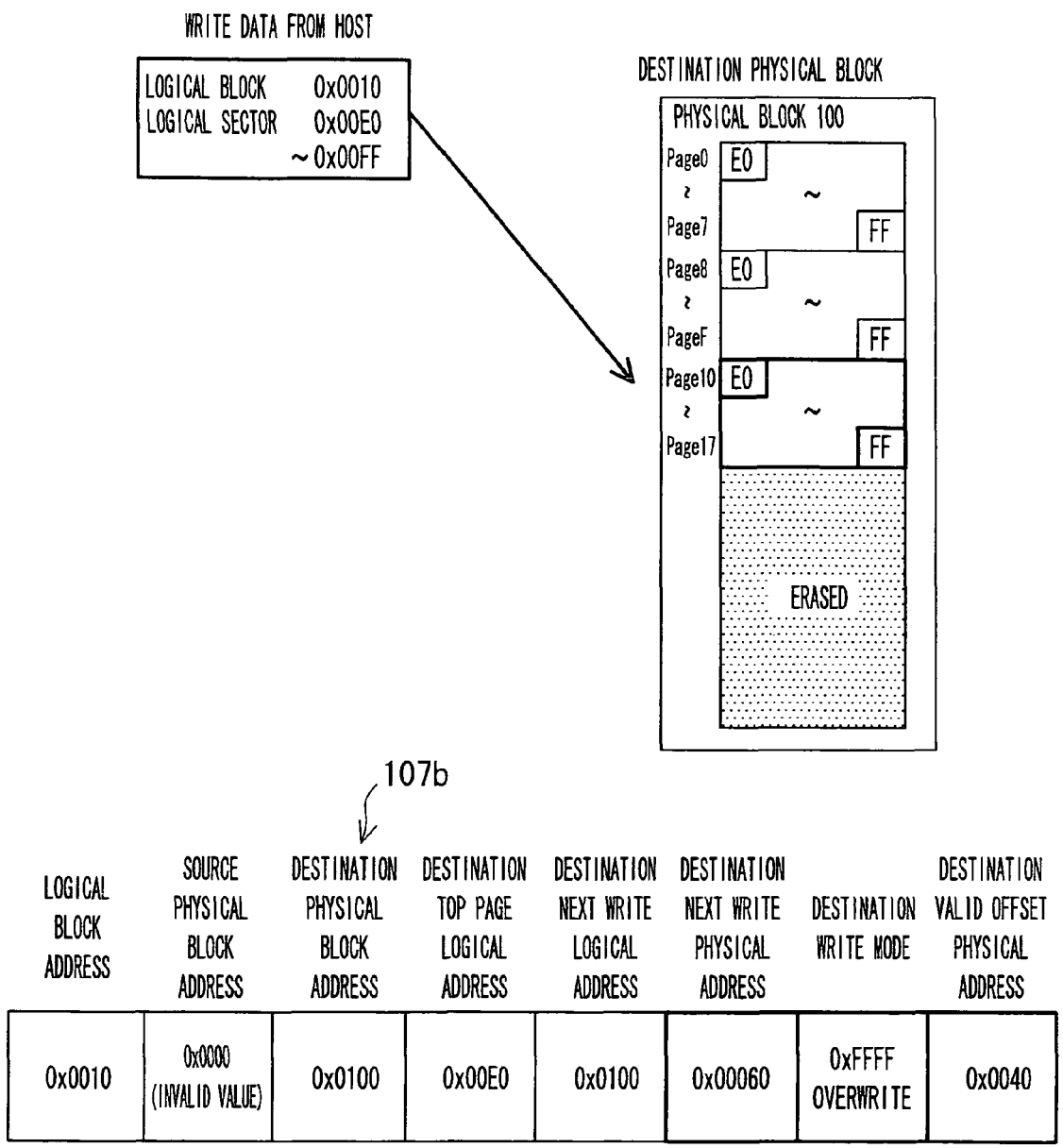
FIG. 34 is an illustration that explains a specific example of an operation in the overwrite mode.

Referring now to FIG. 32 through FIG. 34, description will be made on an example in the case of overwrite mode from new write mode. In FIG. 32, when a request is made by the host 102 to newly write data to regions of logical block 0x0010 and logical sectors 0x00E0 through 0x00FF, the data is written to the physical block 100 which is the erased block.

Under the above-mentioned situation, the duplication information 107b of the duplication table 107 is set as follows. "logical block address" is set to the logical address 0x0010 designated from the host 102. "destination physical block address" is set to 0x0000 which is a value that corresponds to the logical block address 0x0010 in the logical/physical conversion table. "destination physical block address" is set to 0x0100 which indicates the block address of the physical block 100 to which the data is to be written. "destination top page logical address" is set to 0x00E0 which is a value of the head logical sector designated by the host 102. "destination next write physical address" is set to 0x0100. "destination write mode" is set to 0x0000 which indicates "sequential". Other fields of the duplication information 107b are set to initial values.

Furthermore, as shown in FIG. 33, when there is a request from the host 102 for writing data in the logical address same as previous one, the data is newly written in a region following the region previously written (page 0 to page 7) in the physical block 100. In such event, the "destination next write logical address" of the duplication information 107b is updated to 0x0040 and the "destination effective offset physical address" is updated to 0x0020. In addition, "destination write mode" is set to 0xFFF which means overwriting.

Furthermore, as shown in FIG. 34, when there is a request from the host 102 to write data in the logical address same as previous one, the data is newly written in a region following the region previously written (page 8 to page F) in the physical block 100. In such event, the "destination next write logical address" of the duplication information 107b is updated to 0x0060 and the "destination effective offset physical address" is updated to 0x0040.

Example 3

Aggregation of Overwritten Blocks

Figure 35:
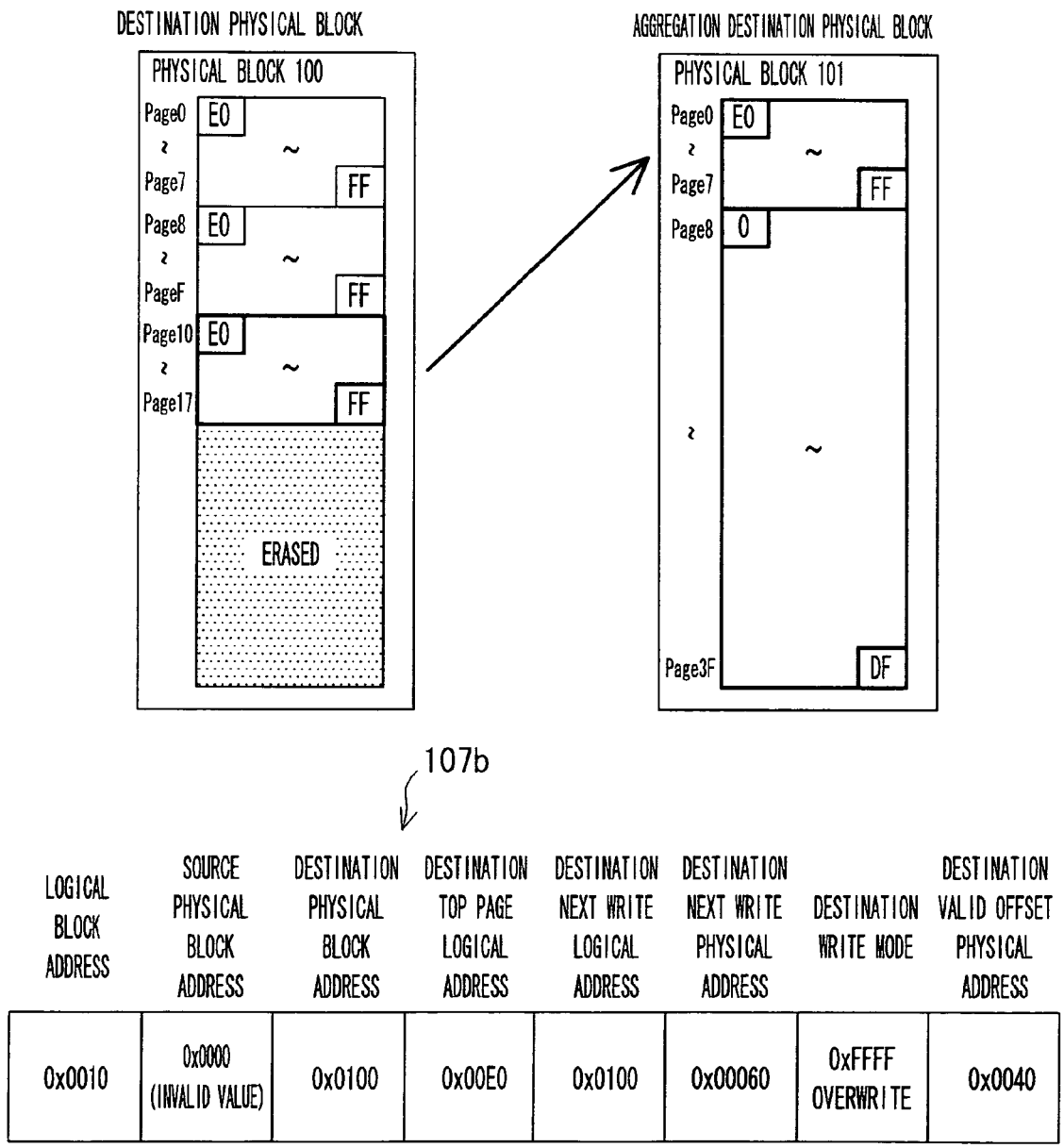
FIG. 35 is an illustration that explains a specific example of an aggregation processing of an overwritten block.

Referring now to FIG. 35 and FIG. 36, description will be made on the example of aggregation processing of overwritten blocks. As shown in FIG. 35, the data lastly overwritten in the physical block 100 is copied to the erased physical block 101. In the physical block 101, it is necessary to write the data read out from the "source physical block" the of duplication information 107b in the remaining region (pages 8 through 3F), but in this example, since 0x0000 which indicates an invalid value is stored in the "source physical block" of the duplication information 107b, a predetermined data (FF) is written.

Thereafter, as shown in FIG. 36, the physical block 100 is erased. Along with this, the duplication information concerning the physical block 100 is initialized, and at the same time, a physical block 101 is registered to the logical/physical conversion table 106.

Example 4

Example of Random Write Mode

Referring now to FIG. 37, an example of the random write mode is discussed. FIG. 37 shows an example in which the data of logical sector addresses 00 through 1F is written in the random write mode in regions of page 18 through page 1F after the data of logical sector addresses E0 through FF are successively written (corresponds to the situation of FIG. 34) in the overwrite mode in the region of page 0 through page 17 in the physical block 100.

The value of "destination next write physical address" of the duplication information 107b is set to 0x0080 which is the head physical address of the erased region. The value of "destination effective offset physical address" is set to 0x0060 which is the offset value of the data written in the random write mode. The value of "destination write mode" is set to 0x0020 which is the random writing cycle.

The value of "write unit" of the write unit allocation table 150 is set to 0x0020 which is the random writing cycle. The value of "start address of write unit 0" is set to the start physical address of a region which stores the data of logical addresses 00 through 1F. In this example, 0x0060 which is the start address of the data written to page 18 through page 1F is set. The value of "start address of write unit 7" is set to the start physical address of the region which stores the data of logical addresses E0 through FF. In this example, 0x0040 which is the start address of the data written in page 10 through page 17 is set. 0xFFFF in "start address of write unit 1", and so on indicates that the data is stored in the source block.

2.2 Reading Operation

Figure 38:
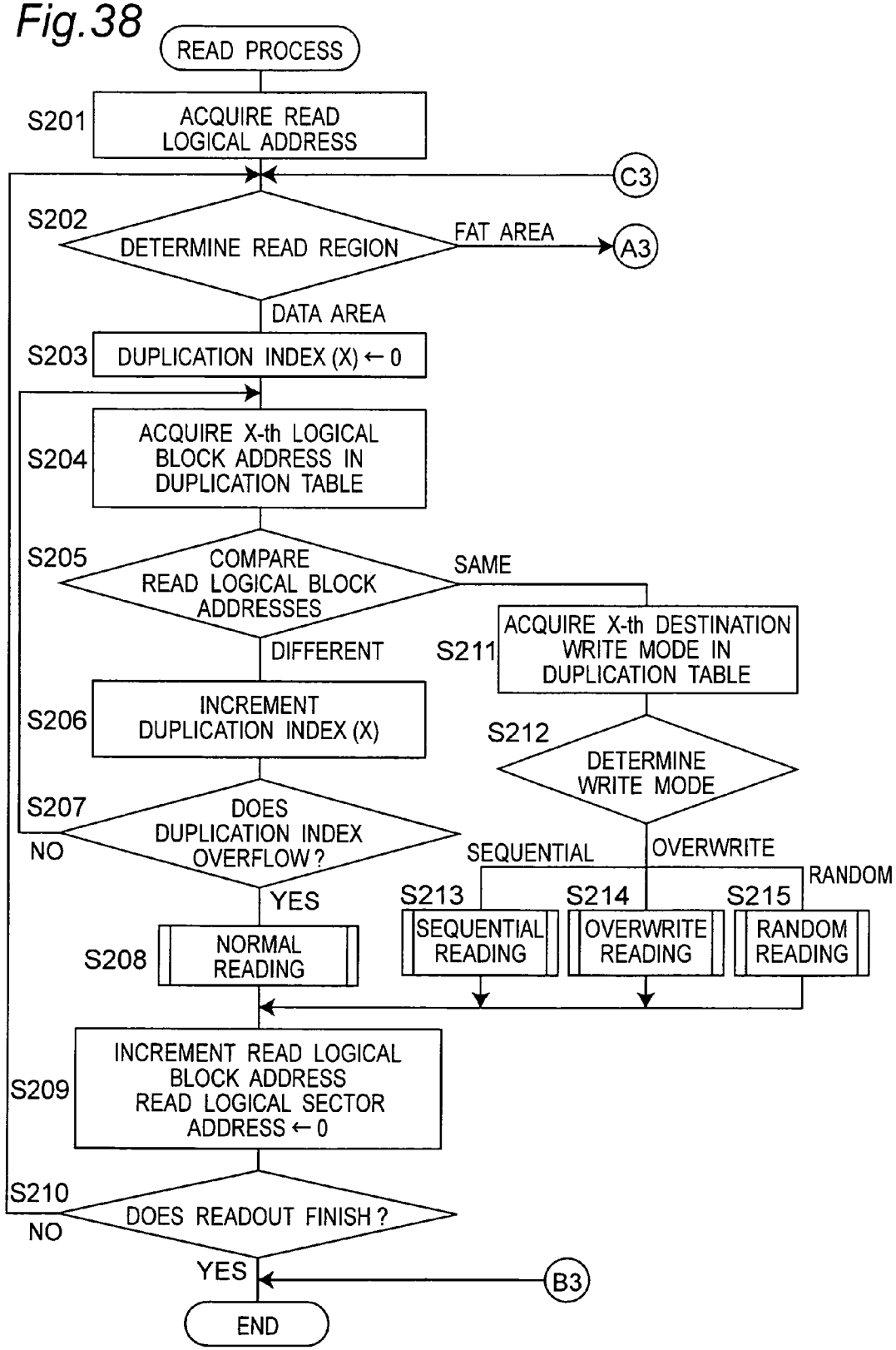
FIG. 38 is a flowchart which indicates a read processing from the flash memory of the memory card.

Referring now to FIG. 38, discussion will be made on the readout operation from the flash memory 103.

First of all, a read logical address designated by the host 102 is acquired (S201). It is noted that "read logical block address" denotes the logical block address designated by the host 102 and "read logical sector address" denotes the logical sector address designated by the host 102.

It is judged whether the logical address designated by the host is in the Fat area or data area to determine the read region (S202).

Figure 43:
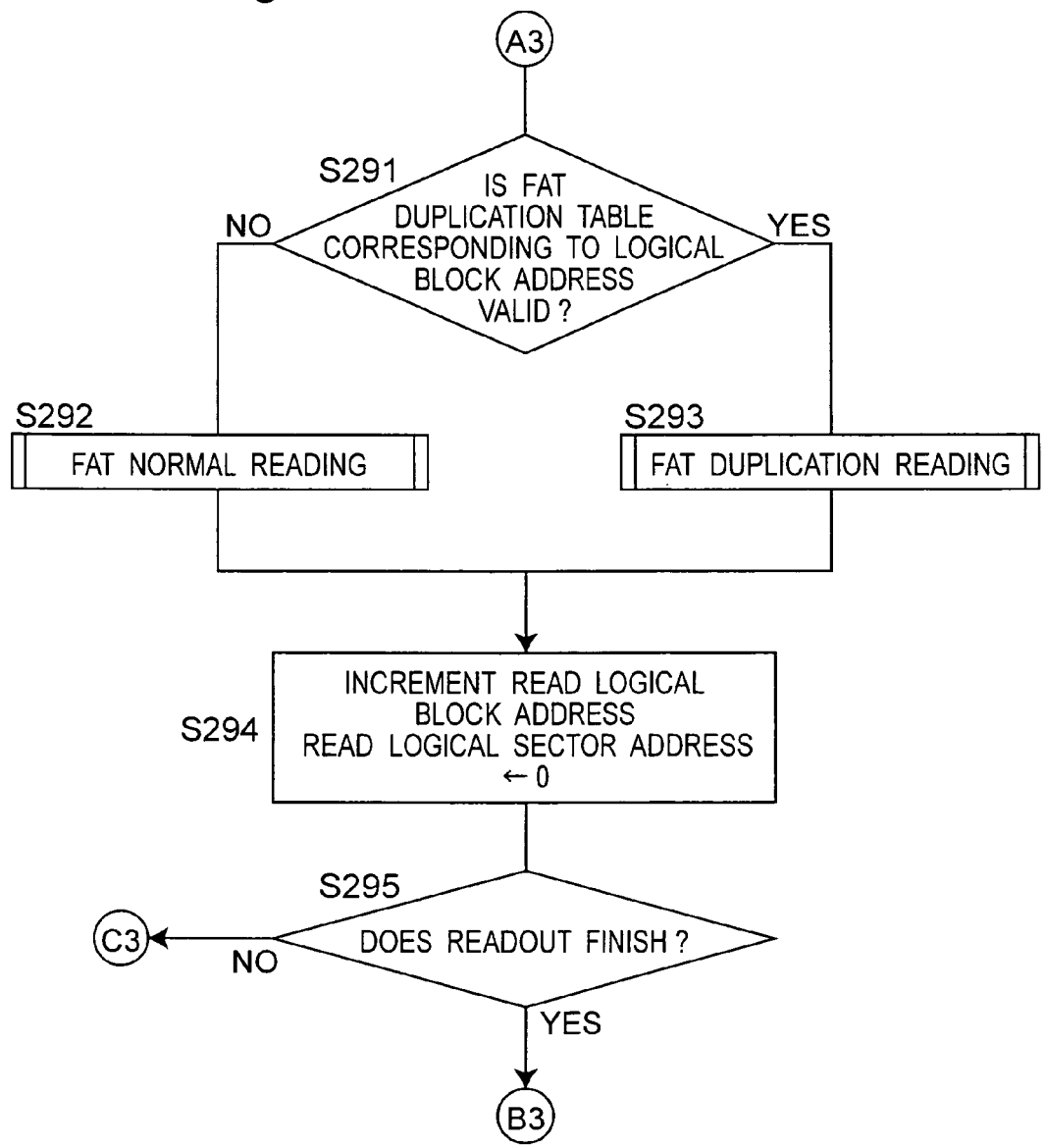
FIG. 43 is a flowchart which indicates a read processing from the flash memory of the memory card (continued from FIG. 38).

When the read region is the Fat area, the processing shown in FIG. 43 is carried out (details are later discussed). When the read region is the data area, the duplication index (X) is set to 0x0000 as an internal parameter (S203).

The logical block address of X-th duplication information (duplication information X) of the duplication table 107 is acquired (S204).

The logical block address acquired from the duplication table 107 is compared to that designated by the host (S205).

When both logical addresses differ, the duplication index (X) is incremented (S206) and the next logical block addresses for the next duplication information are compared. Since there are only 8 pieces of duplication information, when the value of duplication index (X) becomes 8 or more, it is judged that overflow occurs (S207) and a normal readout processing takes place (S208).

When both logical addresses coincide, the value of the "destination write mode" of the duplication information X is acquired (S211), the write mode is judged (S212), and readout processing that complies with the write mode is carried out (S213, S214, and S215).

Upon completion of each readout processing (S208, 5213, 5214, and S215), the readout logical block address is incremented in block units according to the write mode, and the read logical sector address is set to 0x0000 (S209).

The foregoing processing is repeated until a command to indicate completion of readout is received from the host 102 (S210). Hereinafter the detail of each readout processing is described.

2.2.1 Normal Reading

Figure 39:
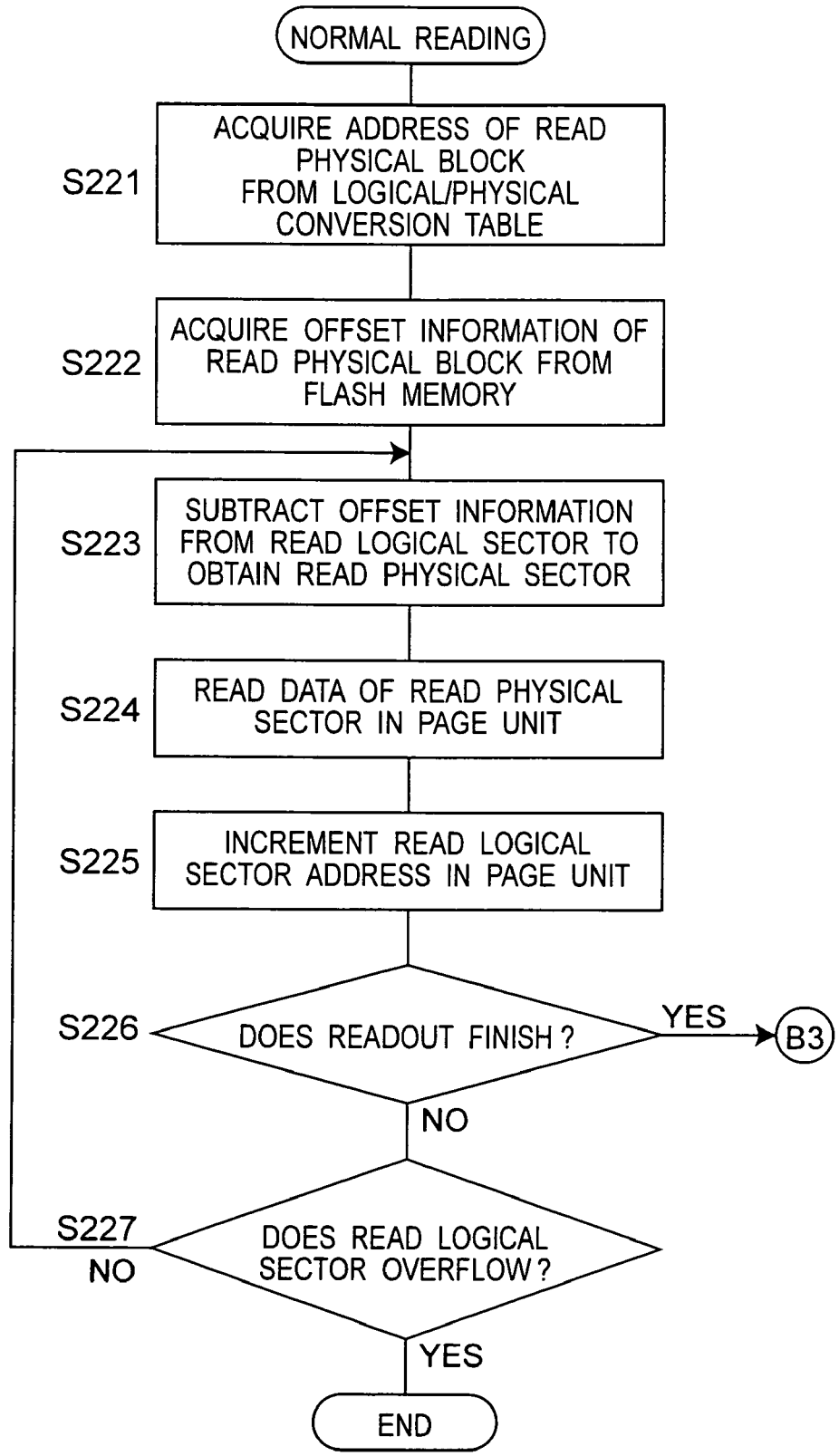
FIG. 39 is a flowchart which indicates a normal read processing.

Referring now to a flowchart of FIG. 39, normal reading processing (S208) is described. The physical block address that corresponds to the read logical block address is acquired from the logical/physical conversion table 106 (S221).

Offset information of a physical block designated by the acquired physical block address is read out from the flash memory 103 (S222). Specifically, a logical sector address written in a management region of the head physical page of a block designated by the acquired physical block address is read out from the flash memory, and information about the offset value of the physical block is obtained.

A read physical sector address which corresponds to the read logical sector address is obtained by subtracting the offset value from the read logical sector (S223). The data of the read physical sector address is readout in page units (S224).

The read logical sector address is incremented in page units (S225). Whether or not readout from the host 102 is completed is judged (S226). When the readout is completed, the whole readout processing is completed. When the readout from the host 102 continues, overflow of the readout logical sector address is judged (S227). When no overflow occurs, the process returns to step S223, the next data is read out. When overflow occurs, this normal readout processing is ended.

2.2.2 Sequential Reading

Figure 40:
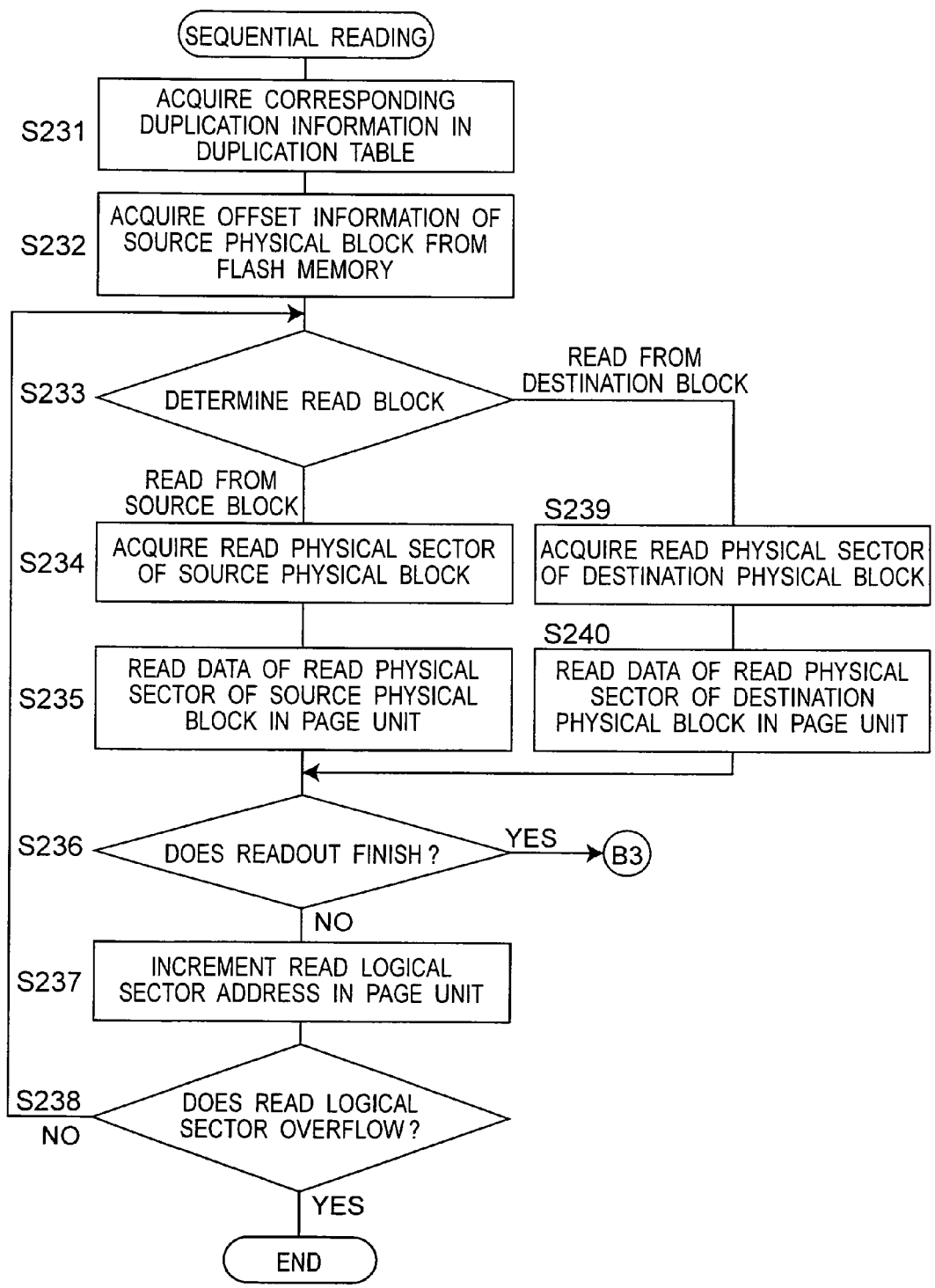
FIG. 40 is a flowchart which indicates a sequential read processing.

Referring now to the flowchart of FIG. 40, the sequential readout processing (S213) is explained. The corresponding duplication information in the duplication table 107 is acquired (S231). That is, information about "source physical block address," "destination physical block address," "destination top page logical address," and "destination next write logical address" is acquired from the duplication information.

Information on offset value of the source physical block is acquired from the flash memory 103 (S232). It is judged whether the data is read from the source physical block or destination physical block (S233). Specifically, when the read logical sector address is smaller than the start address of the page which includes the value of "destination top page logical address," or is greater than the value of "destination next write logical address," it is judged that the data is read from the source. Otherwise, it is judged that the data is read from the destination.

In the case of readout from the source, a read physical sector of the source physical block is acquired (S234). A physical sector in which the data corresponding to the "read logical sector address" is written can be obtained by subtracting the offset value of the source physical block from the read logical sector address.

The data of the read physical sector of the acquired source physical block is read out in page units (S235).

In step S233, in the case of readout from the destination, the read physical sector of the destination physical block is acquired (S239). A physical sector in which the data corresponding to the "read logical sector address" is written can be obtained by subtracting the destination top page logical address from the read logical sector address.

The data of the read physical sector of the obtained destination physical block is read out in page units (S240).

It is judged whether or not readout from the host 102 continues (S236) and when it is completed, the whole readout process is ended. When the readout from the host 102 continues, the read logical sector address is incremented in page units (S237), and overflow of the read logical sector address is judged (S238). When no overflow occurs, the process returns to step S233 and the following data is read out. When overflow occurs, the sequential readout processing is ended.

2.2.3 Overwrite Reading

Figure 41:
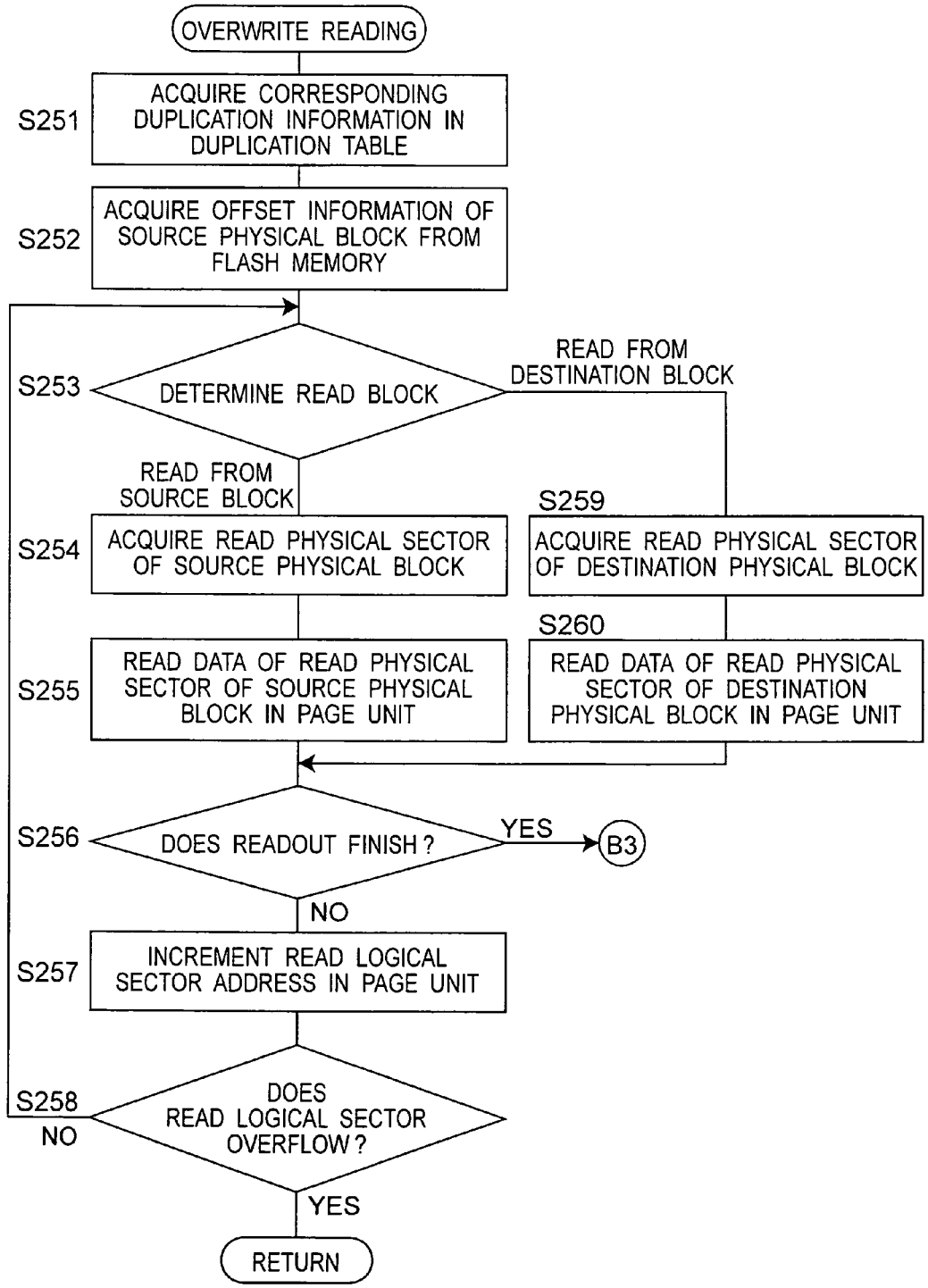
FIG. 41 is a flowchart which indicates an overwrite read processing.

Referring now to the flowchart of FIG. 41, overwrite readout processing (S214) is explained. The corresponding duplication information in the duplication table 107 is acquired (S251). That is, information of "source physical block address," "destination physical block address," "destination top page logical address," "destination next write logical address," and "destination effective offset physical address" is acquired from the duplication information.

Information on offset value of the source physical block is acquired from the flash memory 103 (S252). It is judged whether the data is read from the source physical block or the destination physical block (S253). Specifically, when the read logical sector address is smaller than the head address of a page which includes "destination top page logical address," or greater than "destination next write logical address," it is judged that data is read from the source. Otherwise, it is judged that data is read from the destination.

When the data is read from the source, a read physical sector of the source physical block is acquired (S254).

The data of the acquired read physical sector of the source physical block is read in page units (S255).

In step S253, when data is read from the destination, the read physical sector of the destination physical block is acquired (S259). A physical sector in which data corresponding to the read logical sector address is written can be obtained by subtracting the destination top page logical address from the read logical sector address and further adding the "destination effective offset physical address" to the subtracted value.

The data of the obtained read physical sector of the destination physical block is read out in page units (S260).

Thereafter, it is judged whether or not the readout from the host 102 continues (S256). When it is completed, the whole readout process is ended. When the readout from the host 102 continues, the read logical sector address is incremented in page units (S257) and overflow of the read logical sector address is judged (S258). When no overflow occurs, the process returns to step S253 and the following data is read out. When the overflow occurs, the present overwrite readout processing is ended.

2.2.4 Random Reading

Figure 42:
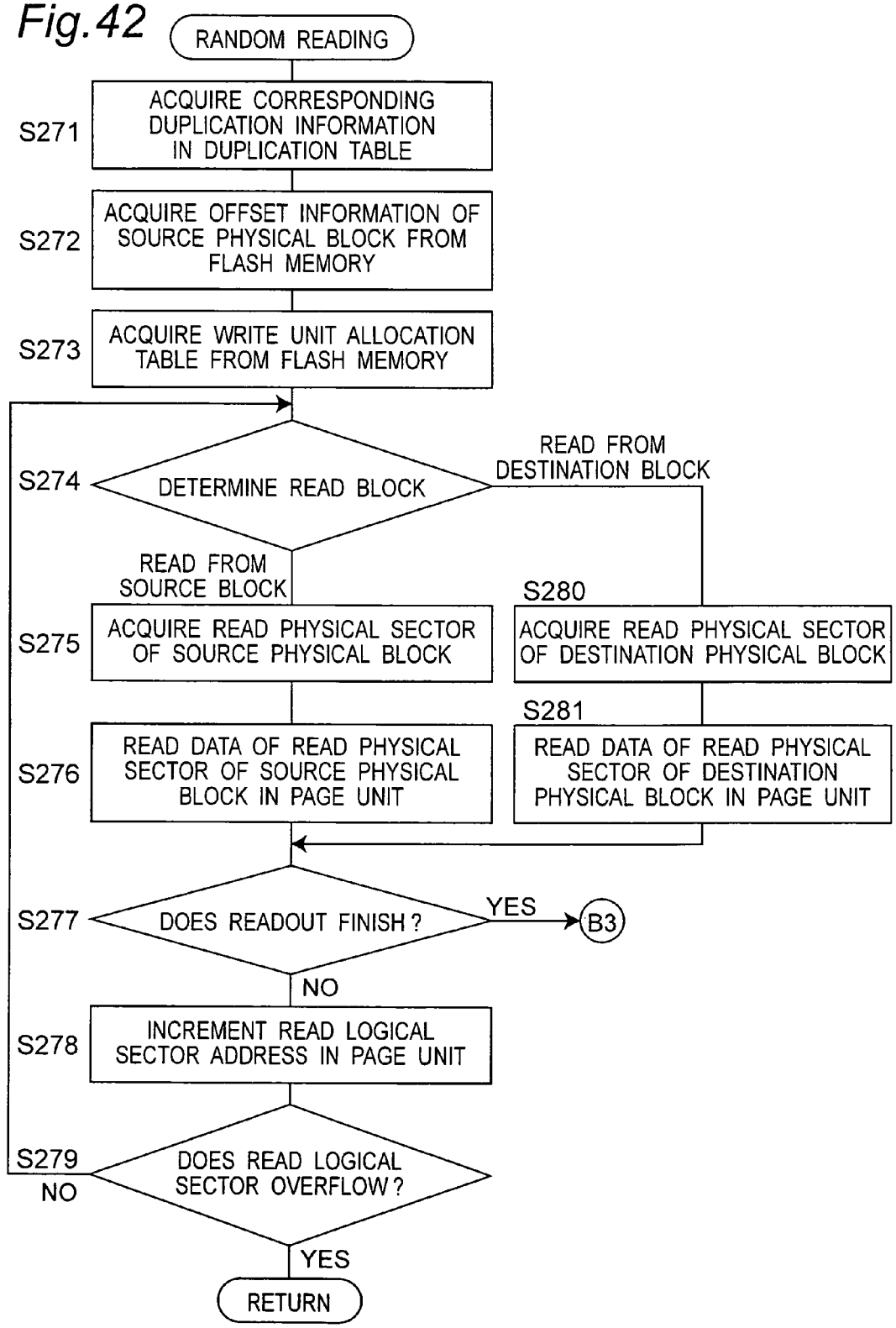
FIG. 42 is a flowchart which indicates a random read processing.

Referring now to the flowchart of FIG. 42, random readout processing (S215) is explained. The corresponding duplication information is obtained in the duplication table 107 (S271). That is, from the duplication information, information of "source physical block address," "destination physical block address," "destination top page logical address," "destination next write logical address," "destination write mode," and "destination effective offset physical address" is acquired.

Information on offset value of the source physical block is acquired from the flash memory 103 (S272).

From the management region of the flash memory 103 designated by "destination physical block address" and "destination effective offset physical address," information of the write unit allocation table 150 is acquired (S273).

It is judged whether data is read from the source physical block or the destination physical block (S274). This judgment is carried out as follows. First of all, out of a plurality of writ units, one write unit that includes a read logical sector address is decided. Then, referring to the write unit allocation table 150, the head physical address of a region storing the data of the decided write unit is obtained. For example, when the value of the write unit is 0x0010h (16 sectors (=4 pages)), sixteen write units (write units 0 through F) are included in one physical block. When the read logical sector address is 0x001B, the write unit including the read logical sector address becomes the second writ unit (write unit 1). Thereafter, referring to the write unit allocation table 150, the head address of the write unit 1 is obtained. When the head physical address obtained is an invalid value, it is judged that the data is read from the source. When it is a valid value, it is judged that the data is read from the destination.

In the case of readout from the source, a read physical sector of the source physical block is acquired (S275). The data of the acquired read physical sector of the source physical block is read out in page units (S276).

In step S274, when the data is read from the destination, the read physical sector of the destination physical block is acquired (S280). The readout physical sector that corresponds to the read logical sector address can be obtained by adding the top page physical address obtained from the write unit allocation table 150 to the remainder obtained by dividing the read logical sector address by the value of the "destination write mode." The data of the acquired read physical sector of the destination physical block is read in page units (S281).

Thereafter, it is judged whether or not the readout from the host 102 continues (S277), and when it is completed, the whole readout process is ended. When the readout from the host 102 continues, the readout logical sector address is incremented in page units (S278), and overflow of the read logical sector address is judged (S279). When the overflow does not occur, the process returns to step S274 and the following data is read out. When the overflow occurs, the random readout processing is ended.

2.2.5 FAT Reading

Description will be made on the processing shown in FIG. 43, which is implemented when it is judged that the data is read out from the Fat area in the read region judgment of step S202 of the flowchart of FIG. 38.

In FIG. 43, it is judged whether or not the FAT duplication information which corresponds to the logic block address is valid (S291). Specifically, it is carried out as follows. FAT duplication information of the corresponding duplication table 107 is obtained from the read logical sector address as follows.

TABLE 1

| Logical Sector Address | Corresponding FAT Duplication Information |
|---|---|
| 0x0000-0x0061 | FAT duplication information 0 |
| 0x0062-0x0080 | FAT duplication information 1 |
| 0x0081-0x009F | FAT duplication information 2 |
| 0x00A0-0x00FF | FAT duplication information 3 |

The "destination physical block address" is obtained and whether the value is valid or invalid is judged.

When the value is 0x0000 (invalid value), it is judged invalid, and when the value is other than 0x0000, it is judged valid.

When the FAT duplication information is invalid, FAT normal readout processing is performed (S292), and when the FAT duplication information is valid, FAT duplication readout processing is performed (S293).

Thereafter, the readout logical block address is incremented in block units and at the same time, the readout logical sector address is set to 0x0000 (S294).

It is judged whether or not the readout from the host 102 is ended (S295). If ended, whole readout processing is ended. When the readout from the host 102 continues, the process returns to step S202 and the following readout is carried out.

2.2.5.1 FAT Normal Reading

Figure 44:
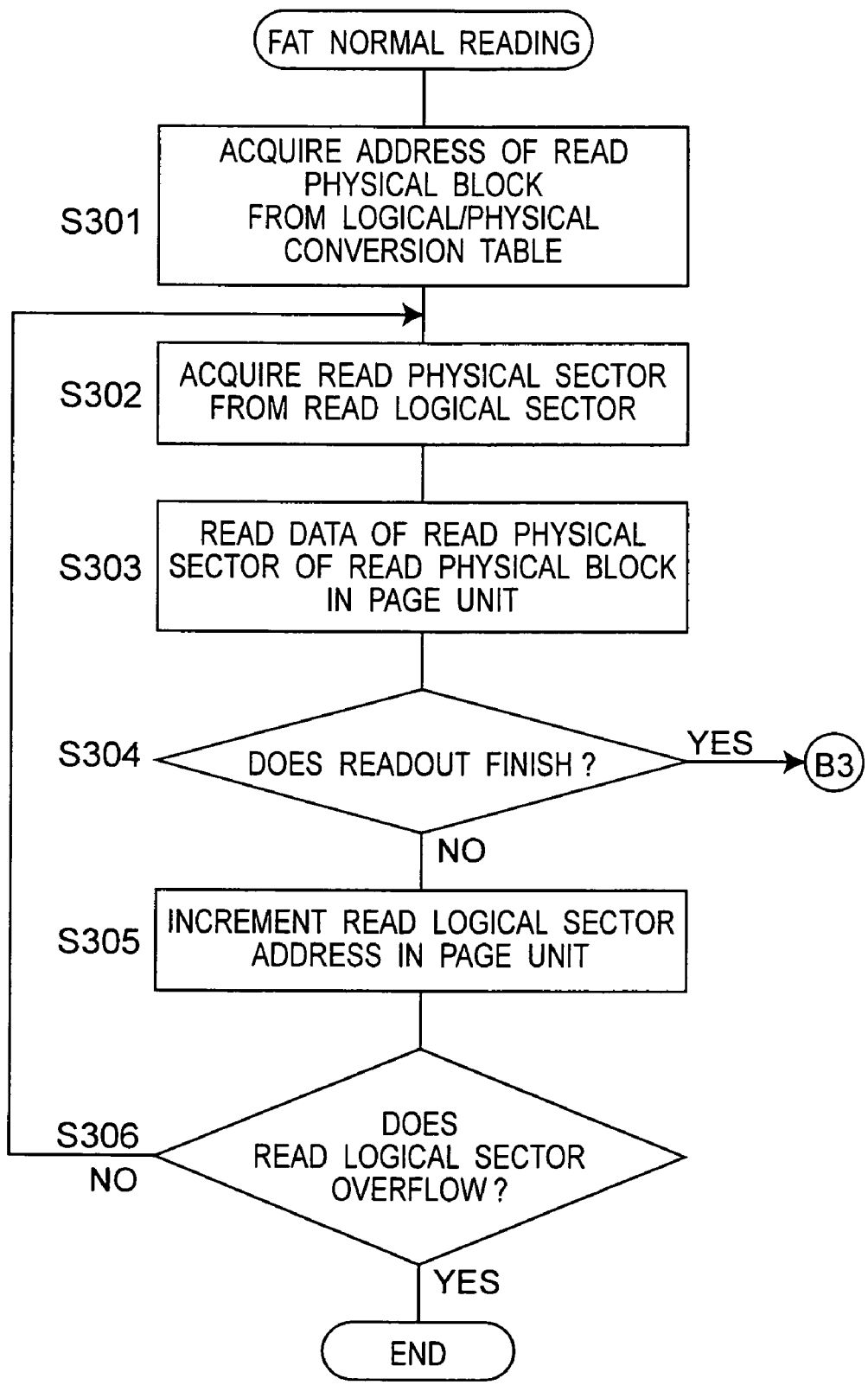
FIG. 44 is a flowchart which indicates a FAT normal read processing.

Referring now to the flowchart of FIG. 44, the FAT normal reading processing of step S292 is explained.

From the logical/physical conversion table 106, a physical block address that corresponds to the read logical block address is acquired (S301).

A read physical sector address of the partial block write region is acquired by subtracting the fixed offset value (see FIG. 23A) from the read logical sector address (S302). The data of the read physical sector address is read in page units (S303).

It is judged whether or not the readout from the host 102 is finished (S304). When the readout is finished, the whole read processing is ended.

When the readout from the host 102 continues, the read logical sector address is incremented in page units (S305).

Overflow of the read logical sector address is judged (S306). When the overflow does not occur, the process returns to step S302 and the following data is read out. When the overflow occurs, the FAT normal readout processing is ended.

2.2.5.2 FAT Duplication Reading

Figure 45:
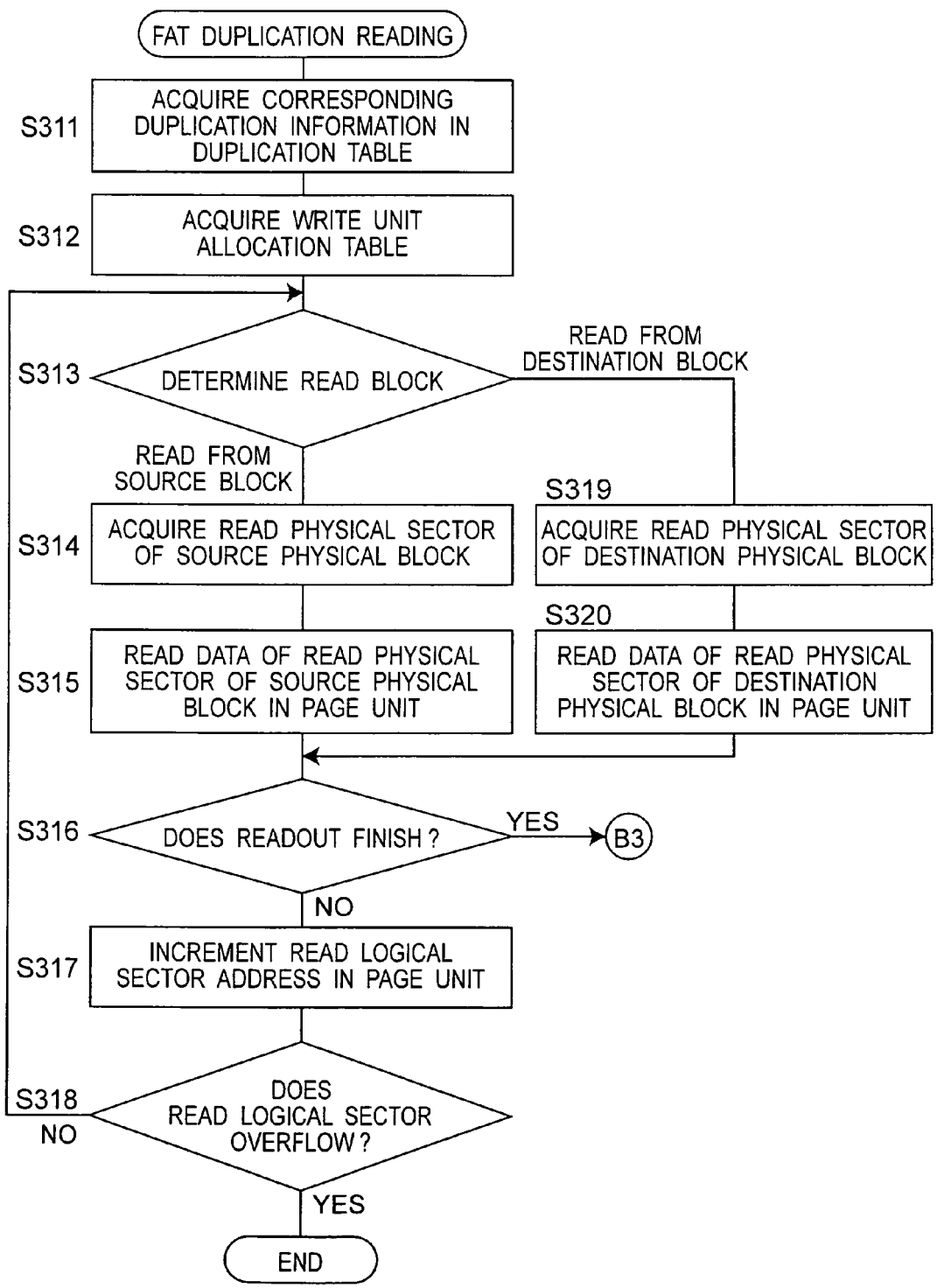
FIG. 45 is a flowchart which indicates a FAT duplication read processing.

Referring now to the flowchart of FIG. 45, the FAT duplication readout processing of step S293 is discussed.

In the duplication table 107, the corresponding duplication information is acquired (S311). That is, information of "destination physical block address" and "destination allocation physical page" is obtained from the duplication information.

Information of the write unit allocation table 150 is obtained from the management region of the flash memory 103 designated by "destination physical block address" and "destination allocation physical page" (312).

It is judged whether data is read from the source physical block or the destination physical block (S313). That is, the fixed offset (see FIG. 23A) is subtracted from the read logical sector address, and the subtracted value is divided by the write unit specific to the Fat area. The write unit allocation table 150 is referred based on the quotient, and a head physical address in write nit, which corresponds to the read logical sector address, is obtained. When the value of the head physical address is invalid, it is judged as the readout from the source, while when it is the valid value, it is judged as the readout from the destination.

When the readout from the source, a readout physical sector of the source physical block is acquired (S314). The data of the acquired read physical sector in the destination physical block is read in page units (S315).

In step S313, when the readout from the destination, a read physical sector of the destination physical block is acquired (S319). The fixed offset is subtracted from the read logical sector address, and the result is divided by the write unit specific to the Fat area. A physical sector that corresponds to the read logical sector address can be obtained by adding the remainder to the head physical address obtained by referring to the write unit allocation table 150 based on the quotient.

The data of the acquired read physical sector of the destination physical block obtained is read in page units (S320).

Thereafter, it is judged whether or not the readout from the host 102 continues (S316). When the readout is finished, the whole readout processing is ended. When the readout from the host 102 continues, the read logical sector address is incremented in page units (S317), and overflow of the read logical sector address is judged (S318). When no overflow occurs, the process returns to Step S313 and the next data is read out, while when the overflow occurs, the whole FAT duplication readout processing is ended.

Although the present invention has been described in connection with specified embodiments thereof, many other modifications, corrections and applications are apparent to those skilled in the art. Therefore, the present invention is not limited by the disclosure provided herein but limited only to the scope of the appended claims. The present disclosure relates to subject matter contained in Japanese Patent Application Nos. 2004-133112 (filed on Apr. 28), 2004, 2004-133113 (filed on Apr. 28), and 2004, 2004-138200 (filed on May 7, 2004), contents of which are expressly incorporated herein by reference in its entirety.

The method of writing a nonvolatile storage device related to the present invention can implement write processing of the data from the host at a high speed and can reduce the number of physical blocks necessary for processing, and achieves specific effects in that the data rewrite frequency of a flash memory can be increased, and thus it is useful for nonvolatile storage devices, memory cards, nonvolatile memory controllers, and others.

The invention claimed is:

1. A nonvolatile storage device to/from which data is written/read based on a logical address designated by a host, said nonvolatile storage device comprising:

a nonvolatile memory to/from which data is written and read based on a physical address, said nonvolatile memory including a plurality of physical blocks;

a logical/physical conversion table that stores relation information between the logical address and the physical address by indentifying a relationship between (i) a logical group address, which is an address of a logical group including a plurality of logical blocks, and (ii) an address of a physical group including at least one physical block, of the plurality of physical blocks comprising a data management unit of a plurality of data management units;

a duplication table that stores duplication information identifying a relationship between the physical address and the logical address of (i) data having a size that is smaller than a size of the data management unit, and (ii) data for which the logical group address is identified in the relation information stored in said logical/physical conversion table; and a controller that controls an operation of said nonvolatile storage device, wherein said controller allows data, which has a logical address that is the same as a logical address of data already written in one of the plurality of management units, to be redundantly written in another management unit of the plurality of management units, wherein said controller controls the operation of said nonvolatile storage device using a plurality of write modes for redundantly writing the data having the logical address that is the same as the logical address of the data already written in the one of the plurality of management units, wherein said controller selectively switches between the plurality of write modes according to the logical address designated by the host, without updating the relation information stored in the logical/physical conversion table, and wherein the plurality of write modes includes at least two of:

a random mode of writing data having a size that is equal to a size of a write unit, of a plurality of write units, which is smaller than the data management unit, for a plurality of write commands from the host for a same logical group address;

an overwrite mode of writing data (i) having a size that is equal to a size of a write unit, of the plurality of write units, which is smaller than the data management unit and (ii) having a same logical address as previously written data, for a plurality of write commands from the host for a same logical group address; and a sequential mode of writing the data continuously in a logical address order in the data management unit, for a plurality of write commands from the host for a same logical group address.

2. The nonvolatile storage device according to claim 1, wherein said controller switches between the plurality of write modes based on the logical address designated by the host and based on the duplication information stored in said duplication table which corresponds to the logical address designated by the host.

3. The nonvolatile storage device according to claim 1, wherein said duplication table has a plurality of records for storing predetermined information, which corresponds to the logical group address of the redundantly written data, and associates the stored predetermined information with a plurality of logical group addresses.

4. The nonvolatile storage device according to claim 1, wherein said nonvolatile memory stores location information with respect to data in each write unit of the plurality of write units.

5. The nonvolatile storage device according to claim 4, wherein the location information is written in said nonvolatile memory together with data lastly written in a write unit of the plurality of write units.

6. The nonvolatile storage device according to claim 4, wherein the location information is written in a management region of said nonvolatile memory.

7. The nonvolatile storage device according to claim 4, wherein the location information contains information directly indicating a physical address of a region of said nonvolatile memory in which data is written in a write unit of the plurality of write units, and contains information indicating whether data written in each write unit of the plurality of write units is not redundantly written.

8. The nonvolatile storage device according to claim 1, wherein said duplication table contains information of a physical position in which location information for a region of said nonvolatile memory, which stores the redundantly written data, is stored.

9. The nonvolatile storage device according to claim 1, wherein, during the random mode of writing, said controller supplements deficit data and writes write data, such that a total size of the write data becomes a specific size in a write unit, of the plurality of write units, when a size of the write data from the host is smaller than a size of the write unit of the plurality of write units.

10. The nonvolatile storage device according to claim 1, wherein
said controller writes the data in the random mode of writing, when the logical address designated by the host during data writing in the overwrite mode of writing is in a address range for which data cannot be written continuously in the overwrite mode of writing.

11. The nonvolatile storage device according to claim 1, wherein said duplication table includes a first logical address, a last logical address, and physical position information of data lastly written in a write unit, of the plurality of write units, in the overwrite mode of writing, for the redundantly written data.

12. The nonvolatile storage device according to claim 1, wherein said controller writes data in the overwrite mode of writing, when the logical address designated by the host is larger than a first address of the duplication information stored in said duplication table and smaller than a last address of the duplication information stored in said duplication table.

13. The nonvolatile storage device according to claim 1, wherein, during the overwrite mode of writing, said controller supplements deficit data and writes write data, such that a total size of the write data becomes a specific size in a write unit, of the plurality of write units, when a size of the write data from the host is smaller than a size of the write unit of the plurality of write units.

14. The nonvolatile storage device according to claim 1, wherein said controller writes the data with an offset of the logical address in the data management unit.

15. The nonvolatile storage device according to claim 14, wherein information of the offset of the logical address is stored in said nonvolatile memory.

16. The nonvolatile storage device according to claim 1, wherein
said controller writes the data in the overwrite mode of writing, when the logical address designated by the host during data writing in the sequential mode of writing is the same logical address of the data management unit as that in a last writing operation in the sequential mode of writing and is arranged in an address range for which data cannot be written continuously in the sequential mode of writing.

17. The nonvolatile storage device according to claim 1, wherein
said controller writes the data in the random mode of writing, when the logical address designated by the host during data writing in the sequential mode of writing is the same logical address of the data management unit as that in a last writing operation in the sequential mode of writing and is arranged in an address range for which data cannot be written continuously in the sequential mode of writing.

18. The nonvolatile storage device according to claim 1, wherein said duplication table includes a first logical address and a last logical address with respect to the redundantly written data.

19. The nonvolatile storage device according to claim 18, wherein said controller writes continuously in the sequential mode of writing when the logical address designated by the host is greater than the last logical address.

20. The nonvolatile storage device according to claim 18, wherein
said controller switches to the overwrite mode of writing, when the logical address designated by the host is larger than the first logical address and smaller than the last logical address.

21. The nonvolatile storage device according to claim 18, wherein
said controller switches transfers to the random mode of writing, when the logical address designated by the host is smaller than the first logical address.

22. The nonvolatile storage device according to claim 1, wherein, when an unwritten region in the data management unit exists after writing data of a last logical address in the data management unit, said controller writes data sequentially in the unwritten region starting from a first logical address in the data management unit.

23. The nonvolatile storage device according to claim 1, wherein said controller chooses a write mode, of the plurality of write modes, for a logical address included in a predetermined range, the chosen write mode being different from a write mode, of the plurality of write modes, for a logical address not included in the predetermined range.

24. The nonvolatile storage device according to claim 23, wherein said duplication table has a plurality of dedicated records, each of the plurality of dedicated records corresponding to a respective logical group included in the predetermined range.

25. The nonvolatile storage device according to claim 23, wherein said logical/physical conversion table is different in structure for the information related to logical addresses included in the predetermined range than for information related to logical addresses not included in the predetermined range.

26. The nonvolatile storage device according to claim 23, wherein a size of a logical group of logical addresses included in the predetermined range is smaller than a size of a logical group of logical addresses not included in the predetermined range.

27. The nonvolatile storage device according to claim 23, wherein a size of each of logical groups of logical addresses included in the predetermined range is different for each of the logical groups.

28. The nonvolatile storage device according to claim 23, wherein the predetermined range is set to a range which includes a region which stores file management information managed by a file system.

29. The nonvolatile storage device according to claim 28, wherein a size of the predetermined range varies in accordance with a capacity of the said nonvolatile storage device.

30. The nonvolatile storage device according to claim 23, wherein a data management unit, of the plurality of data management units, associated with the logical group includes a first region in which data management unit data is first written, and a second region in which data, which has a same logical address as the data management unit data written in the first region, is redundantly written in a size that is smaller than the data management unit associated with the logical group.

31. The nonvolatile storage device according to claim 30, wherein the first region and the second region are included in a same physical block of said nonvolatile memory.

32. The nonvolatile storage device according to claim 30, wherein the second region to one logical group is allocated in plural data management units of the plurality of data management units.

33. A data write method for a nonvolatile storage device to/from which data is written/read based on a logical address designated by a host, said data writing method comprising:
    utilizing a plurality of write modes for redundantly writing data, which has a logical address that is the same as an address of data already written in one data management unit of a plurality of data management units, in another data management unit of the plurality of data management units; and
    when receiving a write command to write data, which has a logical address that is the same as an address of previously written data from the host:
        redundantly writing the data, for which the write command has been received, in a data management unit, of the plurality of data management units, that is different from the data management unit storing the previously written data, and storing the logical address and a physical address of the data written in the data management unit that is different from the data management unit storing the previously written data, while associating the logical address of the data written in the data management unit that is different from the data management unit storing the previously written data with the physical address of the data written in the data management unit that is different form the data management unit storing the previously written data; and
    selectively switching between the plurality of write modes in accordance with the logical address designated by the host, when the write command is continuously received from the host,
wherein the plurality of write modes includes at least two of:
    a random mode of writing data having a size that is equal to a size of a write unit, of the plurality of write units, which is smaller than the data management unit, for a plurality of write commands from the host for a same logical group address;
    an overwrite mode of writing data (i) having a size that is equal to a size of a write unit, of the plurality of write units, which is smaller than the data management unit and (ii) having a same logical address as previously written data, for a plurality of write commands from the host for a same logical group address; and
    a sequential mode of writing the data continuously in a logical address order in the data management unit, for a plurality of write commands from the host for a same logical group address.

34. The data write method according to claim 33,
wherein logical addresses in a predetermined range are divided into a plurality of address regions,
wherein each of a plurality of logical groups is assigned to a respective address region of the plurality of divided address regions, and
wherein a logical group of the plurality of logical groups corresponds to a data management unit of the plurality of data management units.

* * * * *